United States Patent
Finlay

(10) Patent No.: US 12,479,920 B2
(45) Date of Patent: Nov. 25, 2025

(54) PD1 AND VEGFR2 DUAL-BINDING AGENTS

(71) Applicant: Ottimo Pharma Limited, Sandwich (GB)

(72) Inventor: William James Jonathan Finlay, Glasglow (GB)

(73) Assignee: Ottimo Pharma Limited, Sandwich (GB)

( * ) Notice: Subject to any disclaimer, the term of this patent is extended or adjusted under 35 U.S.C. 154(b) by 0 days.

(21) Appl. No.: 19/056,312

(22) Filed: Feb. 18, 2025

(65) Prior Publication Data

US 2025/0243276 A1  Jul. 31, 2025

Related U.S. Application Data

(62) Division of application No. 17/768,013, filed as application No. PCT/EP2020/078427 on Oct. 9, 2020.

(30) Foreign Application Priority Data

Oct. 11, 2019 (GB) ..................................... 1914747
Aug. 24, 2020 (GB) ..................................... 2013180

(51) Int. Cl.
C07K 16/28 (2006.01)

(52) U.S. Cl.
CPC ...... *C07K 16/2818* (2013.01); *C07K 16/2863* (2013.01); *C07K 2317/31* (2013.01); *C07K 2317/33* (2013.01); *C07K 2317/55* (2013.01); *C07K 2317/76* (2013.01)

(58) Field of Classification Search
None
See application file for complete search history.

(56) References Cited

U.S. PATENT DOCUMENTS

| | | | |
|---|---|---|---|
| 8,354,509 B2 | 1/2013 | Carven et al. | |
| 8,735,553 B1 | 5/2014 | Li et al. | |
| 10,344,090 B2 | 7/2019 | Yuan et al. | |
| 10,858,434 B2 | 12/2020 | Finlay | |
| 10,858,435 B2 | 12/2020 | Finlay | |
| 11,365,255 B2 | 6/2022 | Yuan et al. | |
| 11,851,460 B2 | 12/2023 | Finlay | |
| 2021/0047415 A1 | 2/2021 | Finlay | |
| 2021/0101981 A1 | 4/2021 | Finlay | |
| 2022/0251203 A1 | 8/2022 | Zhang et al. | |
| 2024/0101674 A1 | 3/2024 | Finlay | |
| 2024/0124590 A1 | 4/2024 | Finlay | |

FOREIGN PATENT DOCUMENTS

| | | |
|---|---|---|
| EP | 3081576 A1 | 10/2016 |
| EP | 3878468 A1 | 9/2021 |
| WO | WO-2006121168 A1 | 11/2006 |
| WO | WO-2013181452 A1 | 12/2013 |
| WO | WO-2015085847 A1 | 6/2015 |
| WO | WO-2017055404 A1 | 4/2017 |
| WO | WO-2019170885 A1 | 9/2019 |
| WO | WO-2019170898 A1 | 9/2019 |
| WO | WO-2020093993 A1 | 5/2020 |

OTHER PUBLICATIONS

Finlay, W. J. J. et al., "Anti-PD1 'SHR-1210' aberrantly targets proangiogenic receptors and this polyspecificity can be ablated by paratope refinement," mAbs, 11(1):26-44 (2019).
International Search Report and Written Opinion mailed Mar. 19, 2021 for International Application No. PCT/EP2020/078427, 20 pages.
Lu, D. et al., "Abstract 572: A novel anti-PDL1 x anti-VEGFR2 bispecific antibody for enhanced antitumor immunity," Cancer Res (2016) 76 (14_Supplement): 572; https://doi.org/10.1158/1538-7445. AM2016-572, 1 page.
Tiller, T. et al., "A fully synthetic human Fab antibody library based on fixed VH/VL framework pairings with favorable biophysical properties", mAbs, 5(3):445-470 (2013).
Townsend, S. et al., "Augmented Binary Substitution: Single-pass CDR germlining and stabilization of therapeutic antibodies," PNAS, 112(50):15354-15359 (2015).
Zhou, F. et al., "A general user interface for prediction servers of proteins' post-translational modification sites," Nature Protocols, 1(3):1318-1321 (2006).

*Primary Examiner* — Ruixiang Li
(74) *Attorney, Agent, or Firm* — Jones Day

(57) ABSTRACT

Provided herein are antibody molecules that bind specifically to Programmed cell death 1 (PD1) and Vascular endothelial growth factor receptor 2 (VEGFR2), related nucleic acid molecules, vectors and host cells. Also provided herein are medical uses of such antibody molecules.

30 Claims, 40 Drawing Sheets
Specification includes a Sequence Listing.

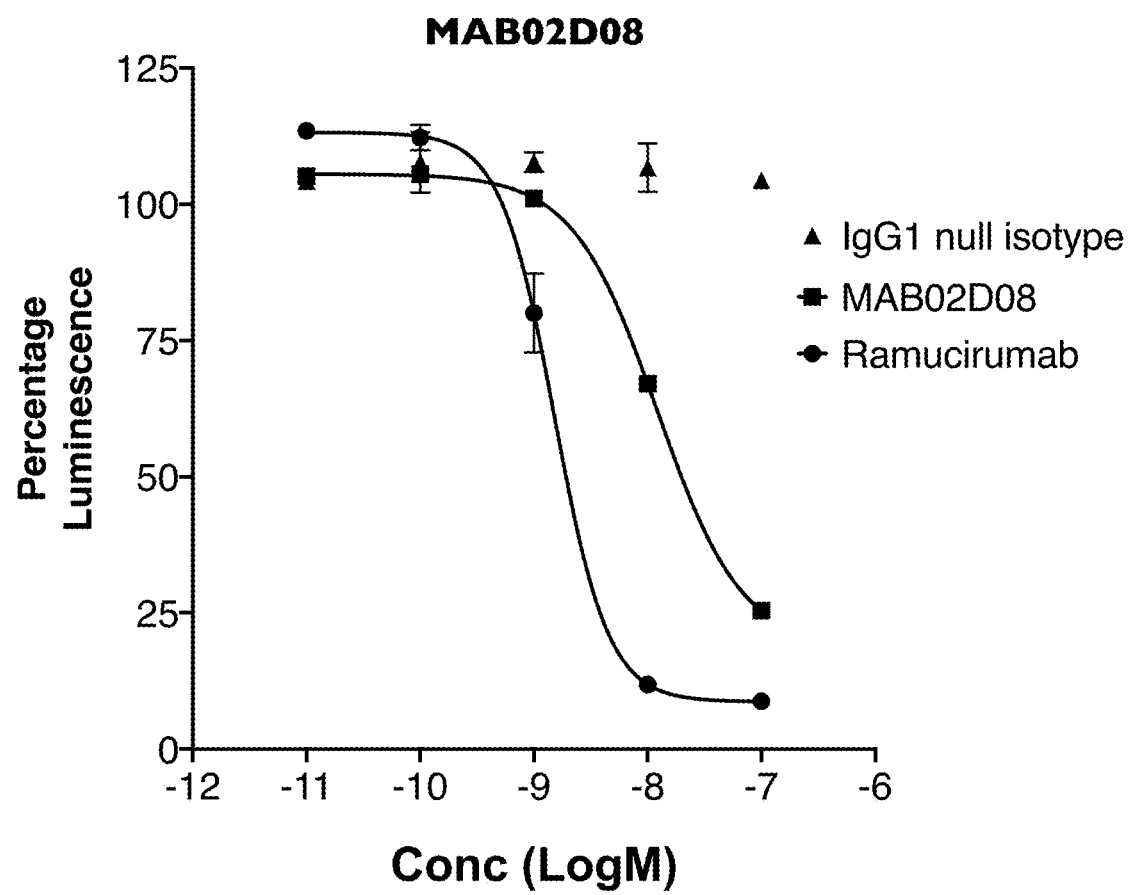

```
                        SEQUENCE LISTING

Sequence total quantity: 75
SEQ ID NO: 1              moltype = AA  length = 10
FEATURE                   Location/Qualifiers
REGION                    1..10
                          note = VH HCDR1
source                    1..10
                          mol_type = protein
                          organism = synthetic construct
SEQUENCE: 1
GFTFSSYMMS                                                                10

SEQ ID NO: 2              moltype = AA  length = 17
FEATURE                   Location/Qualifiers
REGION                    1..17
                          note = VH HCDR2
source                    1..17
                          mol_type = protein
                          organism = synthetic construct
SEQUENCE: 2
TISGGGANTY YPDSVKG                                                        17

SEQ ID NO: 3              moltype = AA  length = 7
FEATURE                   Location/Qualifiers
REGION                    1..7
                          note = VH HCDR3
source                    1..7
                          mol_type = protein
                          organism = synthetic construct
SEQUENCE: 3
QLYYFDY                                                                    7

SEQ ID NO: 4              moltype = AA  length = 11
FEATURE                   Location/Qualifiers
REGION                    1..11
                          note = VL LCDR1
source                    1..11
                          mol_type = protein
                          organism = synthetic construct
SEQUENCE: 4
LASQGIGPWL S                                                              11

SEQ ID NO: 5              moltype = AA  length = 7
FEATURE                   Location/Qualifiers
REGION                    1..7
                          note = VL LCDR2
source                    1..7
                          mol_type = protein
                          organism = synthetic construct
SEQUENCE: 5
TATSLAD                                                                    7

SEQ ID NO: 6              moltype = AA  length = 9
FEATURE                   Location/Qualifiers
REGION                    1..9
                          note = VL LCDR3
source                    1..9
                          mol_type = protein
                          organism = synthetic construct
SEQUENCE: 6
```

```
QQVYSIPWT                                                                          9

SEQ ID NO: 7           moltype = AA   length = 11
FEATURE                Location/Qualifiers
REGION                 1..11
                       note = VL LCDR1
source                 1..11
                       mol_type = protein
                       organism = synthetic construct
SEQUENCE: 7
LASQPLGIWL S                                                                      11

SEQ ID NO: 8           moltype = AA   length = 11
FEATURE                Location/Qualifiers
REGION                 1..11
                       note = VL LCDR1
source                 1..11
                       mol_type = protein
                       organism = synthetic construct
SEQUENCE: 8
LASQESGIWL S                                                                      11

SEQ ID NO: 9           moltype = AA   length = 11
FEATURE                Location/Qualifiers
REGION                 1..11
                       note = VL LCDR1
source                 1..11
                       mol_type = protein
                       organism = synthetic construct
SEQUENCE: 9
LASQTIGTWL T                                                                      11

SEQ ID NO: 10          moltype = AA   length = 9
FEATURE                Location/Qualifiers
REGION                 1..9
                       note = VL LCDR3
source                 1..9
                       mol_type = protein
                       organism = synthetic construct
SEQUENCE: 10
QQVAELPFG                                                                          9

SEQ ID NO: 11          moltype = AA   length = 9
FEATURE                Location/Qualifiers
REGION                 1..9
                       note = VL LCDR3
source                 1..9
                       mol_type = protein
                       organism = synthetic construct
SEQUENCE: 11
QQVSVTPFT                                                                          9

SEQ ID NO: 12          moltype = AA   length = 11
FEATURE                Location/Qualifiers
REGION                 1..11
                       note = VL LCDR1
source                 1..11
                       mol_type = protein
                       organism = synthetic construct
SEQUENCE: 12
LASQESGIWL G                                                                      11

SEQ ID NO: 13          moltype = AA   length = 116
FEATURE                Location/Qualifiers
REGION                 1..116
                       note = heavy chain variable (VH) region
source                 1..116
                       mol_type = protein
                       organism = synthetic construct
SEQUENCE: 13
EVQLVESGGG LVQPGGSLRL SCAASGFTFS SYMMSWVRQA PGKGLEWVAT ISGGGANTYY    60
PDSVKGRFTI SRDNAKNSLY LQMNSLRAED TAVYYCARQL YYFDYWGQGT TVTVSS       116

SEQ ID NO: 14          moltype = AA   length = 107
FEATURE                Location/Qualifiers
REGION                 1..107
                       note = light chain variable (VL) region
source                 1..107
                       mol_type = protein
```

```
                            organism = synthetic construct
SEQUENCE: 14
DIQMTQSSSS LSASVGDRVT ITCLASQGIG PWLSWYQQKP GKAPKLLIYT ATSLADGVPS    60
RFSGSGSGTD FTLTISSLQP EDFATYYCQQ VYSIPWTFGG GTKVEIK                 107

SEQ ID NO: 15               moltype = AA   length = 107
FEATURE                     Location/Qualifiers
REGION                      1..107
                            note = light chain variable (VL) region
source                      1..107
                            mol_type = protein
                            organism = synthetic construct
SEQUENCE: 15
DIQMTQSPSS LSASVGDRVT ITCLASQPLG IWLSWYQQKP GKAPKLLIYT ATSLADGVPS    60
RFSGSGSGTD FTLTISSLQP EDFATYYCQQ VYSIPWTFGG GTKVEIK                 107

SEQ ID NO: 16               moltype = AA   length = 107
FEATURE                     Location/Qualifiers
REGION                      1..107
                            note = light chain variable (VL) region
source                      1..107
                            mol_type = protein
                            organism = synthetic construct
SEQUENCE: 16
DIQMTQSPSS LSASVGDRVT ITCLASQESG IWLSWYQQKP GKAPKLLIYT ATSLADGVPS    60
RFSGSGSGTD FTLTISSLQP EDFATYYCQQ VYSIPWTFGG GTKVEIK                 107

SEQ ID NO: 17               moltype = AA   length = 107
FEATURE                     Location/Qualifiers
REGION                      1..107
                            note = light chain variable (VL) region
source                      1..107
                            mol_type = protein
                            organism = synthetic construct
SEQUENCE: 17
DIQMTQSPSS LSASVGDRVT ITCLASQTIG TWLTWYQQKP GKAPKLLIYT ATSLADGVPS    60
RFSGSGSGTD FTLTISSLQP EDFATYYCQQ VAELPFGFGG GTKVEIK                 107

SEQ ID NO: 18               moltype = AA   length = 107
FEATURE                     Location/Qualifiers
REGION                      1..107
                            note = light chain variable (VL) region
source                      1..107
                            mol_type = protein
                            organism = synthetic construct
SEQUENCE: 18
DIQMTQSPSS LSASVGDRVT ITCLASQTIG TWLTWYQQKP GKAPKLLIYT ATSLADGVPS    60
RFSGSGSGTD FTLTISSLQP EDFATYYCQQ VSVTPFTFGG GTKVEIK                 107

SEQ ID NO: 19               moltype = AA   length = 107
FEATURE                     Location/Qualifiers
REGION                      1..107
                            note = light chain variable (VL) region
source                      1..107
                            mol_type = protein
                            organism = synthetic construct
SEQUENCE: 19
DIQMTQSPSS LSASVGDRVT ITCLASQGIG PWLSWYQQKP GKAPKLLIYT ATSLADGVPS    60
RFSGSGSGTD FTLTISSLQP EDFATYYCQQ VAELPFGFGG GTKVEIK                 107

SEQ ID NO: 20               moltype = AA   length = 107
FEATURE                     Location/Qualifiers
REGION                      1..107
                            note = light chain variable (VL) region
source                      1..107
                            mol_type = protein
                            organism = synthetic construct
SEQUENCE: 20
DIQMTQSPSS LSASVGDRVT ITCLASQPLG IWLSWYQQKP GKAPKLLIYT ATSLADGVPS    60
RFSGSGSGTD FTLTISSLQP EDFATYYCQQ VAELPFGFGG GTKVEIK                 107

SEQ ID NO: 21               moltype = AA   length = 107
FEATURE                     Location/Qualifiers
REGION                      1..107
                            note = light chain variable (VL) region
source                      1..107
                            mol_type = protein
                            organism = synthetic construct
SEQUENCE: 21
```

```
DIQMTQSPSS LSASVGDRVT ITCLASQESG IWLSWYQQKP GKAPKLLIYT ATSLADGVPS    60
RFSGSGSGTD FTLTISSLQP EDFATYYCQQ VAELPFGFGG GTKVEIK                107

SEQ ID NO: 22              moltype = AA  length = 107
FEATURE                    Location/Qualifiers
REGION                     1..107
                           note = light chain variable (VL) region
source                     1..107
                           mol_type = protein
                           organism = synthetic construct
SEQUENCE: 22
DIQMTQSPSS LSASVGDRVT ITCLASQGIG PWLSWYQQKP GKAPKLLIYT ATSLADGVPS    60
RFSGSGSGTD FTLTISSLQP EDFATYYCQQ VSVTPFTFGG GTKVEIK                107

SEQ ID NO: 23              moltype = AA  length = 107
FEATURE                    Location/Qualifiers
REGION                     1..107
                           note = light chain variable (VL) region
source                     1..107
                           mol_type = protein
                           organism = synthetic construct
SEQUENCE: 23
DIQMTQSPSS LSASVGDRVT ITCLASQPLG IWLSWYQQKP GKAPKLLIYT ATSLADGVPS    60
RFSGSGSGTD FTLTISSLQP EDFATYYCQQ VSVTPFTFGG GTKVEIK                107

SEQ ID NO: 24              moltype = AA  length = 107
FEATURE                    Location/Qualifiers
REGION                     1..107
                           note = light chain variable (VL) region
source                     1..107
                           mol_type = protein
                           organism = synthetic construct
SEQUENCE: 24
DIQMTQSPSS LSASVGDRVT ITCLASQESG IWLSWYQQKP GKAPKLLIYT ATSLADGVPS    60
RFSGSGSGTD FTLTISSLQP EDFATYYCQQ VSVTPFTFGG GTKVEIK                107

SEQ ID NO: 25              moltype = AA  length = 327
FEATURE                    Location/Qualifiers
source                     1..327
                           mol_type = protein
                           organism = Homo sapiens
SEQUENCE: 25
ASTKGPSVFP LAPCSRSTSE STAALGCLVK DYFPEPVTVS WNSGALTSGV HTFPAVLQSS    60
GLYSLSSVVT VPSSSLGTKT YTCNVDHKPS NTKVDKRVES KYGPPCPSCP APEFLGGPSV   120
FLFPPKPKDT LMISRTPEVT CVVVDVSQED PEVQFNWYVD GVEVHNAKTK PREEQFNSTY   180
RVVSVLTVLH QDWLNGKEYK CKVSNKGLPS SIEKTISKAK GQPREPQVYT LPPSQEEMTK   240
NQVSLTCLVK GFYPSDIAVE WESNGQPENN YKTTPPVLDS DGSFFLYSRL TVDKSRWQEG   300
NVFSCSVMHE ALHNHYTQKS LSLSLGK                                      327

SEQ ID NO: 26              moltype = AA  length = 327
FEATURE                    Location/Qualifiers
REGION                     1..327
                           note = Human IgG4(S228P) antibody Fc region
source                     1..327
                           mol_type = protein
                           organism = synthetic construct
SEQUENCE: 26
ASTKGPSVFP LAPCSRSTSE STAALGCLVK DYFPEPVTVS WNSGALTSGV HTFPAVLQSS    60
GLYSLSSVVT VPSSSLGTKT YTCNVDHKPS NTKVDKRVES KYGPPCPPCP APEFLGGPSV   120
FLFPPKPKDT LMISRTPEVT CVVVDVSQED PEVQFNWYVD GVEVHNAKTK PREEQFNSTY   180
RVVSVLTVLH QDWLNGKEYK CKVSNKGLPS SIEKTISKAK GQPREPQVYT LPPSQEEMTK   240
NQVSLTCLVK GFYPSDIAVE WESNGQPENN YKTTPPVLDS DGSFFLYSRL TVDKSRWQEG   300
NVFSCSVMHE ALHNHYTQKS LSLSLGK                                      327

SEQ ID NO: 27              moltype = AA  length = 330
FEATURE                    Location/Qualifiers
source                     1..330
                           mol_type = protein
                           organism = Homo sapiens
SEQUENCE: 27
ASTKGPSVFP LAPSSKSTSG GTAALGCLVK DYFPEPVTVS WNSGALTSGV HTFPAVLQSS    60
GLYSLSSVVT VPSSSLGTQT YICNVNHKPS NTKVDKKVEP KSCDKTHTCP PCPAPELLGG   120
PSVFLFPPKP KDTLMISRTP EVTCVVVDVS HEDPEVKFNW YVDGVEVHNA KTKPREEQYN   180
STYRVVSVLT VLHQDWLNGK EYKCKVSNKA LPAPIEKTIS KAKGQPREPQ VYTLPPSRDE   240
LTKNQVSLTC LVKGFYPSDI AVEWESNGQP ENNYKTTPPV LDSDGSFFLY SKLTVDKSRW   300
QQGNVFSCSV MHEALHNHYT QKSLSLSPGK                                   330

SEQ ID NO: 28              moltype = AA  length = 330
FEATURE                    Location/Qualifiers
```

| | | |
|---|---|---|
| REGION | 1..330 | |
| | note = Human IgG1-3M antibody Fc region | |
| source | 1..330 | |
| | mol_type = protein | |
| | organism = synthetic construct | |

SEQUENCE: 28
```
ASTKGPSVFP LAPSSKSTSG GTAALGCLVK DYFPEPVTVS WNSGALTSGV HTFPAVLQSS  60
GLYSLSSVVT VPSSSLGTQT YICNVNHKPS NTKVDKKVEP KSCDKTHTCP PCPAPEAAGA 120
PSVFLFPPKP KDTLMISRTP EVTCVVVDVS HEDPEVKFNW YVDGVEVHNA KTKPREEQYN 180
STYRVVSVLT VLHQDWLNGK EYKCKVSNKA LPAPIEKTIS KAKGQPREPQ VYTLPPSRDE 240
LTKNQVSLTC LVKGFYPSDI AVEWESNGQP ENNYKTTPPV LDSDGSFFLY SKLTVDKSRW 300
QQGNVFSCSV MHEALHNHYT QKSLSLSPGK                                 330
```

| | | |
|---|---|---|
| SEQ ID NO: 29 | moltype = AA  length = 326 | |
| FEATURE | Location/Qualifiers | |
| source | 1..326 | |
| | mol_type = protein | |
| | organism = Homo sapiens | |

SEQUENCE: 29
```
ASTKGPSVFP LAPCSRSTSE STAALGCLVK DYFPEPVTVS WNSGALTSGV HTFPAVLQSS  60
GLYSLSSVVT VPSSNFGTQT YTCNVDHKPS NTKVDKTVER KCCVECPPCP APPVAGPSVF 120
LFPPKPKDTL MISRTPEVTC VVVDVSHEDP EVQFNWYVDG VEVHNAKTKP REEQFNSTFR 180
VVSVLTVVHQ DWLNGKEYKC KVSNKGLPAP IEKTISKTKG QPREPQVYTL PPSREEMTKN 240
QVSLTCLVKG FYPSDISVEW ESNGQPENNY KTTPPMLDSD GSFFLYSKLT VDKSRWQQGN 300
VFSCSVMHEA LHNHYTQKSL SLSPGK                                     326
```

| | | |
|---|---|---|
| SEQ ID NO: 30 | moltype = AA  length = 330 | |
| FEATURE | Location/Qualifiers | |
| source | 1..330 | |
| | mol_type = protein | |
| | organism = Homo sapiens | |

SEQUENCE: 30
```
ASTKGPSVFP LAPSSKSTSG GTAALGCLVK DYFPEPVTVS WNSGALTSGV HTFPAVLQSS  60
GLYSLSSVVT VPSSSLGTQT YICNVNHKPS NTKVDKKVEP KSCDKTHTCP PCPAPELLGG 120
PSVFLFPPKP KDTLMISRTP EVTCVVVDVS HEDPEVKFNW YVDGVEVHNA KTKPREEQYN 180
STYRVVSVLT VLHQDWLNGK EYKCKVSNKA LPAPIEKTIS KAKGQPREPQ VYTLPPSREE 240
MTKNQVSLTC LVKGFYPSDI AVEWESNGQP ENNYKTTPPV LDSDGSFFLY SKLTVDKSRW 300
QQGNVFSCSV MHEALHNHYT QKSLSLSPGK                                 330
```

| | | |
|---|---|---|
| SEQ ID NO: 31 | moltype = AA  length = 329 | |
| FEATURE | Location/Qualifiers | |
| REGION | 1..329 | |
| | note = IgG1-3M REEM allotype antibody Fc region | |
| source | 1..329 | |
| | mol_type = protein | |
| | organism = synthetic construct | |

SEQUENCE: 31
```
ASTKGPSVFP LAPSSKSTSG GTAALGCLVK DYFPEPVTVS WNSGALTSGV HTFPAVLQSS  60
GLYSLSSVVT VPSSSLGTQT YICNVNHKPS NTKVDKKVEP KSCDKTHTCP PCPAPEAAGA 120
PSVFLFPPKP KDTLMISRTP EVTCVVVDVS HEDPEVKFNW YVDGVEVHNA KTKPREEQYN 180
STYRVVSVLT VLHQDWLNGK EYKCKVSNKA LPAPIEKTIS KAKGQPREPQ VYTLPPSREE 240
MKNQVSLTCL VKGFYPSDIA VEWESNGQPE NNYKTTPPVL DSDGSFFLYS KLTVDKSRWQ 300
QGNVFSCSVM HEALHNHYTQ KSLSLSPGK                                  329
```

| | | |
|---|---|---|
| SEQ ID NO: 32 | moltype = AA  length = 288 | |
| FEATURE | Location/Qualifiers | |
| source | 1..288 | |
| | mol_type = protein | |
| | organism = Homo sapiens | |

SEQUENCE: 32
```
MQIPQAPWPV VWAVLQLGWR PGWFLDSPDR PWNPPTFSPA LLVVTEGDNA TFTCSFSNTS  60
ESFVLNWYRM SPSNQTDKLA AFPEDRSQPG QDCRFRVTQL PNGRDFHMSV VRARRNDSGT 120
YLCGAISLAP KAQIKESLRA ELRVTERRAE VPTAHPSPSP RPAGQFQTLV VGVVGGLLGS 180
LVLLVWVLAV ICSRAARGTI GARRTGQPLK EDPSAVPVFS VDYGELDFQW REKTPEPPVP 240
CVPEQTEYAT IVFPSGMGTS SPARRGSADG PRSAQPLRPE DGHCSWPL             288
```

| | | |
|---|---|---|
| SEQ ID NO: 33 | moltype = AA  length = 288 | |
| FEATURE | Location/Qualifiers | |
| source | 1..288 | |
| | mol_type = protein | |
| | organism = Macaca fascicularis | |

SEQUENCE: 33
```
MQIPQAPWPV VWAVLQLGWR PGWFLESPDR PWNAPTFSPA LLLVTEGDNA TFTCSFSNAS  60
ESFVLNWYRM SPSNQTDKLA AFPEDRSQPG QDCRFRVTRL PNGRDFHMSV VRARRNDSGT 120
YLCGAISLAP KAQIKESLRA ELRVTERRAE VPTAHPSPSP RPAGQFQALV VGVVGGLLGS 180
LVLLVWVLAV ICSRAAQGTI EARRTGQPLK EDPSAVPVFS VDYGELDFQW REKTPEPPAP 240
CVPEQTEYAT IVFPSGLGTS SPARRGSADG PRSPRPLRPE DGHCSWPL             288
```

| | | |
|---|---|---|
| SEQ ID NO: 34 | moltype = AA  length = 1356 | |

```
FEATURE                 Location/Qualifiers
source                  1..1356
                        mol_type = protein
                        organism = Homo sapiens
SEQUENCE: 34
MQSKVLLAVA LWLCVETRAA SVGLPSVSLD LPRLSIQKDI LTIKANTTLQ ITCRGQRDLD    60
WLWPNNQSGS EQRVEVTECS DGLFCKTLTI PKVIGNDTGA YKCFYRETDL ASVIYVYVQD   120
YRSPFIASVS DQHGVVYITE NKNKTVVIPC LGSISNLNVS LCARYPEKRF VPDGNRISWD   180
SKKGFTIPSY MISYAGMVFC EAKINDESYQ SIMYIVVVVG YRIYDVVLSP SHGIELSVGE   240
KLVLNCTART ELNVGIDFNW EYPSSKHQHK KLVNRDLKTQ SGSEMKKFLS TLTIDGVTRS   300
DQGLYTCAAS SGLMTKKNST FVRVHEKPFV AFGSGMESLV EATVGERVRI PAKYLGYPPP   360
EIKWYKNGIP LESNHTIKAG HVLTIMEVSE RDTGNYTVIL TNPISKEKQS HVVSLVVYVP   420
PQIGEKSLIS PVDSYQYGTT QTLTCTVYAI PPPHHIHYWW QLEEECANEP SQAVSVTNPY   480
PCEEWRSVED FQGGNKIEVN KNQFALIEGK NKTVSTLVIQ AANVSALYKC EAVNKVGRGE   540
RVISFHVTRG PEITLQPDMQ PTEQESVSLW CTADRSTFEN LTWYKLGQPQ LPIHVGELPT   600
PVCKNLDTLW KLNATMFSNS TNDILIMELK NASLQDGGDY VCLAQDRKTK KRHCVVRQLT   660
VLERVAPTIT GNLENQTTSI GESIEVSCTA SGNPPPQIMQ FKDNETLVED SGIVLKDGNR   720
NLTIRRVRKE DEGLYTCQAC SVLGCAKVEA FFIIEGAQEK TNLEIIILVG TAVIAMFFWL   780
LLVIILRTVK RANGGELKTG YLSIVMDPDE LPLDEHCERL PYDASKWEFP RDRLKLGKPL   840
GRGAFGQVIE ADAFGIDKTA TCRTVAVKML KEGATHSEHR ALMSELKILI HIGHHLNVVN   900
LLGACTKPGG PLMVIVEFCK FGNLSTYLRS KRNEFVPYKT KGARFRQGKD YVGAIPVDLK   960
RRLDSITSSQ SSASSGFVEE KSLSDVEEEE APEDLYKDFL TLEHLICYSF QVAKGMEFLA  1020
SRKCIHRDLA ARNILLSEKN VVKICDFGLA RDIYKDPDYV RKGDARLPLK WMAPETIFDR  1080
VYTIQSDVWS FGVLLWEIFS LGASPYPGVK IDEEFCRRLK EGTRMRAPDY TTPEMYQTML  1140
DCWHGEPSQR PTFSELVEHL GNLLQANAQQ DGKDYIVLPI SETLSMEEDS GLSLPTSPVS  1200
CMEEEEVCDP KFHYDNTAGI SQYLQNSKRK SRPVSVKTFE DIPLEEPEVK VIPDDNQTDS  1260
GMVLASEELK TLEDRTKLSP SFGGMVPSKS RESVASEGSN QTSGYQSGYH SDDTDTTVYS  1320
SEEAELLKLI EIGVQTGSTA QILQPDSGTT LSSPPV                            1356

SEQ ID NO: 35           moltype = AA  length = 1356
FEATURE                 Location/Qualifiers
source                  1..1356
                        mol_type = protein
                        organism = Macaca mulatta
SEQUENCE: 35
MASKVLLAVA LWLCVETRAA SVGLPSVSLD LPRLSIQKDI LTIKANTTLQ ITCRGQRDLD    60
WLWPNNQSGS EQRVEVTECS DGLFCKTLTI PKVIGNDTGA YKCFYRETDL ASVIYVYVQD   120
YRSPFIASVS DQHGVVYITE NKNKTVVIPC LGSISNLNVS LCARYPEKRF VPDGNRISWD   180
SKKGFTIPSY MISYAGMVFC EAKINDESYQ SIMYIVVVVG YRIYDVVLSP SHGVELSVGE   240
KLVLNCTART ELNVGIDFNW EYPSSKHQHK KLVNRDLKTQ SGSEMKKFLS TLTIDGVTRS   300
DQGLYTCAAS SGLMTKKNST FVRVHEKPFV AFGSGMESLV EATVGERVRI PVKYLGYPPP   360
EIKWYKNGIP LESNHTVKAG HVLTIMEVSE RDTGNYTVIL TNPISKEKQS HVVSLVVYVP   420
PQIGEKSLIS PVDSYQYGTT QTLTCTVYAI PPPHHIHYWW QLEEECPNEP SQAVSVTNPY   480
PCEEWRSVED FQGGNKIEVN KNQFALIEGK NKTVSTLVIQ AANVSALYKC EAVNKVGRGE   540
RVISFHVTRG PEITLQPDLQ PTEQESVSLW CTADKSTFEN LTWYKLGQPQ LPVHVGELPT   600
PVCKNLDTLW KLNATIFSNS TNDILIMELK NASLQDGGDY VCVAQDRKTK KRHCVVRQLT   660
VLERVAPMIT GNLENQTTSI GETIEVSCTA SGNPPPQIMQ FKDNETLVED SGIVLKDGNR   720
NLTIRRVRKE DEGLYTCQAC SVLGCAKVEA FFIIEGAQEK TNLEIIILVG TAVIAMFFWL   780
LLVIILRTVK RANGGELKTG YLSIVMDPDE LPLDEHCERL PYDASKWEFP RDRLKLGKPL   840
GRGAFGQVIE ADAFGIDKTA TCRTVAVKML KEGATHSEHR ALMSELKILI HIGHHLNVVN   900
LLGACTKPGG PLMVIVEFCK FGNLSTYLRS KRNEFVPYKT KGARFRQGKD YVGAIPVDLK   960
RRLDSITSSQ SSASSGFVEE KSLSDVEEEE APEDLYKDFL TLEHLICYSF QVAKGMEFLA  1020
SRKCIHRDLA ARNILLSEKN VVKICDFGLA RDIYKDPDYV RKGDARLPLK WMAPETIFDR  1080
VYTIQSDVWS FGVLLWEIFS LGASPYPGVK IDEEFCRRLK EGTRMRAPDY TTPEMYQTML  1140
DCWHGEPSQR PTFSELVEHL GNLLQANAQQ DGKDYIVLPI SETLSMEEDS GLSLPTSPVS  1200
CMEEEEVCDP KFHYDNTAGI SQYLQNSKRK SRPVSVKTFE DIPLEEPEVK VIPDDNQTDS  1260
GMVLASEELK TLEDRTKLAP SFSGMVSSKS RESVASEGSN QTSGYQSGYH SDDTDTTVYS  1320
SEEAELLKLI EIGVQTGSTA QILQPDSGTT LSSPPV                            1356

SEQ ID NO: 36           moltype = AA  length = 5
FEATURE                 Location/Qualifiers
REGION                  1..5
                        note = immunoglobulin constant region motif
source                  1..5
                        mol_type = protein
                        organism = unidentified
SEQUENCE: 36
RDELT                                                                 5

SEQ ID NO: 37           moltype = AA  length = 4
FEATURE                 Location/Qualifiers
REGION                  1..4
                        note = immunoglobulin constant region motif
source                  1..4
                        mol_type = protein
                        organism = unidentified
SEQUENCE: 37
REEM                                                                  4
```

```
SEQ ID NO: 38             moltype = AA   length = 17
FEATURE                   Location/Qualifiers
REGION                    1..17
                          note = VH HCDR2
source                    1..17
                          mol_type = protein
                          organism = synthetic construct
SEQUENCE: 38
TISGGGANTY YVDSVKG                                                    17

SEQ ID NO: 39             moltype = AA   length = 11
FEATURE                   Location/Qualifiers
REGION                    1..11
                          note = VL LCDR1
source                    1..11
                          mol_type = protein
                          organism = synthetic construct
SEQUENCE: 39
RASQESGIWL S                                                          11

SEQ ID NO: 40             moltype = AA   length = 7
FEATURE                   Location/Qualifiers
REGION                    1..7
                          note = VL LCDR2
source                    1..7
                          mol_type = protein
                          organism = synthetic construct
SEQUENCE: 40
TASSLAD                                                               7

SEQ ID NO: 41             moltype = AA   length = 7
FEATURE                   Location/Qualifiers
REGION                    1..7
                          note = VL LCDR2
source                    1..7
                          mol_type = protein
                          organism = synthetic construct
SEQUENCE: 41
AASSLAD                                                               7

SEQ ID NO: 42             moltype = AA   length = 17
FEATURE                   Location/Qualifiers
REGION                    1..17
                          note = VH HCDR2
source                    1..17
                          mol_type = protein
                          organism = synthetic construct
SEQUENCE: 42
TISGGGSNKY YVDSVKG                                                    17

SEQ ID NO: 43             moltype = AA   length = 7
FEATURE                   Location/Qualifiers
REGION                    1..7
                          note = VL LCDR2
source                    1..7
                          mol_type = protein
                          organism = synthetic construct
SEQUENCE: 43
AASSLQS                                                               7

SEQ ID NO: 44             moltype = AA   length = 107
FEATURE                   Location/Qualifiers
REGION                    1..107
                          note = light chain variable (VL) region
source                    1..107
                          mol_type = protein
                          organism = synthetic construct
SEQUENCE: 44
DIQMTQSPSS LSASVGDRVT ITCRASQESG IWLSWYQQKP GKAPKLLIYT ATSLADGVPS      60
RFSGSGSGTD FTLTISSLQP EDFATYYCQQ VSVTPFTFGG GTKVEIK                   107

SEQ ID NO: 45             moltype = AA   length = 107
FEATURE                   Location/Qualifiers
REGION                    1..107
                          note = light chain variable (VL) region
source                    1..107
                          mol_type = protein
                          organism = synthetic construct
SEQUENCE: 45
```

```
DIQMTQSPSS LSASVGDRVT ITCRASQESG IWLSWYQQKP GKAPKLLIYT ASSLADGVPS    60
RFSGSGSGTD FTLTISSLQP EDFATYYCQQ VSVTPFTFGG GTKVEIK                107

SEQ ID NO: 46           moltype = AA  length = 107
FEATURE                 Location/Qualifiers
REGION                  1..107
                        note = light chain variable (VL) region
source                  1..107
                        mol_type = protein
                        organism = synthetic construct
SEQUENCE: 46
DIQMTQSPSS LSASVGDRVT ITCRASQESG IWLSWYQQKP GKAPKLLIYA ASSLADGVPS    60
RFSGSGSGTD FTLTISSLQP EDFATYYCQQ VSVTPFTFGG GTKVEIK                107

SEQ ID NO: 47           moltype = AA  length = 107
FEATURE                 Location/Qualifiers
REGION                  1..107
                        note = light chain variable (VL) region
source                  1..107
                        mol_type = protein
                        organism = synthetic construct
SEQUENCE: 47
DIQMTQSPSS LSASVGDRVT ITCRASQESG IWLSWYQQKP GKAPKLLIYA ASSLQSGVPS    60
RFSGSGSGTD FTLTISSLQP EDFATYYCQQ VSVTPFTFGG GTKVEIK                107

SEQ ID NO: 48           moltype = AA  length = 116
FEATURE                 Location/Qualifiers
REGION                  1..116
                        note = heavy chain variable (VH) region
source                  1..116
                        mol_type = protein
                        organism = synthetic construct
SEQUENCE: 48
EVQLVESGGG LVQPGGSLRL SCAASGFTFS SYMMSWVRQA PGKGLEWVAT ISGGGANTYY    60
VDSVKGRFTI SRDNAKNSLY LQMNSLRAED TAVYYCARQL YYFDYWGQGT TVTVSS      116

SEQ ID NO: 49           moltype = AA  length = 116
FEATURE                 Location/Qualifiers
REGION                  1..116
                        note = heavy chain variable (VH) region
source                  1..116
                        mol_type = protein
                        organism = synthetic construct
SEQUENCE: 49
EVQLVESGGG LVQPGGSLRL SCAASGFTFS SYMMSWVRQA PGKGLEWVAT ISGGGSNKYY    60
VDSVKGRFTI SRDNAKNSLY LQMNSLRAED TAVYYCARQL YYFDYWGQGT TVTVSS      116

SEQ ID NO: 50           moltype = AA  length = 23
FEATURE                 Location/Qualifiers
REGION                  1..23
                        note = VL LFR1
source                  1..23
                        mol_type = protein
                        organism = synthetic construct
SEQUENCE: 50
DIQMTQSPSS LSASVGDRVT ITC                                           23

SEQ ID NO: 51           moltype = AA  length = 15
FEATURE                 Location/Qualifiers
REGION                  1..15
                        note = VL LFR2
source                  1..15
                        mol_type = protein
                        organism = synthetic construct
SEQUENCE: 51
WYQQKPGKAP KLLIY                                                    15

SEQ ID NO: 52           moltype = AA  length = 32
FEATURE                 Location/Qualifiers
REGION                  1..32
                        note = VL LFR3
source                  1..32
                        mol_type = protein
                        organism = synthetic construct
SEQUENCE: 52
GVPSRFSGSG SGTDFTLTIS SLQPEDFATY YC                                 32

SEQ ID NO: 53           moltype = AA  length = 10
FEATURE                 Location/Qualifiers
```

|   |   |   |
|---|---|---|
| REGION | 1..10 | |
| | note = VL LFR4 | |
| source | 1..10 | |
| | mol_type = protein | |
| | organism = synthetic construct | |
| SEQUENCE: 53 | | |
| FGGGTKVEIK | | 10 |
| | | |
| SEQ ID NO: 54 | moltype = AA  length = 25 | |
| FEATURE | Location/Qualifiers | |
| REGION | 1..25 | |
| | note = VH HFR1 | |
| source | 1..25 | |
| | mol_type = protein | |
| | organism = synthetic construct | |
| SEQUENCE: 54 | | |
| EVQLVESGGG LVQPGGSLRL SCAAS | | 25 |
| | | |
| SEQ ID NO: 55 | moltype = AA  length = 12 | |
| FEATURE | Location/Qualifiers | |
| REGION | 1..12 | |
| | note = VH HFR2 | |
| source | 1..12 | |
| | mol_type = protein | |
| | organism = synthetic construct | |
| SEQUENCE: 55 | | |
| WVRQAPGKGL EW | | 12 |
| | | |
| SEQ ID NO: 56 | moltype = AA  length = 19 | |
| FEATURE | Location/Qualifiers | |
| REGION | 1..19 | |
| | note = VH HCDR2 | |
| source | 1..19 | |
| | mol_type = protein | |
| | organism = synthetic construct | |
| SEQUENCE: 56 | | |
| VATISGGGAN TYYPDSVKG | | 19 |
| | | |
| SEQ ID NO: 57 | moltype = AA  length = 32 | |
| FEATURE | Location/Qualifiers | |
| REGION | 1..32 | |
| | note = VH HFR3 | |
| source | 1..32 | |
| | mol_type = protein | |
| | organism = synthetic construct | |
| SEQUENCE: 57 | | |
| RFTISRDNAK NSLYLQMNSL RAEDTAVYYC AR | | 32 |
| | | |
| SEQ ID NO: 58 | moltype = AA  length = 11 | |
| FEATURE | Location/Qualifiers | |
| REGION | 1..11 | |
| | note = VH HFR4 | |
| source | 1..11 | |
| | mol_type = protein | |
| | organism = synthetic construct | |
| SEQUENCE: 58 | | |
| WGQGTTVTVS S | | 11 |
| | | |
| SEQ ID NO: 59 | moltype = AA  length = 11 | |
| FEATURE | Location/Qualifiers | |
| REGION | 1..11 | |
| | note = VL LCDR1 | |
| VARIANT | 5 | |
| | note = X is Thr, Glu, Gly, Lys, Pro or Ser | |
| VARIANT | 6 | |
| | note = X is Ile, Ala, Leu, Ser or Val | |
| VARIANT | 7 | |
| | note = X is Gly, Arg or Ser | |
| VARIANT | 8 | |
| | note = X is Thr, Gly, Ile, Leu or Pro | |
| VARIANT | 11 | |
| | note = X is Thr or Ser | |
| source | 1..11 | |
| | mol_type = protein | |
| | organism = synthetic construct | |
| SEQUENCE: 59 | | |
| LASQXXXXWL X | | 11 |
| | | |
| SEQ ID NO: 60 | moltype = AA  length = 9 | |

```
FEATURE                 Location/Qualifiers
REGION                  1..9
                        note = VL LCDR3
VARIANT                 4
                        note = X is Tyr, Ala, Phe, Asn or Ser
VARIANT                 5
                        note = X is Ser, Ala, Glu, Met, Asn, Gln or Val
VARIANT                 6
                        note = X is Ile, Leu, Thr or Val
VARIANT                 8
                        note = X is Trp or Phe
VARIANT                 9
                        note = X is Thr, Ala, Gly, Asn, Arg or Ser
source                  1..9
                        mol_type = protein
                        organism = synthetic construct
SEQUENCE: 60
QQVXXXPXX                                                                    9

SEQ ID NO: 61           moltype = AA  length = 10
FEATURE                 Location/Qualifiers
REGION                  1..10
                        note = VH HCDR1
source                  1..10
                        mol_type = protein
                        organism = synthetic construct
SEQUENCE: 61
GFTFSSYLMS                                                                  10

SEQ ID NO: 62           moltype = AA  length = 7
FEATURE                 Location/Qualifiers
REGION                  1..7
                        note = VH HCDR3
source                  1..7
                        mol_type = protein
                        organism = synthetic construct
SEQUENCE: 62
QLYFFDY                                                                      7

SEQ ID NO: 63           moltype = AA  length = 7
FEATURE                 Location/Qualifiers
REGION                  1..7
                        note = VH HCDR3
source                  1..7
                        mol_type = protein
                        organism = synthetic construct
SEQUENCE: 63
QLYYYDY                                                                      7

SEQ ID NO: 64           moltype = AA  length = 7
FEATURE                 Location/Qualifiers
REGION                  1..7
                        note = VH HCDR3
source                  1..7
                        mol_type = protein
                        organism = synthetic construct
SEQUENCE: 64
QVYYFDY                                                                      7

SEQ ID NO: 65           moltype = AA  length = 7
FEATURE                 Location/Qualifiers
REGION                  1..7
                        note = VH HCDR3
source                  1..7
                        mol_type = protein
                        organism = synthetic construct
SEQUENCE: 65
QLYGFDY                                                                      7

SEQ ID NO: 66           moltype = AA  length = 7
FEATURE                 Location/Qualifiers
REGION                  1..7
                        note = VH HCDR3
source                  1..7
                        mol_type = protein
                        organism = synthetic construct
SEQUENCE: 66
QLYYADY                                                                      7
```

```
SEQ ID NO: 67          moltype = AA   length = 116
FEATURE                Location/Qualifiers
REGION                 1..116
                       note = heavy chain variable (VH) region
source                 1..116
                       mol_type = protein
                       organism = synthetic construct
SEQUENCE: 67
EVQLVESGGG LVQPGGSLRL SCAASGFTFS SYLMSWVRQA PGKGLEWVAT ISGGGSNKYY    60
VDSVKGRFTI SRDNAKNSLY LQMNSLRAED TAVYYCARQL YYFDYWGQGT TVTVSS       116

SEQ ID NO: 68          moltype = AA   length = 116
FEATURE                Location/Qualifiers
REGION                 1..116
                       note = heavy chain variable (VH) region
source                 1..116
                       mol_type = protein
                       organism = synthetic construct
SEQUENCE: 68
EVQLVESGGG LVQPGGSLRL SCAASGFTFS SYLMSWVRQA PGKGLEWVAT ISGGGSNKYY    60
VDSVKGRFTI SRDNAKNSLY LQMNSLRAED TAVYYCARQV YYFDYWGQGT TVTVSS       116

SEQ ID NO: 69          moltype = AA   length = 116
FEATURE                Location/Qualifiers
REGION                 1..116
                       note = heavy chain variable (VH) region
source                 1..116
                       mol_type = protein
                       organism = synthetic construct
SEQUENCE: 69
EVQLVESGGG LVQPGGSLRL SCAASGFTFS SYLMSWVRQA PGKGLEWVAT ISGGGSNKYY    60
VDSVKGRFTI SRDNAKNSLY LQMNSLRAED TAVYYCARQL YGFDYWGQGT TVTVSS       116

SEQ ID NO: 70          moltype = AA   length = 116
FEATURE                Location/Qualifiers
REGION                 1..116
                       note = heavy chain variable (VH) region
source                 1..116
                       mol_type = protein
                       organism = synthetic construct
SEQUENCE: 70
EVQLVESGGG LVQPGGSLRL SCAASGFTFS SYLMSWVRQA PGKGLEWVAT ISGGGSNKYY    60
VDSVKGRFTI SRDNAKNSLY LQMNSLRAED TAVYYCARQL YYADYWGQGT TVTVSS       116

SEQ ID NO: 71          moltype = AA   length = 116
FEATURE                Location/Qualifiers
REGION                 1..116
                       note = heavy chain variable (VH) region
source                 1..116
                       mol_type = protein
                       organism = synthetic construct
SEQUENCE: 71
EVQLVESGGG LVQPGGSLRL SCAASGFTFS SYLMSWVRQA PGKGLEWVAT ISGGGSNKYY    60
VDSVKGRFTI SRDNAKNSLY LQMNSLRAED TAVYYCARQL YFFDYWGQGT TVTVSS       116

SEQ ID NO: 72          moltype = AA   length = 116
FEATURE                Location/Qualifiers
REGION                 1..116
                       note = heavy chain variable (VH) region
source                 1..116
                       mol_type = protein
                       organism = synthetic construct
SEQUENCE: 72
EVQLVESGGG LVQPGGSLRL SCAASGFTFS SYLMSWVRQA PGKGLEWVAT ISGGGSNKYY    60
VDSVKGRFTI SRDNAKNSLY LQMNSLRAED TAVYYCARQL YYYDYWGQGT TVTVSS       116

SEQ ID NO: 73          moltype = AA   length = 116
FEATURE                Location/Qualifiers
REGION                 1..116
                       note = heavy chain variable (VH) region
source                 1..116
                       mol_type = protein
                       organism = synthetic construct
SEQUENCE: 73
EVQLVESGGG LVQPGGSLRL SCAASGFTFS SYMMSWVRQA PGKGLEWVAT ISGGGSNKYY    60
VDSVKGRFTI SRDNAKNSLY LQMNSLRAED TAVYYCARQV YYFDYWGQGT TVTVSS       116

SEQ ID NO: 74          moltype = AA   length = 116
FEATURE                Location/Qualifiers
```

```
                        -continued
REGION              1..116
                    note = heavy chain variable (VH) region
source              1..116
                    mol_type = protein
                    organism = synthetic construct
SEQUENCE: 74
EVQLVESGGG LVQPGGSLRL SCAASGFTFS SYMMSWVRQA PGKGLEWVAT ISGGGSNKYY  60
VDSVKGRFTI SRDNAKNSLY LQMNSLRAED TAVYYCARQL YYADYWGQGT TVTVSS     116

SEQ ID NO: 75       moltype = AA   length = 116
FEATURE             Location/Qualifiers
REGION              1..116
                    note = heavy chain variable (VH) region
source              1..116
                    mol_type = protein
                    organism = synthetic construct
SEQUENCE: 75
EVQLVESGGG LVQPGGSLRL SCAASGFTFS SYMMSWVRQA PGKGLEWVAT ISGGGSNKYY  60
VDSVKGRFTI SRDNAKNSLY LQMNSLRAED TAVYYCARQL YYYDYWGQGT TVTVSS     116
```

PD1 AND VEGFR2 DUAL-BINDING AGENTS

CROSS-REFERENCE TO RELATED APPLICATIONS

This application is a divisional of U.S. application Ser. No. 17/768,013, filed Apr. 11, 2022, which is U.S. National Stage Application under 35 U.S.C. § 371 of International Application No. PCT/EP2020/078427, filed Oct. 9, 2020, which claims the benefit of GB Patent Application No. 2013180.1, filed on Aug. 24, 2020, and GB Patent Application No. 1914747.9, filed on Oct. 11, 2019, the disclosure of each of which is hereby incorporated by reference in its entirety.

REFERENCE TO AN ELECTRONIC SEQUENCE LISTING

The contents of the electronic sequence listing (UHEL_002_03US_SeqList_ST26.xml; Size: 103,533 bytes; and Date of Creation: Jan. 16, 2025) are herein incorporated by reference in their entirety.

FIELD OF THE INVENTION

The invention relates to antibody molecules binding specifically to both PD1 (also known as Programmed cell death 1, PDCD1, CD279, PD-1, SLEB2, PD-I, SLE1) and VEGFR2 (also known as KDR, CD309, FLK1, Kinase insert domain receptor) and medical uses thereof.

BACKGROUND OF THE INVENTION

PD1 is a cell surface receptor which has been shown to be an immune "checkpoint" mediator. PD1 checkpoint activity minimises autoimmunity risk by promoting apoptosis (programmed cell death) in lymph node-resident T cells that are reactive to self-antigens and by promoting the survival of regulatory (anti-inflammatory) T cells. The antagonism of PD1 activity by human or humanized monoclonal antibodies has proven to be a successful therapeutic approach to the treatment of multiple forms of cancer, as it can lead to the re-activation of T cells in the tumour. This clinical success has led to the proliferation of anti-PD1 antibody molecules being examined in clinical trials, but the majority of patients still do not mount a durable anti-cancer response when treated with anti-PD1 agents alone.

To increase the number of patients who will respond to anti-PD1 antibody therapy is a significant challenge. A possible strategy to improve clinical response rates to anti-PD1 antibodies is to combine them with previously-proven cancer therapies such as anti-angiogenic agents. One such class of agents is antibodies that block the VEGF signalling pathway, such as anti-VEGFR2 or anti-VEGF antibodies. However, such combination therapies require the use of two separate, costly agents that each have their own toxicity risks. There remains a need for a single agent that provides the benefits of combination therapy without the disadvantages of combining two separate agents.

SUMMARY OF THE INVENTION

The present invention provides a number of anti-PD1 and anti-VEGFR2 dual-antagonistic antibodies and medical uses thereof.

According to one aspect of the invention, there is provided an antibody molecule which specifically binds to human PD1 and human VEGFR2, and optionally also to cynomolgus PD1 and cynomolgus VEGFR2, or an antigen-binding portion thereof.

In some aspects, the invention provides an antibody that binds specifically to both PD1 and VEGFR2 or an antigen-binding portion of the antibody, wherein the antibody comprises a heavy chain variable (VH) region and a light chain variable (VL) region, wherein (a) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QLYYFDY (SEQ ID NO: 3); and the VL region amino acid sequence comprises LCDR1 of RASQESGIWLS (SEQ ID NO: 39), LCDR2 of TATSLAD (SEQ ID NO: 5) and LCDR3 of QQVSVTPFT (SEQ ID NO: 11);

(b) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QLYYFDY (SEQ ID NO: 3); and the VL region amino acid sequence comprises LCDR1 of RASQESGIWLS (SEQ ID NO: 39), LCDR2 of AASSLQS (SEQ ID NO: 43) and LCDR3 of QQVSVTPFT (SEQ ID NO: 11);

(c) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQESGIWLS (SEQ ID NO: 8), LCDR2 of TATSLAD (SEQ ID NO: 5) and LCDR3 of QQVSVTPFT (SEQ ID NO: 11);

(d) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQGIGPWLS (SEQ ID NO: 4), LCDR2 of TATSLAD (SEQ ID NO: 5) and LCDR3 of QQVYSIPWT (SEQ ID NO: 6);

(e) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQPLGIWLS (SEQ ID NO: 7), LCDR2 of TATSLAD (SEQ ID NO: 5) and LCDR3 of QQVYSIPWT (SEQ ID NO: 6);

(f) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQESGIWLS (SEQ ID NO: 8), LCDR2 of TATSLAD (SEQ ID NO: 5) and LCDR3 of QQVYSIPWT (SEQ ID NO: 6);

(g) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQTIGTWLT (SEQ ID NO: 9), LCDR2 of TATSLAD (SEQ ID NO: 5) and LCDR3 of QQVAELPFG (SEQ ID NO: 10);

(h) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQTIGTWLT (SEQ ID NO: 9), LCDR2 of TATSLAD (SEQ ID NO: 5) and LCDR3 of QQVSVTPFT (SEQ ID NO: 11);

(i) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQGIGPWLS (SEQ ID NO: 4), LCDR2 of TATSLAD (SEQ ID NO: 5) and LCDR3 of QQVAELPFG (SEQ ID NO: 10);

(j) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQPLGIWLS (SEQ ID NO: 7), LCDR2 of TATSLAD (SEQ ID NO: 5) and LCDR3 of QQVAELPFG (SEQ ID NO: 10);

(k) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQESGIWLG (SEQ ID NO: 12), LCDR2 of TATSLAD (SEQ ID NO: 5) and LCDR3 of QQVAELPFG (SEQ ID NO: 10);

(l) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQGIGPWLS (SEQ ID NO: 4), LCDR2 of TATSLAD (SEQ ID NO: 5) and LCDR3 of QQVSVTPFT (SEQ ID NO: 11);

(m) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQPLGIWLS (SEQ ID NO: 7), LCDR2 of TATSLAD (SEQ ID NO: 5) and LCDR3 of QQVSVTPFT (SEQ ID NO: 11);

(n) the VH region amino acid sequence comprises HCDR1 of GFTFSSYMMS (SEQ ID NO: 1), HCDR2 of TISGGGANTYYVDSVKG (SEQ ID NO: 38) and HCDR3 of QLYYFDY (SEQ ID NO: 3); and the VL region amino acid sequence comprises LCDR1 of RASQESGIWLS (SEQ ID NO: 39), LCDR2 of TATSLAD (SEQ ID NO: 5) and LCDR3 of QQVSVTPFT (SEQ ID NO: 11);

(o) the VH region amino acid sequence comprises HCDR1 of GFTFSSYMMS (SEQ ID NO: 1), HCDR2 of TISGGGANTYYVDSVKG (SEQ ID NO: 38) and HCDR3 of QLYYFDY (SEQ ID NO: 3); and the VL region amino acid sequence comprises LCDR1 of RASQESGIWLS (SEQ ID NO: 39), LCDR2 of TASSLAD (SEQ ID NO: 40) and LCDR3 of QQVSVTPFT (SEQ ID NO: 11);

(p) the VH region amino acid sequence comprises HCDR1 of GFTFSSYMMS (SEQ ID NO: 1), HCDR2 of TISGGGANTYYVDSVKG (SEQ ID NO: 38) and HCDR3 of QLYYFDY (SEQ ID NO: 3); and the VL region amino acid sequence comprises LCDR1 of RASQESGIWLS (SEQ ID NO: 39), LCDR2 of AASSLAD (SEQ ID NO: 41) and LCDR3 of QQVSVTPFT (SEQ ID NO: 11);

(q) the VH region amino acid sequence comprises HCDR1 of GFTFSSYMMS (SEQ ID NO: 1), HCDR2 of TISGGGANTYYVDSVKG (SEQ ID NO: 38) and HCDR3 of QLYYFDY (SEQ ID NO: 3); and the VL region amino acid sequence comprises LCDR1 of RASQESGIWLS (SEQ ID NO: 39), LCDR2 of AASSLQS (SEQ ID NO: 43) and LCDR3 of QQVSVTPFT (SEQ ID NO: 11);

(r) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QLYYFDY (SEQ ID NO: 3); and the VL region amino acid sequence comprises LCDR1 of RASQESGIWLS (SEQ ID NO: 39), LCDR2 of TASSLAD (SEQ ID NO: 40) and LCDR3 of QQVSVTPFT (SEQ ID NO: 11);

(s) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QLYYFDY (SEQ ID NO: 3); and the VL region amino acid sequence comprises LCDR1 of RASQESGIWLS (SEQ ID NO: 39), LCDR2 of AASSLAD (SEQ ID NO: 41) and LCDR3 of QQVSVTPFT (SEQ ID NO: 11); or (t) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QVYYFDY (SEQ ID NO: 64); and the VL region amino acid sequence comprises LCDR1 of RASQESGIWLS (SEQ ID NO: 39), LCDR2 of AASSLQS (SEQ ID NO: 43) and LCDR3 of QQVSVTPFT (SEQ ID NO: 11).

In some aspects, disclosed herein is an anti-PD1 antibody or an antigen-binding portion thereof, wherein the antibody comprises a heavy chain variable (VH) region and a light chain variable (VL) region, wherein the VH region amino acid sequence comprises:
(a) HCDR1 of SEQ ID NO: 1;
(b) HCDR2 of SEQ ID NO: 2, SEQ ID NO: 38, or SEQ ID NO: 42 and
(c) HCDR3 of SEQ ID NO: 3 or SEQ ID NO: 64; and the VL region amino acid sequence comprises:
(a') LCDR1 of SEQ ID NO: 4, SEQ ID NO: 7, SEQ ID NO: 8, SEQ ID NO: 9, SEQ ID NO: 12, or SEQ ID NO: 39;
(b') LCDR2 of SEQ ID NO: 5, SEQ ID NO: 40, SEQ ID NO: 41, or SEQ ID NO: 43; and
(c') LCDR3 of SEQ ID NO: 6, SEQ ID NO: 10 or SEQ ID NO: 11.

In some aspects, disclosed herein is an antibody that binds specifically to both PD1 and VEGFR2 or an antigen-binding portion of the antibody, wherein the antibody comprises a heavy chain variable (VH) region and a light chain variable (VL) region, wherein (a) the VH region amino acid sequence comprises SEQ ID NO: 49 and the VL region amino acid sequence comprises SEQ ID NO: 44;

(b) the VH region amino acid sequence comprises SEQ ID NO: 49 and the VL region amino acid sequence comprises SEQ ID NO: 47;

(c) the VH region amino acid sequence comprises SEQ ID NO: 13 and the VL region amino acid sequence comprises SEQ ID NO: 24;

(d) the VH region amino acid sequence comprises SEQ ID NO: 13 and the VL region amino acid sequence comprises SEQ ID NO: 14;
(e) the VH region amino acid sequence comprises SEQ ID NO: 13 and the VL region amino acid sequence comprises SEQ ID NO: 15;
(f) the VH region amino acid sequence comprises SEQ ID NO: 13 and the VL region amino acid sequence comprises SEQ ID NO: 16;
(g) the VH region amino acid sequence comprises SEQ ID NO: 13 and the VL region amino acid sequence comprises SEQ ID NO: 17;
(h) the VH region amino acid sequence comprises SEQ ID NO: 13 and the VL region amino acid sequence comprises SEQ ID NO: 18;
(i) the VH region amino acid sequence comprises SEQ ID NO: 13 and the VL region amino acid sequence comprises SEQ ID NO: 19;
(j) the VH region amino acid sequence comprises SEQ ID NO: 13 and the VL region amino acid sequence comprises SEQ ID NO: 20;
(k) the VH region amino acid sequence comprises SEQ ID NO: 13 and the VL region amino acid sequence comprises SEQ ID NO: 21;
(l) the VH region amino acid sequence comprises SEQ ID NO: 13 and the VL region amino acid sequence comprises SEQ ID NO: 22;
(m) the VH region amino acid sequence comprises SEQ ID NO: 13 and the VL region amino acid sequence comprises SEQ ID NO: 23;
(n) the VH region amino acid sequence comprises SEQ ID NO: 48 and the VL region amino acid sequence comprises SEQ ID NO: 44;
(o) the VH region amino acid sequence comprises SEQ ID NO: 48 and the VL region amino acid sequence comprises SEQ ID NO: 45;
(p) the VH region amino acid sequence comprises SEQ ID NO: 48 and the VL region amino acid sequence comprises SEQ ID NO: 46;
(q) the VH region amino acid sequence comprises SEQ ID NO: 48 and the VL region amino acid sequence comprises SEQ ID NO: 47;
(r) the VH region amino acid sequence comprises SEQ ID NO: 49 and the VL region amino acid sequence comprises SEQ ID NO: 45;
(s) the VH region amino acid sequence comprises SEQ ID NO: 49 and the VL region amino acid sequence comprises SEQ ID NO: 46; or
(t) the VH region amino acid sequence comprises SEQ ID NO: 73 and the VL region amino acid sequence comprises SEQ ID NO: 47.

In some aspects of the invention, the HCDR1 of the antibody molecule or antigen-binding portion may exclude the sequence GFTFSSYMMS (SEQ ID NO: 1; MAb005 murine/humanized antibody HCDR1 disclosed in WO2015/085847A1; US2016/376367A1), and/or the HCDR2 of the antibody molecule or antigen-binding portion may exclude the sequence TISGGGANTYYPDSVKG (SEQ ID NO: 2; MAb005 murine/humanized antibody HCDR2 disclosed in WO2015/085847A1; US2016/376367A1), and/or the HCDR3 of the antibody molecule or antigen-binding portion may exclude the sequence QLYYFDY (SEQ ID NO: 3; MAb005 murine/humanized antibody HCDR3 disclosed in WO2015/085847A1; US2016/376367A1).

In some aspects of the invention, the LCDR1 of the antibody molecule or antigen-binding portion may exclude the sequence LASQTIGTWLT (SEQ ID NO: 9; MAb005 murine/humanized antibody LCDR1 disclosed in WO2015/085847A1; US2016/376367A1), and/or the LCDR2 of the antibody molecule or antigen-binding portion may exclude the sequence TATSLAD (SEQ ID NO: 5; MAb005 murine/humanized antibody LCDR2 disclosed in WO2015/085847A1; US2016/376367A1) and/or the LCDR3 of the antibody molecule or antigen-binding portion may exclude the sequence QQVYSIPWT (SEQ ID NO: 6; MAb005 murine/humanized antibody LCDR3 disclosed in WO2015/085847A1; US2016/376367A1).

Also provided according to the invention is an immunoconjugate comprising the antibody molecule or antigen-binding portion thereof as defined herein linked, fused or conjugated to a therapeutic agent.

In another aspect the invention provides a nucleic acid molecule encoding the antibody molecule or antigen-binding portion thereof as defined herein.

Further provided is a vector comprising the nucleic acid molecule of the invention.

Also provided is a host cell comprising the nucleic acid molecule or the vector of the invention as defined herein.

In a further aspect there is provided a method of producing an anti-PD1/VEGFR2 antibody and/or an antigen-binding portion thereof, comprising culturing the host cell of the invention under conditions that result in expression and/or production of the antibody and/or the antigen-binding portion thereof, and isolating the antibody and/or the antigen-binding portion thereof from the host cell or culture.

In another aspect of the invention there is provided a pharmaceutical composition comprising the antibody molecule or antigen-binding portion thereof of the invention as defined herein, or the nucleic acid molecule of the invention as defined herein, or the vector of the invention as defined herein.

Further provided is a method for enhancing an immune response in a subject, comprising administering an effective amount of the antibody molecule or antigen-binding portion thereof of the invention as defined herein, or the immunoconjugate of the invention as defined herein, or the nucleic acid molecule of the invention as defined herein, or the vector of the invention as defined herein, or the pharmaceutical composition of the invention as defined herein.

In a further aspect there is provided a method for treating or preventing cancer in a subject, comprising administering an effective amount of the antibody molecule or antigen-binding portion thereof of the invention as defined herein, or the immunoconjugate of the invention as defined herein, or the nucleic acid molecule of the invention as defined herein, or the vector of the invention as defined herein, or the pharmaceutical composition of the invention as defined herein.

Further provided herein is an antibody molecule or antigen-binding portion thereof as defined herein, or the immunoconjugate as defined herein, or the nucleic acid molecule as defined herein, or the vector as defined herein, or the pharmaceutical composition as defined herein, for use as a medicament. The invention also provides an antibody molecule or antigen-binding portion thereof of the invention as defined herein, or the immunoconjugate of the invention as defined herein, or the nucleic acid molecule of the invention as defined herein, or the vector of the invention as defined herein, or the pharmaceutical composition of the invention as defined herein, for use in the treatment of cancer.

In another aspect the invention provides the antibody molecule, or antigen-binding portion thereof, or the immunoconjugate, or the nucleic acid molecule, or the vector for use, or the method of treatment of the invention as defined herein, for separate, sequential or simultaneous use in a combination combined with a second therapeutic agent, for example an anti-cancer agent.

In a further aspect there is provided the use of an antibody molecule or antigen-binding portion thereof of the invention as defined herein, or an immunoconjugate of the invention as defined herein, or a nucleic acid molecule of the invention as defined herein, or a vector of the invention as defined herein, or a pharmaceutical composition of the invention as defined herein, in the manufacture of a medicament for the treatment of cancer.

The invention also provides a method for treating or preventing an infectious disease in a subject, comprising administering an effective amount of the antibody molecule or antigen-binding portion thereof as defined herein, or the immunoconjugate as defined here, or the nucleic acid molecule as defined herein, or the vector as defined herein, or the pharmaceutical composition as defined herein.

The infectious disease may be selected in all aspects from the group consisting of: viral, bacterial, fungal or parasitic. In one embodiment, the infectious disease is human immunodeficiency virus (HIV) infection.

Also provided is an antibody molecule or antigen-binding portion thereof as defined herein, or the immunoconjugate as defined herein, or the nucleic acid molecule as defined herein, or the vector as defined herein, or the pharmaceutical composition as defined herein, for use in the treatment of an infectious disease.

Further provided is the use of an antibody molecule or antigen-binding portion thereof as defined herein, or an immunoconjugate as defined herein, or a nucleic acid molecule as defined herein, or a vector as defined herein, or a pharmaceutical composition as defined herein, in the manufacture of a medicament for the treatment of an infectious disease.

The invention also provides a method for treating or preventing an infectious disease in a subject, comprising administering an effective amount of the antibody molecule or antigen-binding portion thereof as defined herein, or the immunoconjugate as defined here, or the nucleic acid molecule as defined herein, or the vector as defined herein, or the pharmaceutical composition as defined herein.

The invention also provides a method of producing an antibody molecule which specifically binds to human PD1 and human VEGFR2 and optionally also to cynomolgus monkey PD1 and monkey VEGFR2, or an antigen-binding portion thereof, comprising the steps of:
(1) grafting anti-PD1 CDRs from a non-human source into a human v-domain framework to produce a humanized anti-PD1 antibody molecule or antigen-binding portion thereof;
(2) generating a library of clones of the humanized anti-PD1 antibody molecule or antigen-binding portion thereof comprising one or more mutations in the CDRs;
(3) screening the library for binding to human PD1 and human VEGFR2 and optionally also to cynomolgus monkey PD1 and rhesus monkey VEGFR2;
(4) selecting clones from the screening step (3) having binding specificity to human PD1 and human VEGFR2 and optionally also to cynomolgus monkey PD1 and rhesus monkey VEGFR2; and
(5) producing an antibody molecule which specifically binds to human PD1 and human VEGFR2 and optionally also to cynomolgus monkey PD1 and rhesus monkey VEGFR2, or an antigen-binding portion thereof from clones selected from step (4).

The method may comprise a further step of producing additional clones based on the clones selected in step (4), for example based on further exploratory mutagenesis at specific positions in the CDRs of the clones selected in step (4), to enhance humanization and/or minimise human T cell epitope content and/or improve manufacturing properties in the antibody molecule or antigen-binding portion thereof produced in step (5).

BRIEF DESCRIPTION OF THE DRAWINGS

FIG. 5A-FIG. 5K. Cell-based VEGFR2 antagonism assay-single clone analysis. The VEGFR2 antagonism for leads clones shown in FIG. 4 were re-analysed on a clone by clone basis. While all 11 lead clones showed potent antagonism, the library-derived clones with mutations found in only one CDR per clone (FIG. 5A-FIG. 5E) were found to be less potent than the clones which combined mutations in both LCDR1 and LCDR3 (FIG. 5F-FIG. 5K).

DETAILED DESCRIPTION OF THE INVENTION

Figure 1:
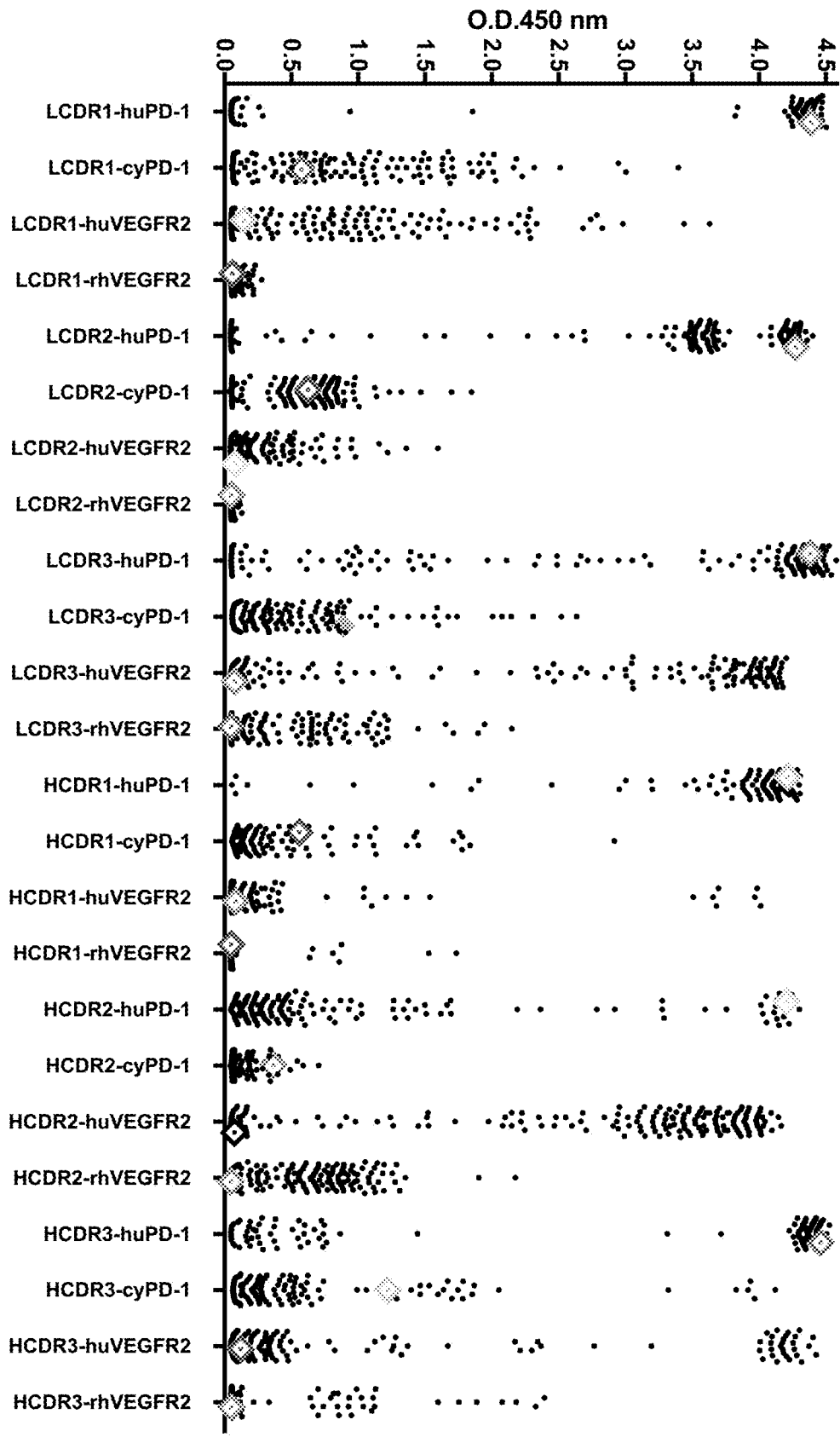
FIG. 1. Direct binding ELISA of library-derived anti-PD1 Fabs against human and cyno PD1 and human and rhesus VEGFR2 proteins. Clones were derived from multiple phage library selection branches where phage populations were selected on biotinylated target proteins in each round. After each round of selection, library-derived clones (black circles) were screened as periplasmically-expressed Fab proteins, against both human (hu) and cyno (cy) PD1 and human (hu) and rhesus (rh) VEGFR2. hMAb005 v-domains expressed as human IgG1 Fab were used as positive controls on each plate (grey diamonds).

The invention is based on the discovery of antibodies that unexpectedly antagonize both the PD1 and the VEGF pathways. Inhibition of the VEGF signalling pathway can provide an effective combination with inhibition of the PD1 pathway. VEGF-VEGFR2 signalling not only drives neo-vascularisation, but also has been shown to augment immunosuppression in the tumour microenvironment, with VEGFR2 being expressed on multiple immune cell types. Generating a dual-inhibitor antibody is a complex and unpredictable task, however, as it involves the generation of a single antibody with potent modulation of two target proteins, e.g. PD1 and VEGFR2, which are highly dissimilar in amino acid sequence and structure. This sequence and structural dissimilarity between the two targets is an impediment to success in generating such an antibody.

WO2015/085847A1 describes an antagonistic murine anti-PD1 IgG molecule termed "MAb005", and also the preparation of humanized forms of MAb005. Humanized MAb005 (hMAb005) was shown in clinical trials to have the highly unusual side-effect of inducing haemangioma. In vitro studies successfully traced this issue back to off-target antibody reactivity, including the binding of VEGFR2 (Finlay et al. (2019) mAbs, 11:1, 26-44). Importantly, the binding of hMAb005 (also known as SHR-1210) to VEGFR2 was shown to lead to potent agonism (activation) of the receptor, likely being the major driver of the haemangioma side effect. For reasons noted above, such humanized forms of MAb005 described in WO2015/085847A1 are not ideal. Further, it cannot be predicted a priori which changes in molecular characteristics can convert an antagonist/agonist antibody such as Mab005, into a dual antagonist of both the PD1 and VEGFR2 pathways. The invention provides antibodies that maintain potent PD1 antagonism, but also potently antagonise VEGFR2. Such antibodies may provide synergistic clinical benefit.

Provided herein is a method of generating an antibody derived from hMAb005 that specifically binds to PD1 and antagonises VEGF-VEGFR2 signalling. For example, such an antibody may be generated by introducing mutations into one or more CDR sequences of antibody hMAb005. In some embodiments, the mutations are introduced into the LCDR1 and/or LCDR2 and/or HCDR2 sequences of antibody hMAb005.

In some aspects, there is provided an antibody that specifically binds to both human PD1 and human VEGFR2 or an antigen-binding portion of said antibody. In some embodiments, an antibody or an antigen-binding portion thereof is capable of antagonizing both the PD1-PDL1 signalling pathway and the VEGFR2-VEGF signalling pathway. In some embodiments, an antibody or an antigen-binding portion thereof antagonizes binding of human PD1 to human PD-L1 and antagonizes the signalling of human VEGFR2 in response to human VEGF.

In some aspects an anti-PD1 and anti-VEGFR2 antibody or antigen-binding portion provided herein specifically binds to a PD1 protein comprising or consisting of SEQ ID NO: 32 or SEQ ID NO: 33. In some aspects an anti-PD1 and anti-VEGFR2 antibody or antigen-binding portion provided herein specifically binds to a PD1 protein having an amino acid sequence that is at least about 90%, at least about 91%, at least about 92%, at least about 93%, at least about 94%, at least about 95%, at least about 96%, at least about 97%, at least about 98% or at least about 99% identical to SEQ ID NO: 32 or SEQ ID NO: 33.

In some aspects an anti-PD1 and anti-VEGFR2 antibody or antigen-binding portion provided herein specifically binds to a VEGFR2 protein comprising or consisting of SEQ ID NO: 34 or SEQ ID NO: 35. In some aspects an anti-PD1 and anti-VEGFR2 antibody or antigen-binding portion provided herein specifically binds to a VEGFR2 protein having an amino acid sequence that is at least about 90%, at least about 91%, at least about 92%, at least about 93%, at least about 94%, at least about 95%, at least about 96%, at least about 97%, at least about 98% or at least about 99% identical to SEQ ID NO: 34 or SEQ ID NO: 35.

In some aspects of the invention, the HCDR1 of the antibody molecule or antigen-binding portion may exclude the sequence GFTFSSYMMS (SEQ ID NO: 1; MAb005 murine/humanized antibody HCDR1 disclosed in WO2015/085847A1; US2016/376367A1), and/or the HCDR2 of the antibody molecule or antigen-binding portion may exclude the sequence TISGGGANTYYPDSVKG (SEQ ID NO: 2; MAb005 murine/humanized antibody HCDR2 disclosed in WO2015/085847A1; US2016/376367A1), and/or the HCDR3 of the antibody molecule or antigen-binding portion may exclude the sequence QLYYFDY (SEQ ID NO: 3; MAb005 murine/humanized antibody HCDR3 disclosed in WO2015/085847A1; US2016/376367A1).

In some aspects of the invention, the LCDR1 of the antibody molecule or antigen-binding portion may exclude the sequence LASQTIGTWLT (SEQ ID NO: 9; MAb005 murine/humanized antibody LCDR1 disclosed in WO2015/085847A1; US2016/376367A1), and/or the LCDR2 of the antibody molecule or antigen-binding portion may exclude the sequence TATSLAD (SEQ ID NO: 5; MAb005 murine/humanized antibody LCDR2 disclosed in WO2015/085847A1; US2016/376367A1) and/or the LCDR3 of the antibody molecule or antigen-binding portion may exclude the sequence QQVYSIPWT (SEQ ID NO: 6; MAb005 murine/humanized antibody LCDR3 disclosed in WO2015/085847A1; US2016/376367A1).

In some embodiments, anti-PD1 antibodies of the invention have been selected to have equivalency in binding specificity and affinity to both human PD1 as well as cynomolgus monkey PD1 (to facilitate maximally accurate primate toxicology and pharmacokinetic studies). Further refining of the optimized antibody molecules as described herein has provided improved binding to the cynomolgus monkey orthologues of PD1 and/or maintained or improved potency in neutralisation of PD1/PD-L1 signalling. Critically, these antibodies also dramatically improved their potential clinical activity and reduce their risk of inducing haemangioma in comparison to MAb005 (WO2015/085847A1; US2016/376367A1) by becoming potent antagonists of the human receptor VEGFR2.

In some aspects, anti-PD1 and anti-VEGFR2 antibody molecules of the present invention do not necessarily have the maximum number of human germline substitutions at corresponding murine CDR or other (such as framework) amino acid positions. In some embodiments, "maximally humanized" antibody molecules are not necessary "maximally optimized" in terms of anti-PD1 or anti-VEGFR2 binding characteristics and/or other desirable features.

The present invention encompasses modifications to the amino acid sequence of the antibody molecule or antigen-binding portion thereof as defined herein. For example, the invention includes antibody molecules and corresponding antigen-binding portions thereof comprising functionally equivalent variable regions and CDRs which do not significantly affect their properties as well as variants which have enhanced or decreased activity and/or affinity. For example, the amino acid sequence may be mutated to obtain an antibody with the desired binding affinity to PD1 and VEGFR2. Insertions which include amino-and/or carboxyl-terminal fusions ranging in length from one residue to polypeptides containing a hundred or more residues, as well as intra-sequence insertions of single or multiple amino acid residues, are envisaged. Examples of terminal insertions include an antibody molecule with an N-terminal methionyl residue or the antibody molecule fused to an epitope tag. Other insertional variants of the antibody molecule include the fusion to the N- or C-terminus of the antibody of an enzyme or a polypeptide which increases the half-life of the antibody in the blood circulation.

The antibody molecule or antigen-binding portion of the invention may include glycosylated and non-glycosylated polypeptides, as well as polypeptides with other post-translational modifications, such as, for example, glycosylation with different sugars, acetylation, and phosphorylation. The antibody molecule or antigen-binding portion of the invention may be mutated to alter such post-translational modifications, for example by adding, removing or replacing one or more amino acid residues to form or remove a glycosylation site.

The antibody molecule or antigen-binding portion of the invention may be modified for example by amino acid substitution to remove potential proteolytic sites in the antibody.

In some embodiments of the invention, provided is an antibody that binds specifically to both PD1 and VEGFR2 or an antigen-binding portion of the antibody, wherein the antibody comprises a heavy chain variable (VH) region and a light chain variable (VL) region, wherein
  (a) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQGIGPWLS (SEQ ID NO: 4), LCDR2 of TATSLAD (SEQ ID NO: 5) and LCDR3 of QQVYSIPWT (SEQ ID NO: 6); [MAB02A03]
  (b) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQPLGIWLS (SEQ ID NO: 7), LCDR2 of TATSLAD (SEQ ID NO: 5) and LCDR3 of QQVYSIPWT (SEQ ID NO: 6); [MAB02B03]
  (c) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQESGIWLS (SEQ ID NO: 8), LCDR2 of TATSLAD (SEQ ID NO: 5) and LCDR3 of QQVYSIPWT (SEQ ID NO: 6); [MAB02D08]
  (d) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQTIGTWLT (SEQ ID NO: 9), LCDR2 of TATSLAD (SEQ ID NO: 5) and LCDR3 of QQVAELPFG (SEQ ID NO: 10); [MAB05G03]
  (e) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQTIGTWLT (SEQ ID NO: 9), LCDR2 of TATSLAD (SEQ ID NO: 5) and LCDR3 of QQVSVTPFT (SEQ ID NO: 11); [MAB05E08]
  (f) the VH region amino acid sequence comprises HCDR1 of GFTFSSYMMS (SEQ ID NO: 1), HCDR2 of TIS- GGGANTYYPDSVKG (SEQ ID NO: 2) and HCDR3 of QLYYFDY (SEQ ID NO: 3); and the VL region amino acid sequence comprises LCDR1 of LASQ-GIGPWLS (SEQ ID NO: 4), LCDR2 of TATSLAD (SEQ ID NO: 5) and LCDR3 of QQVAELPFG (SEQ ID NO: 10); [MAB01]

(g) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQPLGIWLS (SEQ ID NO: 7), LCDR2 of TAT-SLAD (SEQ ID NO: 5) and LCDR3 of QQVAELPFG (SEQ ID NO: 10); [MAB02]

(h) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQESGIWLG (SEQ ID NO: 12), LCDR2 of TAT-SLAD (SEQ ID NO: 5) and LCDR3 of QQVAELPFG (SEQ ID NO: 10); [MAB03]

(i) the VH region amino acid sequence comprises HCDR1 of GFTFSSYMMS (SEQ ID NO: 1), HCDR2 of TIS-GGGANTYYPDSVKG (SEQ ID NO: 2) and HCDR3 of QLYYFDY (SEQ ID NO: 3); and the VL region amino acid sequence comprises LCDR1 of LASQ-GIGPWLS (SEQ ID NO: 4), LCDR2 of TATSLAD (SEQ ID NO: 5) and LCDR3 of QQVSVTPFT (SEQ ID NO: 11); [MAB04]

(j) the VH region amino acid sequence comprises HCDR1 of GFTFSSYMMS (SEQ ID NO: 1), HCDR2 of TIS-GGGANTYYPDSVKG (SEQ ID NO: 2) and HCDR3 of QLYYFDY (SEQ ID NO: 3); and the VL region amino acid sequence comprises LCDR1 of LASQPLGIWLS (SEQ ID NO: 7), LCDR2 of TAT-SLAD (SEQ ID NO: 5) and LCDR3 of QQVSVTPFT (SEQ ID NO: 11); [MAB05] or (k) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQESGIWLS (SEQ ID NO: 8), LCDR2 of TAT-SLAD (SEQ ID NO: 5) and LCDR3 of QQVSVTPFT (SEQ ID NO: 11); [MAB06] or (l) the VH region amino acid sequence comprises HCDR1 of GFTFSSYMMS (SEQ ID NO: 1) HCDR2 of TIS-GGGANTYYVDSVKG (SEQ ID NO: 38) and HCDR3 of QLYYFDY (SEQ ID NO: 3); and the VL region amino acid sequence comprises LCDR1 of RASQESGIWLS (SEQ ID NO: 39), LCDR2 of TAT-SLAD (SEQ ID NO: 5) and LCDR3 of QQVSVTPFT (SEQ ID NO: 11); [MAB06.1] or (m) the VH region amino acid sequence comprises HCDR1 of GFTFSSYMMS (SEQ ID NO: 1), HCDR2 of TISGGGANTYYVDSVKG (SEQ ID NO: 38) and HCDR3 of QLYYFDY (SEQ ID NO: 3); and the VL region amino acid sequence comprises LCDR1 of RASQESGIWLS (SEQ ID NO: 39), LCDR2 of TASSLAD (SEQ ID NO: 40) and LCDR3 of QQVSVTPFT (SEQ ID NO: 11); [MAB06.2] or (n) the VH region amino acid sequence comprises HCDR1 of GFTFSSYMMS (SEQ ID NO: 1), HCDR2 of TISGGGANTYYVDSVKG (SEQ ID NO: 38) and HCDR3 of QLYYFDY (SEQ ID NO: 3); and the VL region amino acid sequence comprises LCDR1 of RASQESGIWLS (SEQ ID NO: 39), LCDR2 of AASSLAD (SEQ ID NO: 41) and LCDR3 of QQVSVTPFT (SEQ ID NO: 11); [MAB06.3] or (o) the VH region amino acid sequence comprises HCDR1 of GFTFSSYMMS (SEQ ID NO: 1), HCDR2 of TISGGGANTYYVDSVKG (SEQ ID NO: 38) and HCDR3 of QLYYFDY (SEQ ID NO: 3); and the VL region amino acid sequence comprises LCDR1 of RASQESGIWLS (SEQ ID NO: 39), LCDR2 of AASSLQS (SEQ ID NO: 43) and LCDR3 of QQVSVTPFT (SEQ ID NO: 11); [MAB06.4] or (p) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QLYYFDY (SEQ ID NO: 3); and the VL region amino acid sequence comprises LCDR1 of RASQESGIWLS (SEQ ID NO: 39), LCDR2 of TAT-SLAD (SEQ ID NO: 5) and LCDR3 of QQVSVTPFT (SEQ ID NO: 11); [MAB06.5] or (q) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QLYYFDY (SEQ ID NO: 3); and the VL region amino acid sequence comprises LCDR1 of RASQESGIWLS (SEQ ID NO: 39), LCDR2 of TASSLAD (SEQ ID NO: 40) and LCDR3 of QQVSVTPFT (SEQ ID NO: 11); [MAB06.6] or (r) the VH region amino acid sequence comprises HCDR1 of GFTFSSYMMS (SEQ ID NO: 1), HCDR2 of TIS-GGGSNKYYVDSVKG (SEQ ID NO: 42) and HCDR3 of QLYYFDY (SEQ ID NO: 3); and the VL region amino acid sequence comprises LCDR1 of RASQESGIWLS (SEQ ID NO: 39), LCDR2 of AASSLAD (SEQ ID NO: 41) and LCDR3 of QQVSVTPFT (SEQ ID NO: 11); [MAB06.7] or (s) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QLYYFDY (SEQ ID NO: 3); and the VL region amino acid sequence comprises LCDR1 of RASQESGIWLS (SEQ ID NO: 39), LCDR2 of AASS-LQS (SEQ ID NO: 43) and LCDR3 of QQVSVTPFT (SEQ ID NO: 11); [MAB06.8] or (t) the VH region amino acid sequence comprises HCDR1 of GFTFSSYLMS (SEQ ID NO: 61), HCDR2 of TISGGGSNKYYVDSVKG (SEQ ID NO: 42) and HCDR3 of QLYYFDY (SEQ ID NO: 3); and the VL region amino acid sequence comprises LCDR1 of RASQESGIWLS (SEQ ID NO: 39), LCDR2 of AASS-LQS (SEQ ID NO: 43) and LCDR3 of QQVSVTPFT (SEQ ID NO: 11); [MAB06.8.1] or (u) the VH region amino acid sequence comprises HCDR1 of GFTFSSYLMS (SEQ ID NO: 61), HCDR2 of TISGGGSNKYYVDSVKG (SEQ ID NO: 42) and HCDR3 of QVYYFDY (SEQ ID NO: 64); and the VL region amino acid sequence comprises LCDR1 of RASQESGIWLS (SEQ ID NO: 39), LCDR2 of AASS-LQS (SEQ ID NO: 43) and LCDR3 of QQVSVTPFT (SEQ ID NO: 11); [MAB06.8.2] or (v) the VH region amino acid sequence comprises HCDR1 of GFTFSSYLMS (SEQ ID NO: 61), HCDR2 of TISGGGSNKYYVDSVKG (SEQ ID NO: 42) and HCDR3 of QLYGFDY (SEQ ID NO: 65); and the VL region amino acid sequence comprises LCDR1 of RASQESGIWLS (SEQ ID NO: 39), LCDR2 of AASS-LQS (SEQ ID NO: 43) and LCDR3 of QQVSVTPFT (SEQ ID NO: 11); [MAB06.8.3] or (w) the VH region amino acid sequence comprises HCDR1 of GFTFSSYLMS (SEQ ID NO: 61), HCDR2 of TISGGGSNKYYVDSVKG (SEQ ID NO: 42) and HCDR3 of QLYYADY (SEQ ID NO: 66); and the VL region amino acid sequence comprises LCDR1 of RASQESGIWLS (SEQ ID NO: 39), LCDR2 of AASSLOS (SEQ ID NO: 43) and LCDR3 of QQVSVTPFT (SEQ ID NO: 11); [MAB06.8.4] or (x) the VH region amino acid sequence comprises HCDR1 of GFTFSSYLMS (SEQ ID NO: 61), HCDR2 of TISGGGSNKYYVDSVKG (SEQ ID NO: 42) and HCDR3 of QLYFFDY (SEQ ID NO: 62); and the VL region amino acid sequence comprises LCDR1 of RASQESGIWLS (SEQ ID NO: 39), LCDR2 of AASSLOS (SEQ ID NO: 43) and LCDR3 of QQVSVTPFT (SEQ ID NO: 11); [MAB06.8.5] or (y) the VH region amino acid sequence comprises HCDR1 of GFTFSSYLMS (SEQ ID NO: 61), HCDR2 of TISGGGSNKYYVDSVKG (SEQ ID NO: 42) and HCDR3 of QLYYYDY (SEQ ID NO: 63); and the VL region amino acid sequence comprises LCDR1 of RASQESGIWLS (SEQ ID NO: 39), LCDR2 of AASSLQS (SEQ ID NO: 43) and LCDR3 of QQVSVTPFT (SEQ ID NO: 11); [MAB06.8.6] or (z) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QVYYFDY (SEQ ID NO: 64); and the VL region amino acid sequence comprises LCDR1 of RASQESGIWLS (SEQ ID NO: 39), LCDR2 of AASSLOS (SEQ ID NO: 43) and LCDR3 of QQVSVTPFT (SEQ ID NO: 11); [MAB06.8.7] or (aa) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QLYYADY (SEQ ID NO: 66); and the VL region amino acid sequence comprises LCDR1 of RASQESGIWLS (SEQ ID NO: 39), LCDR2 of AASSLQS (SEQ ID NO: 43) and LCDR3 of QQVSVTPFT (SEQ ID NO: 11); [MAB06.8.8] or (bb) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QLYYYDY (SEQ ID NO: 63); and the VL region amino acid sequence comprises LCDR1 of RASQESGIWLS (SEQ ID NO: 39), LCDR2 of AASSLOS (SEQ ID NO: 43) and LCDR3 of QQVSVTPFT (SEQ ID NO: 11). [MAB06.8.9]

In some aspects, disclosed herein is an anti-PD1 and anti-VEGFR2 antibody or an antigen-binding portion thereof, wherein the antibody comprises a heavy chain variable (VH) region and a light chain variable (VL) region, wherein the VH region amino acid sequence comprises or consists of EVOLVESGGGLVQPGGSLRLS-CAASGFTFSSYMMSWVRQAPGKGLEWVATIS-GGGANTYYPDSVKGRFTISRDNAKNS-LYLQMNSLRAEDTAVYYCARQLYYFDY-WGQGTTVTVSS (SEQ ID NO: 13).

In some aspects, disclosed herein is anti-PD1 and anti-VEGFR2 antibody or an antigen-binding portion thereof, wherein the antibody comprises a heavy chain variable (VH) region and a light chain variable (VL) region, wherein the VH region comprises or consists of SEQ ID NO: 13 and the VL region comprises or consists of any one of the VL region amino acid sequences in Table 5 or Table 8.

In some aspects, disclosed herein is an antibody that binds specifically to both PD1 and VEGFR2 or an antigen-binding portion of the antibody, wherein the antibody comprises a heavy chain variable (VH) region and a light chain variable (VL) region, wherein (a) the VH region amino acid sequence comprises SEQ ID NO: 13 and the VL region amino acid sequence comprises SEQ ID NO: 14;

(b) the VH region amino acid sequence comprises SEQ ID NO: 13 and the VL region amino acid sequence comprises SEQ ID NO: 15;

(c) the VH region amino acid sequence comprises SEQ ID NO: 13 and the VL region amino acid sequence comprises SEQ ID NO: 16;

(d) the VH region amino acid sequence comprises SEQ ID NO: 13 and the VL region amino acid sequence comprises SEQ ID NO: 17;

(e) the VH region amino acid sequence comprises SEQ ID NO: 13 and the VL region amino acid sequence comprises SEQ ID NO: 18;

(f) the VH region amino acid sequence comprises SEQ ID NO: 13 and the VL region amino acid sequence comprises SEQ ID NO: 19;

(g) the VH region amino acid sequence comprises SEQ ID NO: 13 and the VL region amino acid sequence comprises SEQ ID NO: 20;

(h) the VH region amino acid sequence comprises SEQ ID NO: 13 and the VL region amino acid sequence comprises SEQ ID NO: 21;

(i) the VH region amino acid sequence comprises SEQ ID NO: 13 and the VL region amino acid sequence comprises SEQ ID NO: 22;

(j) the VH region amino acid sequence comprises SEQ ID NO: 13 and the VL region amino acid sequence comprises SEQ ID NO: 23;

(k) the VH region amino acid sequence comprises SEQ ID NO: 13 and the VL region amino acid sequence comprises SEQ ID NO: 24;

(l) the VH region amino acid sequence comprises SEQ ID NO: 48 and the VL region amino acid sequence comprises SEQ ID NO: 44;

(m) the VH region amino acid sequence comprises SEQ ID NO: 48 and the VL region amino acid sequence comprises SEQ ID NO: 45;

(n) the VH region amino acid sequence comprises SEQ ID NO: 48 and the VL region amino acid sequence comprises SEQ ID NO: 46;

(o) the VH region amino acid sequence comprises SEQ ID NO: 48 and the VL region amino acid sequence comprises SEQ ID NO: 47;

(p) the VH region amino acid sequence comprises SEQ ID NO: 49 and the VL region amino acid sequence comprises SEQ ID NO: 44;

(q) the VH region amino acid sequence comprises SEQ ID NO: 49 and the VL region amino acid sequence comprises SEQ ID NO: 45;

(r) the VH region amino acid sequence comprises SEQ ID NO: 49 and the VL region amino acid sequence comprises SEQ ID NO: 46;

(s) the VH region amino acid sequence comprises SEQ ID NO: 49 and the VL region amino acid sequence comprises SEQ ID NO: 47;

(t) the VH region amino acid sequence comprises SEQ ID NO: 67 and the VL region amino acid sequence comprises SEQ ID NO: 47;

(u) the VH region amino acid sequence comprises SEQ ID NO: 68 and the VL region amino acid sequence comprises SEQ ID NO: 47;
(v) the VH region amino acid sequence comprises SEQ ID NO: 69 and the VL region amino acid sequence comprises SEQ ID NO: 47;
(w) the VH region amino acid sequence comprises SEQ ID NO: 70 and the VL region amino acid sequence comprises SEQ ID NO: 47;
(x) the VH region amino acid sequence comprises SEQ ID NO: 71 and the VL region amino acid sequence comprises SEQ ID NO: 47
(y) the VH region amino acid sequence comprises SEQ ID NO: 72 and the VL region amino acid sequence comprises SEQ ID NO: 47;
(z) the VH region amino acid sequence comprises SEQ ID NO: 73 and the VL region amino acid sequence comprises SEQ ID NO: 47;
(aa) the VH region amino acid sequence comprises SEQ ID NO: 74 and the VL region amino acid sequence comprises SEQ ID NO: 47; or
(bb) the VH region amino acid sequence comprises SEQ ID NO: 75 and the VL region amino acid sequence comprises SEQ ID NO: 47.

In some aspects, disclosed herein is an anti-PD1 and anti-VEGFR2 antibody or an antigen-binding portion thereof, wherein the antibody comprises a heavy chain variable (VH) region and a light chain variable (VL) region, wherein (a) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 13 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 14;

(b) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 13 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 15;

(c) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 13 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 16;

(d) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 13 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 17;

(e) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 13 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 18;

(f) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 13 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 19;

(g) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 13 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 20;

(h) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 13 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 21;

(i) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 13 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 22;

(j) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 13 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 23;

(k) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 13 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 24;

(l) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 48 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 44;

(m) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 48 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 45;

(n) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 48 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 46;

(o) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 48 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 47;

(p) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 49 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 44;

(q) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 49 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 45;

(r) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 49 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 46; or (s) the VH region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 49 and the VL region amino acid sequence is at least about 90%, at least about 91%, at least about 92%, at least about 93%, at least about 94%, at least about 95%, at least about 96%, at least about 97%, at least about 98% or at least about 99% identical to SEQ ID NO: 47. In some aspects, the CDR amino acid sequences of an anti-PD1 and anti-VEGFR2 antibody are 100% identical to the CDR amino acid sequences in the recited sequences while the FR amino acid sequences are less than 100% identical to the FR amino acid sequences in the recited sequences.

In some aspects, the antibody or antigen-binding portion as defined herein may be isolated.

The antibody molecule or antigen-binding portion as defined herein may cross-compete for binding to PD1 and VEGFR2 with an antibody or antigen-binding portion thereof comprising the sets of CDRs disclosed herein. In some embodiments, the invention provides an anti-PD1 and anti-VEGFR2 antibody or an antigen-binding portion thereof, wherein the antibody or antigen-binding portion cross-competes for binding to PD1 and VEGFR2 with the antibody or antigen-binding portion comprising the sets of CDRs disclosed herein; and (a) comprises fully germline human framework amino acid sequences; (b) binds specifically to human PD1, cynomolgus PD1, human VEGFR2 and rhesus VEGFR2; and (c) antagonizes binding of human PD1 to human PD-L1 and antagonizes signaling of human VEGFR2 in response to human VEGF.

In some embodiments, an anti-PD1 and anti-VEGFR2 antibody or antigen-binding portion has minimal immunogenicity. In certain cases, an antibody or antigen-binding portion exhibits reduced immunogenicity compared to an anti-PD1 antibody comprising HCDR1 of SEQ ID NO: 1, HCDR2 of SEQ ID NO: 2, HCDR3 of SEQ ID NO: 3, LCDR1 of SEQ ID NO: 9, LCDR2 of SEQ ID NO: 5, and LCDR3 of SEQ ID NO: 6. In some examples, immunogenicity risk of an antibody or antigen-binding portion may be determined in silico by identifying the location of T cell epitopes in the antibody or portion (e.g., in the variable regions of the antibody or portion).

For example, T cell epitopes in an antibody or antigen-binding portion may be identified by using iTope™. iTope™ can used to analyse VL and VH region sequences for peptides with promiscuous high affinity binding to human MHC class II. Promiscuous high affinity MHC class II binding peptides are thought to correlate with the presence of T cell epitopes that are high risk indicators for clinical immunogenicity of drug proteins. The iTope™ software predicts favourable interactions between amino acid side chains of a peptide and specific binding pockets (in particular pocket positions; p1, p4, p6, p7 and p9) within the open-ended binding grooves of 34 human MHC class II alleles. These alleles represent the most common HLA-DR alleles found world-wide with no weighting attributed to those found most prevalently in any particular ethnic population. Twenty of the alleles contain the 'open' p1 configuration and 14 contain the 'closed' configuration where glycine at position 83 is replaced by a valine. The location of key binding residues is achieved by the in silico generation of 9mer peptides that overlap by eight amino acids spanning the test protein sequence. This process successfully discriminates with high accuracy between peptides that either bind or do not bind MHC class II molecules.

T cell epitopes in an antibody or antigen-binding portion may be identified by analysing VL and VH region sequences using TCED™ (T Cell Epitope Database™) to search for matches to T cell epitopes previously identified by in vitro human T cell epitope mapping analyses of other protein sequences. The TCED™ is used to search any test sequence against a large (>10,000 peptides) database of peptides derived from unrelated protein and antibody sequences.

In some embodiments, an anti-PD1 and anti-VEGFR2 antibody or antigen-binding portion may exhibit a low immunogenicity because the antibody or portion has a low number of one or more of the following peptides in its sequences: High Affinity Foreign ('HAF'—high immunogenicity risk), Low Affinity Foreign ('LAF'—lower immunogenicity risk), and/or TCED+ (previously identified epitope in TCED™ database).

In some embodiments, an anti-PD1 and anti-VEGFR2 antibody or antigen-binding portion may have high Germline Epitope (GE) content in its sequence. In some examples, an anti-PD1 antibody or antigen-binding portion has 3, 4, 5, 6, 7, 8, 9, 10, 11, 12, 13, 14, 15, 16, 17, 18, 19 or 20 (or greater than 20) germline epitopes in its sequence (e.g., in the VL and/or VH region sequence). Germline Epitope may be defined as a human germline peptide sequence with high MHC Class II binding affinity. Germline Epitope 9mer peptides are unlikely to have immunogenic potential due to T cell tolerance, as validated by previous studies with a wide range of germline peptides. Importantly, such germline v-domain epitopes (aided further by similar sequences in the human antibody constant regions) also compete for MHC Class II occupancy at the membrane of antigen presenting cells, reducing the risk of foreign peptide presentation being sufficient to achieve the 'activation threshold' required for T cell stimulation. High GE content is therefore a beneficial quality in clinical development of an antibody therapeutic and can provide low immunogenicity.

In certain embodiments, an anti-PD1 and anti-VEGFR2 antibody or antigen-binding portion may have a reduced number of HAF, LAF and/or TCED+epitopes found in the frameworks of both the heavy and light chain variable regions compared to an anti-PD1 antibody comprising the variable domain sequences of antibody Mab005 (Tables 1 and 2). In some embodiments, HAF, LAF and/or TCED+ epitopes are not present in the VL and/or VH region sequences of an anti-PD1 antibody or antigen-binding portion.

The terms "cross-compete", "cross-competition", "cross-block", "cross-blocked" and "cross-blocking" are used interchangeably herein to mean the ability of an antibody or portion thereof to interfere with the binding directly or indirectly through allosteric modulation of the anti-PD1 and anti-VEGFR2 antibodies of the invention to the targets PD1 and VEGFR2 (e.g., human PD1, human VEGFR2). The extent to which an antibody or portion thereof is able to interfere with the binding of another to the target, and therefore whether it can be said to cross-block or cross-compete according to the invention, can be determined using competition binding assays. One example of a binding competition assay is Homogeneous Time Resolved Fluorescence (HTRF). One particularly suitable quantitative cross-competition assay uses a FACS—or an AlphaScreen-based approach to measure competition between the labelled (e.g. His tagged, biotinylated or radioactive labelled) antibody or portion thereof and the other antibody or portion thereof in terms of their binding to the target. In general, a cross-competing antibody or portion thereof is, for example, one which will bind to the target in the cross-competition assay such that, during the assay and in the presence of a second antibody or portion thereof, the recorded displacement of the immunoglobulin single variable domain or polypeptide according to the invention is up to 100% (e.g. in a FACS based competition assay) of the maximum theoretical displacement (e.g. displacement by cold (e.g. unlabeled) antibody or fragment thereof that needs to be cross-blocked) by the potentially cross-blocking antibody or fragment thereof that is present in a given amount. Preferably, cross-competing antibodies or portions thereof have a recorded displacement that is between 10% and 100%, or between 50% and 100%.

The antibody molecule or antigen-binding portion as defined herein may comprise one or more substitutions, deletions and/or insertions which remove a post-translational modification (PTM) site, for example a glycosylation site (N-linked or O-linked), a deamination site, a phosphorylation site or an isomerisation/fragmentation site.

More than 350 types of PTM are known. Key forms of PTM include phosphorylation, glycosylation (N- and O-linked), sumoylation, palmitoylation, acetylation, sulfation, myristoylation, prenylation and methylation (of K and R residues). Statistical methods to identify putative amino acid sites responsible for specific PTMs are well known in the art (see Zhou et al., 2016, Nature Protocols 1: 1318-1321). Removal of such a site for example by substitution, deletion and/or insertion and then optionally testing (experimentally and/or theoretically) for (a) binding activity and/or (b) loss of the PTM is contemplated.

The antibody molecule or antigen-binding portion thereof may be human, humanized or chimeric.

The antibody molecule or antigen-binding portion thereof may comprise one or more human variable domain framework scaffolds into which the CDRs have been inserted. For example, the VH region, the VL region, or both the VH and the VL region may comprise one or more human framework region amino acid sequences.

The antibody molecule or antigen-binding portion thereof may comprise an IGHV3-7 human germline scaffold into which the corresponding HCDR sequences have been inserted. The antibody molecule or antigen-binding portion thereof may comprise a VH region that comprises an IGHV3-7 human germline scaffold amino acid sequence into which a set of corresponding HCDR1, HCDR2 and HCDR3 amino acid sequences have been inserted.

The antibody molecule or antigen-binding portion thereof may comprise an IGKV1-39 human germline scaffold into which the corresponding LCDR sequences have been inserted. The antibody molecule or antigen-binding portion thereof may comprise a VL region that comprises an IGKV1-39 human germline scaffold amino acid sequence into which a set of corresponding LCDR1, LCDR2 and LCDR3 amino acid sequences have been inserted.

The antibody molecule or antigen-binding portion thereof may comprise an IGHV3-7 human germline scaffold into which the corresponding HCDR sequences have been inserted and an IGKV1-39 human germline scaffold into which the corresponding LCDR sequences have been inserted. The antibody molecule or antigen-binding portion thereof may comprise a VH region that comprises an IGHV3-7 human germline scaffold amino acid sequence into which a set of corresponding HCDR1, HCDR2 and HCDR3 amino acid sequences have been inserted and a VL region that comprises an IGKV1-39 human germline scaffold amino acid sequence into which a set of corresponding LCDR1, LCDR2 and LCDR3 amino acid sequences have been inserted. The HCDR1, HCDR2, HCDR3, LCDR1, LCDR2 and LCDR3 amino acid sequences may be the HCDR1, HCDR2, HCDR3, LCDR1, LCDR2 and LCDR3 amino acid sequences of any one of the following clones (MAB02A03, MAB02B03, MAB02D08, MAB05G03, MAB05E08, MAB01, MAB02, MAB03, MAB04, MAB05, MAB06, MAB06.1, MAB06.2, MAB06.3, MAB06.4, MAB06.5, MAB06.6, MAB06.7, MAB06.8, MAB06.8.1, MAB06.8.2, MAB06.8.3, MAB06.8.4, MAB06.8.5, MAB06.8.6, MAB06.8.7, MAB06.8.8, or MAB06.8.9) (with all six CDR sequences being from the same clone).

In some aspects, the antibody molecule or antigen-binding portion thereof may comprise an immunoglobulin constant region. In some embodiments, the immunoglobulin constant region is IgG1, IgG2, IgG3, IgG4, IgA1 or IgA2. In additional embodiments, the immunoglobulin constant region is IgG1, IgG2, IgG3, IgG4, IgA1 or IgA2. The antibody molecule or antigen-binding portion thereof may comprise an immunologically inert constant region. In some aspects, an anti-PD1 and anti-VEGFR2 antibody or antigen-binding portion thereof may comprise an immunoglobulin constant region comprising a wild-type human IgG1 constant region, a human IgG1 constant region comprising the amino acid substitutions L234A, L235A and G237A or a human IgG1 constant region comprising the amino acid substitutions L234A, L235A, G237A and P331S. In some aspects, an anti-PD1 and anti-VEGFR2 antibody or antigen-binding portion thereof may comprise an immunoglobulin constant region comprising a wild-type human IgG2 constant region or a wild-type human IgG4 constant region. In some aspects, an anti-PD1 and anti-VEGFR2 antibody may comprise an immunoglobulin constant region comprising any one of the amino acid sequences in Table 6. The Fc region sequences in Table 6 begin at the CH1 domain. In some aspects, an anti-PD1 and anti-VEGFR2 antibody may comprise an immunoglobulin constant region comprising an amino acid sequence of an Fc region of human IgG4, human IgG4 (S228P), human IgG2, human IgG1, human IgG1-3M or human IgG1-4M. For example, the human IgG4 (S228P) Fc region comprises the following substitution compared to the wild-type human IgG4 Fc region: S228P. For example, the human IgG1-3M Fc region comprises the following substitutions compared to the wild-type human IgG1 Fc region: L234A, L235A and G237A, while the human IgG1-4M Fc region comprises the following substitutions compared to the wild-type human IgG1 Fc region: L234A, L235A, G237A and P331S. In some aspects, a position of an amino acid residue in a constant region of an immunoglobulin molecule is numbered according to EU nomenclature (Ward et al., 1995 *Therap. Immunol.* 2:77-94). In some aspects, an immunoglobulin constant region may comprise an RDELT (SEQ ID NO: 36) motif or an REEM (SEQ ID NO: 37) motif (underlined in Table 6). The REEM (SEQ ID NO: 37) allotype is found in a smaller human population than the RDELT (SEQ ID NO: 36) allotype. In some aspects, an anti-PD1 and anti-VEGFR2 antibody may comprise an immunoglobulin constant region comprising any one of SEQ ID NOS: 25-31. In some aspects, an anti-PD1 and anti-VEGFR2 antibody may comprise the six CDR amino acid sequences of any one of the following clones (MAB02A03, MAB02B03, MAB02D08, MAB05G03, MAB05E08, MAB01, MAB02, MAB03, MAB04, MAB05, MAB06, MAB06.1, MAB06.2, MAB06.3, MAB06.4, MAB06.5, MAB06.6, MAB06.7, MAB06.8, MAB06.8.1, MAB06.8.2, MAB06.8.3, MAB06.8.4, MAB06.8.5, MAB06.8.6, MAB06.8.7, MAB06.8.8, or MAB06.8.9) (with all six CDR sequences being from the same clone) and any one of the Fc region amino acid sequences in Table 6. In some aspects, an anti-PD1 and anti-VEGFR2 antibody may comprise an immunoglobulin heavy chain constant region comprising any one of the Fc region amino acid sequences in Table 6 and an immunoglobulin light chain constant region that is a kappa light chain constant region or a lambda light chain constant region.

In some aspects, disclosed herein is an anti-PD1 and anti-VEGFR2 antibody or an antigen-binding portion thereof, wherein the antibody comprises a heavy chain variable (VH) region, a light chain variable (VL) region and a heavy chain constant region, wherein
  (a) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQGIGPWLS (SEQ ID NO: 4), LCDR2 of TATSLAD (SEQ ID NO: 5) and LCDR3 of QQVYSIPWT (SEQ ID NO: 6); and the heavy chain constant region comprises any one of SEQ ID NOS: 25-31;
  (b) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQPLGIWLS (SEQ ID NO: 7), LCDR2 of TATSLAD (SEQ ID NO: 5) and LCDR3 of QQVYSIPWT (SEQ ID NO: 6); and the heavy chain constant region comprises any one of SEQ ID NOS: 25-31;
  (c) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQESGIWLS (SEQ ID NO: 8), LCDR2 of TATSLAD (SEQ ID NO: 5) and LCDR3 of QQVYSIPWT (SEQ ID NO: 6); and the heavy chain constant region comprises any one of SEQ ID NOS: 25-31;
  (d) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQTIGTWLT (SEQ ID NO: 9), LCDR2 of TATSLAD (SEQ ID NO: 5) and LCDR3 of QQVAELPFG (SEQ ID NO: 10); and the heavy chain constant region comprises any one of SEQ ID NOS: 25-31;
  (e) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQTIGTWLT (SEQ ID NO: 9), LCDR2 of TATSLAD (SEQ ID NO: 5) and LCDR3 of QQVSVTPFT (SEQ ID NO: 11); and the heavy chain constant region comprises any one of SEQ ID NOS: 25-31;
  (f) the VH region amino acid sequence comprises HCDR1 of GFTFSSYMMS (SEQ ID NO: 1), HCDR2 of TIS- GGGANTYYPDSVKG (SEQ ID NO: 2) and HCDR3 of QLYYFDY (SEQ ID NO: 3); and the VL region amino acid sequence comprises LCDR1 of LASQ-GIGPWLS (SEQ ID NO: 4), LCDR2 of TATSLAD (SEQ ID NO: 5) and LCDR3 of QQVAELPFG (SEQ ID NO: 10); and the heavy chain constant region comprises any one of SEQ ID NOS: 25-31;

(g) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQPLGIWLS (SEQ ID NO: 7), LCDR2 of TATSLAD (SEQ ID NO: 5) and LCDR3 of QQVAELPFG (SEQ ID NO: 10); and the heavy chain constant region comprises any one of SEQ ID NOS: 25-31;

(h) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQESGIWLG (SEQ ID NO: 12), LCDR2 of TATSLAD (SEQ ID NO: 5) and LCDR3 of QQVAELPFG (SEQ ID NO: 10); and the heavy chain constant region comprises any one of SEQ ID NOS: 25-31;

(i) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQ-GIGPWLS (SEQ ID NO: 4), LCDR2 of TATSLAD (SEQ ID NO: 5) and LCDR3 of QQVSVTPFT (SEQ ID NO: 11); and the heavy chain constant region comprises any one of SEQ ID NOS: 25-31;

(j) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQPLGIWLS (SEQ ID NO: 7), LCDR2 of TATSLAD (SEQ ID NO: 5) and LCDR3 of QQVSVTPFT (SEQ ID NO: 11); and the heavy chain constant region comprises any one of SEQ ID NOS: 25-31;

(k) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQESGIWLS (SEQ ID NO: 8), LCDR2 of TATSLAD (SEQ ID NO: 5) and LCDR3 of QQVSVTPFT (SEQ ID NO: 11); and the heavy chain constant region comprises any one of SEQ ID NOS: 25-31;

(l) the VH region amino acid sequence comprises HCDR1 of GFTFSSYMMS (SEQ ID NO: 1), HCDR2 of TISGGGANTYYVDSVKG (SEQ ID NO: 38) and HCDR3 of QLYYFDY (SEQ ID NO: 3); and the VL region amino acid sequence comprises LCDR1 of RASQESGIWLS (SEQ ID NO: 39), LCDR2 of TATSLAD (SEQ ID NO: 5) and LCDR3 of QQVSVTPFT (SEQ ID NO: 11); and the heavy chain constant region comprises any one of SEQ ID NOS: 25-31;

(m) the VH region amino acid sequence comprises HCDR1 of GFTFSSYMMS (SEQ ID NO: 1), HCDR2 of TISGGGANTYYVDSVKG (SEQ ID NO: 38) and HCDR3 of QLYYFDY (SEQ ID NO: 3); and the VL region amino acid sequence comprises LCDR1 of RASQESGIWLS (SEQ ID NO: 39), LCDR2 of TASSLAD (SEQ ID NO: 40) and LCDR3 of QQVSVTPFT (SEQ ID NO: 11); and the heavy chain constant region comprises any one of SEQ ID NOS: 25-31;

(n) the VH region amino acid sequence comprises HCDR1 of GFTFSSYMMS (SEQ ID NO: 1), HCDR2 of TISGGGANTYYVDSVKG (SEQ ID NO: 38) and HCDR3 of QLYYFDY (SEQ ID NO: 3); and the VL region amino acid sequence comprises LCDR1 of RASQESGIWLS (SEQ ID NO: 39), LCDR2 of AASSLAD (SEQ ID NO: 41) and LCDR3 of QQVSVTPFT (SEQ ID NO: 11); and the heavy chain constant region comprises any one of SEQ ID NOS: 25-31;

(o) the VH region amino acid sequence comprises HCDR1 of GFTFSSYMMS (SEQ ID NO: 1), HCDR2 of TISGGGANTYYVDSVKG (SEQ ID NO: 38) and HCDR3 of QLYYFDY (SEQ ID NO: 3); and the VL region amino acid sequence comprises LCDR1 of RASQESGIWLS (SEQ ID NO: 39), LCDR2 of AASSLOS (SEQ ID NO: 43) and LCDR3 of QQVSVTPFT (SEQ ID NO: 11); and the heavy chain constant region comprises any one of SEQ ID NOS: 25-31;

(p) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QLYYFDY (SEQ ID NO: 3); and the VL region amino acid sequence comprises LCDR1 of RASQESGIWLS (SEQ ID NO: 39), LCDR2 of TATSLAD (SEQ ID NO: 5) and LCDR3 of QQVSVTPFT (SEQ ID NO: 11); and the heavy chain constant region comprises any one of SEQ ID NOS: 25-31;

(q) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QLYYFDY (SEQ ID NO: 3); and the VL region amino acid sequence comprises LCDR1 of RASQESGIWLS (SEQ ID NO: 39), LCDR2 of TASSLAD (SEQ ID NO: 40) and LCDR3 of QQVSVTPFT (SEQ ID NO: 11); and the heavy chain constant region comprises any one of SEQ ID NOS: 25-31;

(r) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QLYYFDY (SEQ ID NO: 3); and the VL region amino acid sequence comprises LCDR1 of RASQESGIWLS (SEQ ID NO: 39), LCDR2 of AASSLAD (SEQ ID NO: 41) and LCDR3 of QQVSVTPFT (SEQ ID NO: 11); and the heavy chain constant region comprises any one of SEQ ID NOS: 25-31; or (s) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QLYYFDY (SEQ ID NO: 3); and the VL region amino acid sequence comprises LCDR1 of RASQESGIWLS (SEQ ID NO: 39), LCDR2 of AASSLOS (SEQ ID NO: 43) and LCDR3 of QQVSVTPFT (SEQ ID NO: 11); and the heavy chain constant region comprises any one of SEQ ID NOS: 25-31. In some embodiments, an antibody further comprises an immunoglobulin light chain constant region that is a kappa light chain constant region or a lambda light chain constant region.

In some aspects, disclosed herein is an anti-PD1 and anti-VEGFR2 antibody or an antigen-binding portion thereof, wherein the antibody comprises a heavy chain variable (VH) region, a light chain variable (VL) region and a heavy chain constant region, wherein

- a) the VH region amino acid sequence comprises or consists of SEQ ID NO: 13; the VL region amino acid sequence comprises or consists of SEQ ID NO: 14; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S;
- (b) the VH region amino acid sequence comprises or consists of SEQ ID NO: 13; the VL region amino acid sequence comprises or consists of SEQ ID NO: 15; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S;
- (c) the VH region amino acid sequence comprises or consists of SEQ ID NO: 13; the VL region amino acid sequence comprises or consists of SEQ ID NO: 16; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S;
- (d) the VH region amino acid sequence comprises or consists of SEQ ID NO: 13; the VL region amino acid sequence comprises or consists of SEQ ID NO: 17; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S;
- (e) the VH region amino acid sequence comprises or consists of SEQ ID NO: 13; the VL region amino acid sequence comprises or consists of SEQ ID NO: 18; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S;
- (f) the VH region amino acid sequence comprises or consists of SEQ ID NO: 13; the VL region amino acid sequence comprises or consists of SEQ ID NO: 19; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S;
- (g) the VH region amino acid sequence comprises or consists of SEQ ID NO: 13; the VL region amino acid sequence comprises or consists of SEQ ID NO: 20; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S;
- (h) the VH region amino acid sequence comprises or consists of SEQ ID NO: 13; the VL region amino acid sequence comprises or consists of SEQ ID NO: 21; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S;
- (i) the VH region amino acid sequence comprises or consists of SEQ ID NO: 13; the VL region amino acid sequence comprises or consists of SEQ ID NO: 22; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S;
- (j) the VH region amino acid sequence comprises or consists of SEQ ID NO: 13; the VL region amino acid sequence comprises or consists of SEQ ID NO: 23; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S;
- (k) the VH region amino acid sequence comprises or consists of SEQ ID NO: 13; the VL region amino acid sequence comprises or consists of SEQ ID NO: 24; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S;

(l) the VH region amino acid sequence comprises or consists of SEQ ID NO: 48; the VL region amino acid sequence comprises or consists of SEQ ID NO: 44; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S;

(m) the VH region amino acid sequence comprises or consists of SEQ ID NO: 48; the VL region amino acid sequence comprises or consists of SEQ ID NO: 45; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S;

(n) the VH region amino acid sequence comprises or consists of SEQ ID NO: 48; the VL region amino acid sequence comprises or consists of SEQ ID NO: 46; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S;

(o) the VH region amino acid sequence comprises or consists of SEQ ID NO: 48; the VL region amino acid sequence comprises or consists of SEQ ID NO: 47; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S;

(p) the VH region amino acid sequence comprises or consists of SEQ ID NO: 49; the VL region amino acid sequence comprises or consists of SEQ ID NO: 44; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S;

(q) the VH region amino acid sequence comprises or consists of SEQ ID NO: 49; the VL region amino acid sequence comprises or consists of SEQ ID NO: 45; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S;

(r) the VH region amino acid sequence comprises or consists of SEQ ID NO: 49; the VL region amino acid sequence comprises or consists of SEQ ID NO: 46; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S; or (s) the VH region amino acid sequence comprises or consists of SEQ ID NO: 49; the VL region amino acid sequence comprises or consists of SEQ ID NO: 47; and the heavy chain constant region comprises a wild-type human IgG4 constant region, a human IgG4 constant region comprising the amino acid substitution S228P, a wild-type human IgG2 constant region; a wild-type human IgG1 constant region; a human IgG1 constant region comprising the amino acid substitutions L234A, L235A and G237A; or a human IgG1 constant region comprising the amino acid substitutions L234A, L235A, G237A and P331S.

In some aspects, disclosed herein is an anti-PD1 and anti-VEGFR2 antibody or an antigen-binding portion thereof, wherein the antibody comprises a heavy chain variable (VH) region, a light chain variable (VL) region and a heavy chain constant region, wherein a) the VH region amino acid sequence comprises or consists of SEQ ID NO: 13; the VL region amino acid sequence comprises or consists of SEQ ID NO: 14; and the heavy chain constant region comprises any one of SEQ ID NOS: 25-31;

(b) the VH region amino acid sequence comprises or consists of SEQ ID NO: 13; the VL region amino acid sequence comprises or consists of SEQ ID NO: 15; and the heavy chain constant region comprises any one of SEQ ID NOS: 25-31;

(c) the VH region amino acid sequence comprises or consists of SEQ ID NO: 13; the VL region amino acid sequence comprises or consists of SEQ ID NO: 16; and the heavy chain constant region comprises any one of SEQ ID NOS: 25-31;

(d) the VH region amino acid sequence comprises or consists of SEQ ID NO: 13; the VL region amino acid sequence comprises or consists of SEQ ID NO: 17; and the heavy chain constant region comprises any one of SEQ ID NOS: 25-31;

(e) the VH region amino acid sequence comprises or consists of SEQ ID NO: 13; the VL region amino acid sequence comprises or consists of SEQ ID NO: 18; and the heavy chain constant region comprises any one of SEQ ID NOS: 25-31;

(f) the VH region amino acid sequence comprises or consists of SEQ ID NO: 13; the VL region amino acid sequence comprises or consists of SEQ ID NO: 19; and the heavy chain constant region comprises any one of SEQ ID NOS: 25-31;

(g) the VH region amino acid sequence comprises or consists of SEQ ID NO: 13; the VL region amino acid sequence comprises or consists of SEQ ID NO: 20; and the heavy chain constant region comprises any one of SEQ ID NOS: 25-31;

(h) the VH region amino acid sequence comprises or consists of SEQ ID NO: 13; the VL region amino acid sequence comprises or consists of SEQ ID NO: 21; and the heavy chain constant region comprises any one of SEQ ID NOS: 25-31;

(i) the VH region amino acid sequence comprises or consists of SEQ ID NO: 13; the VL region amino acid sequence comprises or consists of SEQ ID NO: 22; and the heavy chain constant region comprises any one of SEQ ID NOS: 25-31;

(j) the VH region amino acid sequence comprises or consists of SEQ ID NO: 13; the VL region amino acid sequence comprises or consists of SEQ ID NO: 23; and the heavy chain constant region comprises any one of SEQ ID NOS: 25-31;

(k) the VH region amino acid sequence comprises or consists of SEQ ID NO: 13; the VL region amino acid sequence comprises or consists of SEQ ID NO: 24; and the heavy chain constant region comprises any one of SEQ ID NOS: 25-31;

(l) the VH region amino acid sequence comprises or consists of SEQ ID NO: 48; the VL region amino acid sequence comprises or consists of SEQ ID NO: 44; and the heavy chain constant region comprises any one of SEQ ID NOS: 25-31;

(m) the VH region amino acid sequence comprises or consists of SEQ ID NO: 48; the VL region amino acid sequence comprises or consists of SEQ ID NO: 45; and the heavy chain constant region comprises any one of SEQ ID NOS: 25-31;

(n) the VH region amino acid sequence comprises or consists of SEQ ID NO: 48; the VL region amino acid sequence comprises or consists of SEQ ID NO: 46; and the heavy chain constant region comprises any one of SEQ ID NOS: 25-31;

(o) the VH region amino acid sequence comprises or consists of SEQ ID NO: 48; the VL region amino acid sequence comprises or consists of SEQ ID NO: 47; and the heavy chain constant region comprises any one of SEQ ID NOS: 25-31;

(p) the VH region amino acid sequence comprises or consists of SEQ ID NO: 49; the VL region amino acid sequence comprises or consists of SEQ ID NO: 44; and the heavy chain constant region comprises any one of SEQ ID NOS: 25-31;

(q) the VH region amino acid sequence comprises or consists of SEQ ID NO: 49; the VL region amino acid sequence comprises or consists of SEQ ID NO: 45; and the heavy chain constant region comprises any one of SEQ ID NOS: 25-31;

(r) the VH region amino acid sequence comprises or consists of SEQ ID NO: 49; the VL region amino acid sequence comprises or consists of SEQ ID NO: 46; and the heavy chain constant region comprises any one of SEQ ID NOS: 25-31; or (s) the VH region amino acid sequence comprises or consists of SEQ ID NO: 49; the VL region amino acid sequence comprises or consists of SEQ ID NO: 47; and the heavy chain constant region comprises any one of SEQ ID NOS: 25-31.

In some aspects, an anti-PD1 and anti-VEGFR2 antibody may be immune effector null. In some aspects, an anti-PD1 and anti-VEGFR2 antibody or an antigen-binding portion thereof does not induce immune effector function and, optionally, suppresses immune effector function. In some aspects, an anti-PD1 and anti-VEGFR2 antibody may lack measurable binding to human FcγRI, FcγRIIa, FcγRIIIa and FcγRIIIb receptors but maintain binding to human FcγRIIb receptor and optionally maintain binding to human FcRn receptor. FcγRI, FcγRIIa, FcγRIIIa and FcγRIIIb are examples of activating receptors. FcγRIIb is an example of an inhibitory receptor. FcRn is an example of a recycling receptor. In some aspects, binding affinity of an anti-PD1 and anti-VEGFR2 antibody or an antigen-binding portion thereof for human Fc receptors may be measured by BIA-CORE® analysis. In some aspects, Homogeneous Time Resolved Fluorescence (HTRF) can be used to study binding of an anti-PD1 and anti-VEGFR2 antibody to human Fc receptors. In one example of HTRF, human IgG1 (wild type) is labelled, as is the full suite of Fc gamma receptors and then antibodies with engineered Fc fragments are used in titration competition. In some aspects, PD1-positive and/or VEGFR2-positive cells may be mixed with human white blood cells and anti-PD1 and anti-VEGFR2 antibodies, and cell killing by CDC, ADCC and/or ADCP may be measured. In some aspects, an anti-PD1 and anti-VEGFR2 antibody comprising an amino acid sequence of an Fc region of human IgG1-3M (see Table 6) is effector null. In some aspects, an anti-PD1 and anti-VEGFR2 antibody comprising an amino acid sequence of an Fc region of human IgG1-3M (see Table 6) is not effector null.

The antibody molecule or antigen-binding portion thereof may be a Fab fragment, a F(ab)$_2$ fragment, an Fv fragment, a tetrameric antibody, a tetravalent antibody, a multispecific antibody (for example, a bivalent antibody), a domain-specific antibody, a single domain antibody, a monoclonal antibody or a fusion protein. In one embodiment, an antibody may be a multispecific antibody that comprises two or more antigen-binding domains. In some embodiments, the first antigen-binding domain binds specifically to PD1 and VEGFR2, and the second antigen-binding domain binds specifically to an antigen that is neither PD1 nor VEGFR2. Antibody molecules and methods for their construction and use are described, in for example Holliger & Hudson (2005, Nature Biotechnol. 23 (9): 1126-1136).

In another aspect of the invention, there is provided an immunoconjugate comprising the antibody molecule or antigen-binding portion thereof of the invention as defined herein linked a therapeutic agent.

Examples of suitable therapeutic agents include cytotoxins, radioisotopes, chemotherapeutic agents, immunomodulatory agents, anti-angiogenic agents, antiproliferative agents, pro-apoptotic agents, and cytostatic and cytolytic enzymes (for example RNAses). Further therapeutic agents include a therapeutic nucleic acid, such as a gene encoding an immunomodulatory agent, an anti-angiogenic agent, an anti-proliferative agent, or a pro-apoptotic agent. These drug descriptors are not mutually exclusive, and thus a therapeutic agent may be described using one or more of the above terms.

Examples of suitable therapeutic agents for use in immunoconjugates include the taxanes, maytansines, CC-1065 and the duocarmycins, the calicheamicins and other enediynes, and the auristatins. Other examples include the anti-folates, vinca alkaloids, and the anthracyclines. Plant toxins, other bioactive proteins, enzymes (i.e., ADEPT), radioisotopes, photosensitizers may also be used in immunoconjugates. In addition, conjugates can be made using secondary carriers as the cytotoxic agent, such as liposomes or polymers, Suitable cytotoxins include an agent that inhibits or prevents the function of cells and/or results in destruction of cells. Representative cytotoxins include antibiotics, inhibitors of tubulin polymerization, alkylating agents that bind to and disrupt DNA, and agents that disrupt protein synthesis or the function of essential cellular proteins such as protein kinases, phosphatases, topoisomerases, enzymes, and cyclins.

Representative cytotoxins include, but are not limited to, doxorubicin, daunorubicin, idarubicin, aclarubicin, zorubicin, mitoxantrone, epirubicin, carubicin, nogalamycin, menogaril, pitarubicin, valrubicin, cytarabine, gemcitabine, trifluridine, ancitabine, enocitabine, azacitidine, doxifluhdine, pentostatin, broxuhdine, capecitabine, cladhbine, decitabine, floxuhdine, fludarabine, gougerotin, puromycin, tegafur, tiazofuhn, adhamycin, cisplatin, carboplatin, cyclophosphamide, dacarbazine, vinblastine, vincristine, mitoxantrone, bleomycin, mechlorethamine, prednisone, procarbazine, methotrexate, flurouracils, etoposide, taxol, taxol analogs, platins such as cis-platin and carbo-platin, mitomycin, thiotepa, taxanes, vincristine, daunorubicin, epirubicin, actinomycin, authramycin, azaserines, bleomycins, tamoxifen, idarubicin, dolastatins/auristatins, hemiasterlins, esperamicins and maytansinoids.

Suitable immunomodulatory agents include anti-hormones that block hormone action on tumors and immunosuppressive agents that suppress cytokine production, downregulate self-antigen expression, or mask MHC antigens.

Also provided is a nucleic acid molecule encoding the antibody molecule or antigen-binding portion thereof of the invention as defined herein. A nucleic acid molecule may encode (a) the VH region amino acid sequence; (b) the VL region amino acid sequence; or (c) both the VH and the VL region amino acid sequences of an anti-PD1 and anti-VEGFR2 antibody or an antigen-binding portion thereof described herein. In some aspects, the nucleic acid molecule as defined herein may be isolated.

Further provided is a vector comprising the nucleic acid molecule of the invention as defined herein. The vector may be an expression vector.

Also provided is a host cell comprising the nucleic acid molecule or the vector of the invention as defined herein. The host cell may be a recombinant host cell. In some aspects, a host cell may comprise a vector comprising a nucleic acid molecule that encodes both the VH region amino acid sequence and the VL region amino acid sequence of an anti-PD1 and anti-VEGFR2 antibody or an antigen-binding portion thereof described herein. In some aspects, a host cell may comprise a first vector comprising a nucleic acid molecule that encodes the VH region amino acid sequence and a second vector comprising a nucleic acid molecule that encodes the VL region amino acid sequence of an anti-PD1 and anti-VEGFR2 antibody or an antigen-binding portion thereof described herein.

In a further aspect there is provided a method of producing an anti-PD1 and anti-VEGFR2 antibody and/or an antigen-binding portion thereof, comprising culturing the host cell of the invention under conditions that result in expression and/or production of the antibody and/or the antigen-binding portion thereof, and isolating the antibody and/or the antigen-binding portion thereof from the host cell or culture.

In another aspect of the invention there is provided a pharmaceutical composition comprising the antibody molecule or antigen-binding portion thereof of the invention as defined herein, or the nucleic acid molecule of the invention as defined herein, or the vector of the invention as defined herein.

Further provided is a method for enhancing an immune response in a subject, comprising administering to the subject an effective amount of the antibody molecule or antigen-binding portion thereof of the invention as defined herein, or the immunoconjugate of the invention as defined herein, or the nucleic acid molecule of the invention as defined herein, or the vector of the invention as defined herein, or the pharmaceutical composition of the invention as defined herein.

In a further aspect there is provided a method for treating or preventing cancer in a subject, comprising administering to the subject an effective amount of the antibody molecule or antigen-binding portion thereof of the invention as defined herein, or the immunoconjugate of the invention as defined herein, or the nucleic acid molecule of the invention as defined herein, or the vector of the invention as defined herein, or the pharmaceutical composition of the invention as defined herein. In some embodiments, the cancer is associated with expression or overexpression of PD1 and/or VEGFR2.

For example, the cancer may be pancreatic cancer, melanoma, breast cancer, lung cancer, bronchial cancer, colorectal cancer, prostate cancer, stomach cancer, ovarian cancer, urinary bladder cancer, brain or central nervous system cancer, peripheral nervous system cancer, esophageal cancer, cervical cancer, uterine or endometrial cancer, cancer of the oral cavity or pharynx, liver cancer, kidney cancer, testicular cancer, biliary tract cancer, small bowel or appendix cancer, salivary gland cancer, thyroid gland cancer, adrenal gland cancer, osteosarcoma, chondrosarcoma, or cancer of hematological tissues.

The invention also provides an antibody molecule or antigen-binding portion thereof of the invention as defined herein, or the immunoconjugate of the invention as defined herein, or the nucleic acid molecule of the invention as defined herein, or the vector of the invention as defined herein, or the pharmaceutical composition of the invention as defined herein, for use in the treatment of cancer.

In another aspect the invention provides the antibody molecule, or antigen-binding portion thereof, or the immunoconjugate, or the nucleic acid molecule, or the vector for use, or the method of treatment of the invention as defined herein, for separate, sequential or simultaneous use in a combination combined with a second therapeutic agent, for example an anti-cancer agent.

In a further aspect there is provided the use of an antibody molecule or antigen-binding portion thereof of the invention as defined herein, or an immunoconjugate of the invention as defined herein, or a nucleic acid molecule of the invention as defined herein, or a vector of the invention as defined herein, or a pharmaceutical composition of the invention as defined herein, in the manufacture of a medicament for the treatment of cancer.

The invention also provides a method for treating or preventing an infectious or immune disease in a subject, comprising administering to the subject an effective amount of the antibody molecule or antigen-binding portion thereof as defined herein, or the immunoconjugate as defined here, or the nucleic acid molecule as defined herein, or the vector as defined herein, or the pharmaceutical composition as defined herein.

In one embodiment, the invention provides an anti-PD1 and anti-VEGFR2 antibody or an antigen-binding portion thereof comprising the amino acid sequences disclosed herein for use in therapy.

The pharmaceutical composition of the invention may comprise a pharmaceutically acceptable excipient, carrier, or diluent. A pharmaceutically acceptable excipient may be a compound or a combination of compounds entering into a pharmaceutical composition which does not provoke secondary reactions and which allows, for example, facilitation of the administration of the anti-PD1 and anti-VEGFR2 antibody molecule, an increase in its lifespan and/or in its efficacy in the body or an increase in its solubility in solution. These pharmaceutically acceptable vehicles are well known and will be adapted by the person skilled in the art as a function of the mode of administration of the anti-PD1 and anti-VEGFR2 antibody molecule.

In some embodiments, the anti-PD1 and anti-VEGFR2 antibody molecule may be provided in a lyophilised form for reconstitution prior to administration. For example, lyophilised antibody molecules may be re-constituted in sterile water and mixed with saline prior to administration to an individual.

The anti-PD1 and anti-VEGFR2 antibody molecules will usually be administered in the form of a pharmaceutical composition, which may comprise at least one component in addition to the antibody molecule. Thus pharmaceutical compositions may comprise, in addition to the anti-PD1 and anti-VEGFR2 antibody molecule, a pharmaceutically acceptable excipient, carrier, buffer, stabilizer or other materials well known to those skilled in the art. Such materials should be non-toxic and should not interfere with the efficacy of the anti-PD1 and anti-VEGFR2 antibody molecule. The precise nature of the carrier or other material will depend on the route of administration, which may be by bolus, infusion, injection or any other suitable route, as discussed below.

For parenteral, for example sub-cutaneous or intra-venous administration, e.g. by injection, the pharmaceutical composition comprising the anti-PD1 and anti-VEGFR2 antibody molecule may be in the form of a parenterally acceptable aqueous solution which is pyrogen- free and has suitable pH, isotonicity and stability. Those of relevant skill in the art are well able to prepare suitable solutions using, for example, isotonic vehicles, such as Sodium Chloride Injection, Ringer's Injection, Lactated Ringer's Injection. Preservatives, stabilizers, buffers, antioxidants and/or other additives may be employed as required including buffers such as phosphate, citrate and other organic acids; antioxidants, such as ascorbic acid and methionine; preservatives (such as octadecyldimethylbenzyl ammonium chloride; hexamethonium chloride; benzalkonium chloride; benzethonium chloride; phenol, butyl or benzyl alcohol; alkyl parabens, such as methyl or propyl paraben; catechol; resorcinol; cyclohexanol; 3'-pentanol; and m-cresol); low molecular weight polypeptides; proteins, such as serum albumin, gelatin or immunoglobulins; hydrophilic polymers, such as polyvinylpyrrolidone; amino acids, such as glycine, glutamine, asparagines, histidine, arginine, or lysine; monosaccharides, disaccharides and other carbohydrates including glucose, mannose or dextrins; chelating agents, such as EDTA; sugars, such as sucrose, mannitol, trehalose or sorbitol; salt-forming counter-ions, such as sodium; metal complexes (e.g. Zn-protein complexes); and/or non-ionic surfactants, such as TWEEN™, PLURONICS™ or polyethylene glycol (PEG).

A pharmaceutical composition comprising an anti-PD1 and anti-VEGFR2 antibody molecule may be administered alone or in combination with other treatments, either simultaneously or sequentially dependent upon the condition to be treated.

An anti-PD1 and anti-VEGFR2 antibody molecule as described herein may be used in a method of treatment of the human or animal body, including prophylactic or preventative treatment (e.g. treatment before the onset of a condition in an individual to reduce the risk of the condition occurring in the individual; delay its onset; or reduce its severity after onset). The method of treatment may comprise administering the anti-PD1 and anti-VEGFR2 antibody molecule to an individual in need thereof.

Administration is normally in a "therapeutically effective amount", this being sufficient to show benefit to a patient. Such benefit may be at least amelioration of at least one symptom. The actual amount administered, and rate and time-course of administration, will depend on the nature and severity of what is being treated, the particular mammal being treated, the clinical condition of the individual patient, the cause of the disorder, the site of delivery of the composition, the method of administration, the scheduling of administration and other factors known to medical practitioners. Prescription of treatment, e.g. decisions on dosage etc., is within the responsibility of general practitioners and other medical doctors and may depend on the severity of the symptoms and/or progression of a disease being treated. Appropriate doses of antibody molecules are well known in the art (Ledermann J. A. et al., 1991, Int. J. Cancer 47:659-664; Bagshawe K. D. et al., 1991, Antibody, Immunoconjugates and Radiopharmaceuticals 4:915-922). Specific dosages may be indicated herein or in the Physician's Desk Reference (2003) as appropriate for the type of medicament being administered may be used. A therapeutically effective amount or suitable dose of an antibody molecule may be determined by comparing its in vitro activity and in vivo activity in an animal model. Methods for extrapolation of effective dosages in mice and other test animals to humans are known. The precise dose will depend upon a number of factors, including whether the antibody is for prevention or for treatment, the size and location of the area to be treated, the precise nature of the antibody (e.g. whole antibody, fragment) and the nature of any detectable label or other molecule attached to the antibody.

A typical antibody dose will be in the range 100 μg to 1 g for systemic applications, and 1 μg to 1 mg for topical applications. An initial higher loading dose, followed by one or more lower doses, may be administered. Typically, the antibody will be a whole antibody, e.g. the IgG1 or IgG4 isotype. This is a dose for a single treatment of an adult patient, which may be proportionally adjusted for children and infants, and also adjusted for other antibody formats in proportion to molecular weight. Treatments may be repeated at daily, twice-weekly, weekly or monthly intervals, at the discretion of the physician. The treatment schedule for an individual may be dependent on the pharmocokinetic and pharmacodynamic properties of the antibody composition, the route of administration and the nature of the condition being treated.

Treatment may be periodic, and the period between administrations may be about two weeks or more, e.g. about three weeks or more, about four weeks or more, about once a month or more, about five weeks or more, or about six weeks or more. For example, treatment may be every two to four weeks or every four to eight weeks. Treatment may be given before, and/or after surgery, and/or may be administered or applied directly at the anatomical site of surgical treatment or invasive procedure. Suitable formulations and routes of administration are described above.

In some embodiments, anti-PD1 and anti-VEGF antibody molecules as described herein may be administered as sub-cutaneous injections. Sub-cutaneous injections may be administered using an auto-injector, for example for long term prophylaxis/treatment.

In some embodiments, the therapeutic effect of the anti-PD1 and anti-VEGF antibody molecule may persist for several half-lives, depending on the dose. For example, the therapeutic effect of a single dose of the anti-PD1 and anti-VEGF antibody molecule may persist in an individual for 1 month or more, 2 months or more, 3 months or more, 4 months or more, 5 months or more, or 6 months or more.

The invention also provides a method of producing an antibody molecule which specifically binds to human PD1 and human VEGFR2 and optionally also to cynomolgus monkey PD1 and monkey VEGFR2, or an antigen-binding portion thereof, comprising the steps of:

(1) grafting anti-PD1 CDRs from a non-human source into a human v-domain framework to produce a humanized anti-PD1 antibody molecule or antigen-binding portion thereof;
(2) generating a library of clones of the humanized anti-PD1 antibody molecule or antigen-binding portion thereof comprising one or more mutations in the CDRs;
(3) screening the library for binding to human PD1 and optionally also to cynomolgus monkey PD1, human VEGFR2 and rhesus monkey VEGFR2;
(4) selecting clones from the screening step (3) having binding specificity to human PD1 and optionally also to cynomolgus monkey PD1, human VEGFR2 and rhesus monkey VEGFR2; and
(5) producing an antibody molecule which specifically binds to human PD1 and optionally also to cynomolgus monkey PD1 human VEGFR2 and rhesus monkey VEGFR2, or an antigen-binding portion thereof from clones selected from step (4);
(6) carrying out germlining mutagenesis testing in the CDRs to ascertain the potential to further improve the molecular qualities of the antibody.

The method may comprise a further step of producing additional clones based on the clones selected in step (4), for example based on further exploratory mutagenesis at specific positions in the CDRs of the clones selected in step (4), to enhance humanization and/or minimise human T cell epitope content and/or improve manufacturing properties in the antibody molecule or antigen-binding portion thereof produced in step (5).

As used herein, the term "PD1" refers to Programmed Cell Death Protein 1 and variants thereof that retain at least part of the biological activity of PD1. As used herein, PD1 may include all species of native sequence PD1, including human, rat, mouse and chicken. The term "PD1" may be used to include variants, isoforms and species homologs of human PD1.In some embodiments, "PD1" refers to the wild-type human form of PD1. Antibodies of the invention may cross-react with PD1 from species other than human, in particular PD1 from cynomolgus monkey (*Macaca fascicularis*). Examples of human and cynomolgus PD1 amino acid sequences are provided in Table 7. In certain embodiments, the antibodies may be completely specific for human PD1 and may not exhibit non-human cross-reactivity.

As used herein, the term "VEGFR" refers to Vascular Endothelial Growth Factor Receptor 2 (also known as KDR or FLK1) and variants thereof that retain at least part of the biological activity of VEGFR2. As used herein, VEGFR2 may include all species of native sequence VEGFR2, including human, rat, mouse and chicken. The term "VEGFR2" may be used to include variants, isoforms and species homologs of human VEGFR2. In some embodiments, "VEGFR2" refers to the wild-type human form of VEGFR2. Antibodies of the invention may cross-react with VEGFR2 from species other than human, in particular VEGFR2 from rhesus monkey (*Macaca mulatta*). Examples of human and rhesus VEGFR2 amino acid sequences are provided in Table 7. In certain embodiments, the antibodies may be completely specific for human VEGFR2 and may not exhibit non-human cross-reactivity.

As used herein, an "antagonist" as used in the context of the antibody of the invention or an "anti-PD1 and anti-VEGFR2 antagonist antibody" (interchangeably termed "anti-PD1 and anti-VEGFR2 antibody") refers to an antibody which is able to bind to PD1 and VEGFR2 and inhibit PD1 and VEGFR2 biological activity and/or downstream pathway(s) mediated by PD1 and/or VEGFR2 signalling. An anti-PD1 and anti-VEGFR2 antagonist antibody encompasses antibodies that can block, antagonize, suppress or reduce (including significantly) PD1 and VEGFR2 biological activity, including downstream pathways mediated by PD1 and/or VEGFR2 signalling, such as receptor binding and/or elicitation of a cellular response to PD1 and VEGFR2. For the purposes of the present invention, it will be explicitly understood that the term "anti-PD1 and anti-VEGFR2 antagonist antibody" encompass all the terms, titles, and functional states and characteristics whereby PD1 and VEGFR2 themselves, and PD1 and VEGFR2 biological activity (including but not limited to its ability to suppress the activation of anti-tumour cell activity of T cells), or the consequences of the activity or biological activity, are substantially nullified, decreased, or neutralized in any meaningful degree.

The antibody "specifically binds" "specifically interacts", "preferentially binds", "binds" or "interacts" with PD1 or VEGFR2 if it binds with greater affinity, avidity, more readily and/or with greater duration than it binds to other receptors.

An "antibody molecule" is an immunoglobulin molecule capable of specific binding to a target, such as a carbohydrate, polynucleotide, lipid, polypeptide, etc., through at least one antigen recognition site, located in the variable region of the immunoglobulin molecule. As used herein, the term "antibody molecule" encompasses not only intact polyclonal or monoclonal antibodies, but also any antigen binding fragment (for example, an "antigen-binding portion") or single chain thereof, fusion proteins comprising an antibody, and any other modified configuration of the immunoglobulin molecule that comprises an antigen recognition site including, for example without limitation, scFv, single domain antibodies (for example, shark and camelid antibodies), maxibodies, minibodies, intrabodies, diabodies, triabodies, tetrabodies, v-NAR and bis-scFv.

An "antibody molecule" encompasses an antibody of any class, such as IgG, IgA, or IgM (or sub-class thereof), and the antibody need not be of any particular class. Depending on the antibody amino acid sequence of the constant region of its heavy chains, immunoglobulins can be assigned to different classes. There are five major classes of immunoglobulins: IgA, IgD, IgE, IgG, and IgM, and several of these may be further divided into subclasses (isotypes), for example IgG1, IgG2, IgG3, IgG4, IgA1 and IgA2. The heavy-chain constant regions that correspond to the different classes of immunoglobulins are called alpha, delta, epsilon, gamma, and mu, respectively. The subunit structures and three-dimensional configurations of different classes of immunoglobulins are well known.

The term "antigen binding portion" of an antibody molecule, as used herein, refers to one or more fragments of an intact antibody that retain the ability to specifically bind to PD1. Antigen binding functions of an antibody molecule can be performed by fragments of an intact antibody. Examples of binding fragments encompassed within the term "antigen binding portion" of an antibody molecule include Fab; Fab'; F(ab')2; an Fd fragment consisting of the VH and CH1 domains; an Fv fragment consisting of the VL and VH domains of a single arm of an antibody; a single domain antibody (dAb) fragment, and an isolated complementarity determining region (CDR).

The term "Fc region" is used to define a C-terminal region of an immunoglobulin heavy chain. The "Fc region" may be a native sequence Fc region or a variant Fc region. Although the boundaries of the Fc region of an immunoglobulin heavy chain might vary, the human IgG heavy chain Fc region is usually defined to stretch from an amino acid residue at position Cys226, or from Pro230, to the carboxyl-terminus thereof. The numbering of the residues in the Fc region is that of the EU index as in Kabat. The Fc region of an immunoglobulin generally comprises two constant domains, CH2 and CH3. As is known in the art, an Fc region can be present in dimer or monomeric form.

A "variable region" of an antibody refers to the variable region of the antibody light chain or the variable region of the antibody heavy chain, either alone or in combination. As known in the art, the variable regions of the heavy and light chain each consist of four framework regions (FRs) connected by three complementarity determining regions (CDRs) also known as hypervariable regions, contribute to the formation of the antigen binding site of antibodies. When choosing FR to flank CDRs, for example when humanizing or optimizing an antibody, FRs from antibodies which contain CDR sequences in the same canonical class are preferred.

The CDR definitions used in the present application combine the domains used in the many disparate, often conflicting schemes that have been created in the field, which are based on the combination of immunoglobulin repertoire analyses and structural analyses of antibodies in isolation and in their co-crystals with antigens (see review by Swindells et al., 2016, abYsis: Integrated Antibody Sequence and Structure-Management, Analysis, and Prediction. J Mol Biol. [PMID: 27561707; Epub 22 Aug. 2016]). The CDR definition used herein (a "Unified" definition) incorporates the lessons of all such prior insights and includes all appropriate loop positions required to sample the full residue landscape that potentially mediates target-binding complementarity.

Table 1 shows the amino acid sequences of the VL domain of MAb005 humanized anti-PD1 antibody with CDRs as defined herein. Table 2 shows the amino acid sequences of the VH domain of MAb005 humanized anti-PD1 antibody with CDRs as defined herein.

As used herein the term "conservative substitution" refers to replacement of an amino acid with another amino acid which does not significantly deleteriously change the functional activity. A preferred example of a "conservative substitution" is the replacement of one amino acid with another amino acid which has a value ≥0 in the following BLOSUM 62 substitution matrix (see Henikoff & Henikoff, 1992, PNAS 89:10915-10919):

|   | A | R | N | D | C | Q | E | G | H | I | L | K | M | F | P | S | T | W | Y | V |
|---|---|---|---|---|---|---|---|---|---|---|---|---|---|---|---|---|---|---|---|---|
| A | 4 | -1 | -2 | -2 | 0 | -1 | -1 | 0 | -2 | -1 | -1 | -1 | -1 | -2 | -1 | 1 | 0 | -3 | -2 | 0 |
| R | -1 | 5 | 0 | -2 | -3 | 1 | 0 | -2 | 0 | -3 | -2 | 2 | -1 | -3 | -2 | -1 | -1 | -3 | -2 | -3 |
| N | -2 | 0 | 6 | 1 | -3 | 0 | 0 | 0 | 1 | -3 | -3 | 0 | -2 | -3 | -2 | 1 | 0 | -4 | -2 | -3 |
| D | -2 | -2 | 1 | 6 | -3 | 0 | 2 | -1 | -1 | -3 | -4 | -1 | -3 | -3 | -1 | 0 | -1 | -4 | -3 | -3 |
| C | 0 | -3 | -3 | -3 | 9 | -3 | -4 | -3 | -3 | -1 | -1 | -3 | -1 | -2 | -3 | -1 | -1 | -2 | -2 | -1 |
| Q | -1 | 1 | 0 | 0 | -3 | 5 | 2 | -2 | 0 | -3 | -2 | 1 | 0 | -3 | -1 | 0 | -1 | -2 | -1 | -2 |
| E | -1 | 0 | 0 | 2 | -4 | 2 | 5 | -2 | 0 | -3 | -3 | 1 | -2 | -3 | -1 | 0 | -1 | -3 | -2 | -2 |
| G | 0 | -2 | 0 | -1 | -3 | -2 | -2 | 6 | -2 | -4 | -4 | -2 | -3 | -3 | -2 | 0 | -2 | -2 | -3 | -3 |
| H | -2 | 0 | 1 | -1 | -3 | 0 | 0 | -2 | 8 | -3 | -3 | -1 | -2 | -1 | -2 | -1 | -2 | -2 | 2 | -3 |
| I | -1 | -3 | -3 | -3 | -1 | -3 | -3 | -4 | -3 | 4 | 2 | -3 | 1 | 0 | -3 | -2 | -1 | -3 | -1 | 3 |
| L | -1 | -2 | -3 | -4 | -1 | -2 | -3 | -4 | -3 | 2 | 4 | -2 | 2 | 0 | -3 | -2 | -1 | -2 | -1 | 1 |
| K | -1 | 2 | 0 | -1 | -3 | 1 | 1 | -2 | -1 | -3 | -2 | 5 | -1 | -3 | -1 | 0 | -1 | -3 | -2 | -2 |
| M | -1 | -1 | -2 | -3 | -1 | 0 | -2 | -3 | -2 | 1 | 2 | -1 | 5 | 0 | -2 | -1 | -1 | -1 | -1 | 1 |
| F | -2 | -3 | -3 | -3 | -2 | -3 | -3 | -3 | -1 | 0 | 0 | -3 | 0 | 6 | -4 | -2 | -2 | 1 | 3 | -1 |
| P | -1 | -2 | -2 | -1 | -3 | -1 | -1 | -2 | -2 | -3 | -3 | -1 | -2 | -4 | 7 | -1 | -1 | -4 | -3 | -2 |
| S | 1 | -1 | 1 | 0 | -1 | 0 | 0 | 0 | -1 | -2 | -2 | 0 | -1 | -2 | -1 | 4 | 1 | -3 | -2 | -2 |
| T | 0 | -1 | 0 | -1 | -1 | -1 | -1 | -2 | -2 | -1 | -1 | -1 | -1 | -2 | -1 | 1 | 5 | -2 | -2 | 0 |
| W | -3 | -3 | -4 | -4 | -2 | -2 | -3 | -2 | -2 | -3 | -2 | -3 | -1 | 1 | -4 | -3 | -2 | 11 | 2 | -3 |
| Y | -2 | -2 | -2 | -3 | -2 | -1 | -2 | -3 | 2 | -1 | -1 | -2 | -1 | 3 | -3 | -2 | -2 | 2 | 7 | -1 |
| V | 0 | -3 | -3 | -3 | -1 | -2 | -2 | -3 | -3 | 3 | 1 | -2 | 1 | -1 | -2 | -2 | 0 | -3 | -1 | 4. |

The term "monoclonal antibody" (Mab) refers to an antibody, or antigen-binding portion thereof, that is derived from a single copy or clone, including for example any eukaryotic, prokaryotic, or phage clone, and not the method by which it is produced. Preferably, a monoclonal antibody of the invention exists in a homogeneous or substantially homogeneous population.

A "humanized" antibody molecule refers to a form of non-human (for example, murine) antibody molecules, or antigen-binding portion thereof, that are chimeric immunoglobulins, immunoglobulin chains, or fragments thereof (such as Fv, Fab, Fab', F(ab')2 or other antigen-binding subsequences of antibodies) that contain minimal sequence derived from non-human immunoglobulin. Humanized antibodies may be human immunoglobulins (recipient antibody) in which residues from a CDR of the recipient are replaced by residues from a CDR of a non-human species (donor antibody) such as mouse, rat, or rabbit having the desired specificity, affinity, and capacity.

"Human antibody or fully human antibody" refers to an antibody molecule, or antigen-binding portion thereof, derived from transgenic mice carrying human antibody genes or from human cells.

The term "chimeric antibody" is intended to refer to an antibody molecule, or antigen-binding portion thereof, in which the variable region sequences are derived from one species and the constant region sequences are derived from another species, such as an antibody molecule in which the variable region sequences are derived from a mouse antibody and the constant region sequences are derived from a human antibody.

"Antibody-drug conjugate" and "immunoconjugate" refer to an antibody molecule, or antigen-binding portion thereof, including antibody derivatives that binds to PD1 and VEGFR2 and is conjugated to cytotoxic, cytostatic and/or therapeutic agents.

Antibody molecules of the invention, or antigen-binding portion thereof, can be produced using techniques well known in the art, for example recombinant technologies, phage display technologies, synthetic technologies or combinations of such technologies or other technologies readily known in the art.

The term "isolated molecule" (where the molecule is, for example, a polypeptide, a polynucleotide, or an antibody) is a molecule that by virtue of its origin or source of derivation (1) is not associated with naturally associated components that accompany it in its native state, (2) is substantially free of other molecules from the same species (3) is expressed by a cell from a different species, or (4) does not occur in nature. Thus, a molecule that is chemically synthesized, or expressed in a cellular system different from the cell from which it naturally originates, will be "isolated" from its naturally associated components. A molecule also may be rendered substantially free of naturally associated components by isolation, using purification techniques well known in the art. Molecule purity or homogeneity may be assayed by a number of means well known in the art. For example, the purity of a polypeptide sample may be assayed using polyacrylamide gel electrophoresis and staining of the gel to visualize the polypeptide using techniques well known in the art. For certain purposes, higher resolution may be provided by using HPLC or other means well known in the art for purification.

The term "epitope" refers to that portion of a molecule capable of being recognized by and bound by an antibody molecule, or antigen-binding portion thereof, at one or more of the antibody molecule's antigen-binding regions. Epitopes can consist of defined regions of primary secondary or tertiary protein structure and includes combinations of secondary structural units or structural domains of the target recognised by the antigen binding regions of the antibody, or antigen-binding portion thereof. Epitopes can likewise consist of a defined chemically active surface grouping of molecules such as amino acids or sugar side chains and have specific three-dimensional structural characteristics as well as specific charge characteristics. The term "antigenic epitope" as used herein, is defined as a portion of a polypeptide to which an antibody molecule can specifically bind as determined by any method well known in the art, for example, by conventional immunoassays, antibody competitive binding assays or by x-ray crystallography or related structural determination methods (for example NMR).

The term "binding affinity" or "KD" refers to the dissociation rate of a particular antigen-antibody interaction. The KD is the ratio of the rate of dissociation, also called the "off-rate ($K_{off}$)", to the association rate, or "on-rate ($K_{on}$)". Thus, $K_D$ equals $K_{off}/K_{on}$ and is expressed as a molar concentration (M). It follows that the smaller the $K_D$, the stronger the affinity of binding. Therefore, a $K_D$ of 1 μM indicates weak binding affinity compared to a $K_D$ of 1 nM. KD values for antibodies can be determined using methods well established in the art. One method for determining the KD of an antibody is by using surface plasmon resonance (SPR), typically using a biosensor system such as a Biacore® system.

The term "potency" is a measurement of biological activity and may be designated as $IC_{50}$, or effective concentration of an antibody or antibody drug conjugate to the antigen PD1 or VEGFR2 to inhibit 50% of activity measured in a PD1 or VEGFR2 activity assay as described herein.

The phrase "effective amount" or "therapeutically effective amount" as used herein refers to an amount necessary (at dosages and for periods of time and for the means of administration) to achieve the desired therapeutic result. An effective amount is at least the minimal amount, but less than a toxic amount, of an active agent which is necessary to impart therapeutic benefit to a subject.

The term "inhibit" or "neutralize" as used herein with respect to bioactivity of an antibody molecule of the invention means the ability of the antibody to substantially antagonize, prohibit, prevent, restrain, slow, disrupt, eliminate, stop, reduce or reverse for example progression or severity of that which is being inhibited including, but not limited to, a biological activity or binding interaction of the antibody molecule to PD1 or VEGFR2.

A "host cell" includes an individual cell or cell culture that can be or has been a recipient for vector(s) for incorporation of polynucleotide inserts. Host cells include progeny of a single host cell, and the progeny may not necessarily be completely identical (in morphology or in genomic DNA complement) to the original parent cell due to natural, accidental, or deliberate mutation. A host cell includes cells transfected in vivo with a polynucleotide(s) of this invention.

As used herein, "vector" means a construct, which is capable of delivering, and, preferably, expressing, one or more gene(s) or sequence(s) of interest in a host cell. Examples of vectors include, but are not limited to, viral vectors, naked DNA or RNA expression vectors, plasmid, cosmid or phage vectors, DNA or RNA expression vectors associated with cationic condensing agents, DNA or RNA expression vectors encapsulated in liposomes, and certain eukaryotic cells, such as producer cells.

The term "treating", as used herein, unless otherwise indicated, means reversing, alleviating, inhibiting the progress of, delaying the progression of, delaying the onset of, or preventing the disorder or condition to which such term applies, or one or more symptoms of such disorder or condition. The term "treatment", as used herein, unless otherwise indicated, refers to the act of treating as defined above. The term "treating" also includes adjuvant and neo-adjuvant treatment of a subject. For the avoidance of doubt, reference herein to "treatment" includes reference to curative, palliative and prophylactic treatment. For the avoidance of doubt, references herein to "treatment" also include references to curative, palliative and prophylactic treatment.

It is understood that wherever embodiments are described herein with the language "comprising," otherwise analogous embodiments described in terms of "consisting of" and/or "consisting essentially of" are also provided.

Where aspects or embodiments of the invention are described in terms of a Markush group or other grouping of alternatives, the present invention encompasses not only the entire group listed as a whole, but each member of the group individually and all possible subgroups of the main group, but also the main group absent one or more of the group members. The present invention also envisages the explicit exclusion of one or more of any of the group members in the claimed invention.

Unless otherwise defined, all technical and scientific terms used herein have the same meaning as commonly understood by one of ordinary skill in the art to which this invention belongs. In case of conflict, the present specification, including definitions, will control. Throughout this specification and claims, the word "comprise," or variations such as "comprises" or "comprising" will be understood to imply the inclusion of a stated integer or group of integers but not the exclusion of any other integer or group of integers. Unless otherwise required by context, singular terms shall include pluralities and plural terms shall include the singular. Any example(s) following the term "e.g." or "for example" is not meant to be exhaustive or limiting.

The practice of the present invention will employ, unless otherwise indicated, conventional techniques of molecular biology (including recombinant techniques), microbiology, cell biology, biochemistry and immunology, which are within the skill of the art.

Particular non-limiting embodiments of the present invention will now be described with reference to accompanying drawings.

EXAMPLE 1. GENERATION OF OPTIMIZED ANTI-PD1 THERAPEUTIC ANTIBODIES

Introduction

In this example, we successfully generate a panel of antagonistic, optimized, anti-PD1 antibodies that are also simultaneously antagonists of VEGFR2. These anti-PD1 antibodies are well expressed, biophysically stable, highly soluble and of maximized identity to preferred human germlines.

Materials and Methods

PD1 Library Generation and Selection

The PD1 Fab repertoire was assembled by mass oligo synthesis and PCR. Mutagenesis was applied to CDR and CDR-proximal regions of the VL (Table 1) and VH (Table 2) domains. The amplified Fab repertoire was then cloned via restriction-ligation into a phagemid vector, transformed into E. coli TG-1 cells, and the phage repertoire rescued essentially as previously described in detail (Finlay et al., 2011, Methods Mol Biol 681:383-401).

Phage selections were performed by coating streptavidin magnetic microbeads with biotinylated PD1 or VEGFR2 target protein (either human or monkey), washing the beads thrice with PBS and resuspending in PBS pH 7.4 plus 5% skim milk protein. These beads were coated at 100 nM target protein in round 1 of selection, followed by reduced antigen concentrations in three successive rounds. In each round, phage were eluted using trypsin before re-infection into TG1 cells.

Periplasmic Extracts Production (Small-Scale)

Production of soluble Fabs in individual E. coli clones was performed. E. coli TG1 cells in logarhythmic growth phase were induced with isopropyl 1-thio-β-D-galactopyranoside. Periplasmic extracts containing soluble Fab were generated by a freeze/thaw cycle: Bacterial cell pellets were frozen at −20° C. for overnight and then thawed at room temperature and resuspended in PBS pH 7.4. The supernatants containing the soluble Fab were collected after shaking at room temperature and centrifugation.

IgG Expression and Purification

Mammalian codon-optimized synthetic genes encoding the heavy and light chain variable domains of the lead panel anti-PD1 antibodies plus the Mab005 were cloned into mammalian expression vectors comprising effector function null human IgG1 ('IgG1null'; human IgG1 containing L234A, L235A, G237A mutations in the lower hinge that abrogate normal immunoglobulin ADCC, ADCP and CDC functions) and human $C_\kappa$ domains, respectively. Co-transfection of heavy and light chain containing vector in mammalian expression system was performed, followed by protein A-based purification of the IgG, quantification and QC on denaturing and non-denaturing SDS-PAGE.

Direct Binding ELISA for Fab and IgG

Binding and cross-reactivity of the lead panel to the recombinant proteins was initially assessed by binding ELISA. The human PD1 human Fc tagged recombinant protein and the cynomolgus monkey PD1 human Fc tagged recombinant protein were coated to the surface of MaxiSorp™ flat-bottom 96 well plate at 1 µg/ml. The purified Fab or IgG samples were titrated in two fold serial dilutions starting from 500 nM to 0.98 nM and allowed to bind to the coated antigens. The Fabs were detected using mouse anti-c-myc antibody followed by donkey anti-mouse IgG conjugated to horseradish peroxidase. The IgGs were detected using the mouse anti-human IgG conjugated to horseradish peroxidase. Binding signals were visualized with 3,3',5,5'-Tetramethylbenzidine Substrate Solution (TMB) and the absorbance measured at 450 nm.

Alphascreen Epitope Competition Assay for Fab Peripreps

The AlphaScreen assay (Perkin Elmer) was performed in a 25 µl final volume in 384-well white microtiter plates (Greiner). The reaction buffer contained 1xPBS PH 7.3 (Oxoid, Cat. nr. BR0014G) and 0.05% (v/v) Tween® 20 (Sigma, Cat. nr. P9416). Periprep samples diluted in reaction buffer were incubated with biotinylated human PD1-His/AviTag at 0.6 nM final concentration for 20 minutes at room temperature. The hMAb005 IgG at 0.3 nM and the anti-human IgG1 Acceptor beads at 20 µg/ml (final concentrations) were added and the mix was incubated for 1 hour at room temperature, followed by addition of the Streptavidin Donor beads at 20 µg/ml (final concentration) and incubation for 30 minutes at room temperature. The emission of light was measured in the EnVision multilabel plate reader (Perkin Elmer) and analysed using the EnVision manager software. Values were reported as Counts Per Second (CPS) and corrected for crosstalk. Signal reduction percentages were calculated relative to the irrelevant sample.

PD1/PD-L1 Cell-Based Antagonism Assay

The PD1/PD-L1 blockade cell-based bioassay (Promega), was used to measure the potency of antibodies in blocking the PD1/PD-L1 interaction. On the day before the assay, PD-L1 aAPC/CHO-K1 cells were thawed and transferred into cell recovery medium (90% Ham's F12/10% FBS). The cell suspension was dispensed to each of the inner 60 wells of two 96-well, white, flat-bottom assay plates, at 100 µl per well. Cell recovery medium was added to each of the outside wells and the assay plates and incubated overnight at 37° C./5% CO2. On the day of the assay the sample IgGs were diluted 4-fold in assay buffer (99% RPMI 1640/1% FBS) from 300 nM to 0,04 nM and 40 µl per dilution added to the assay plates containing the PD-L1 aAPC/CHO-K1 cells. Positive inhibition controls included mAb005 in IgG1null form and Nivolumab IgG4. As a negative inhibition control, an irrelevant IgG was included. PD1 Effector Cells were then thawed in assay buffer (99% RPMI 1640/1% FBS) and the cell suspension added to the wells of the assay plates containing the PD-L1 aAPC/CHO-K1 cells and the IgG titration samples. The assay plates were incubated for six hours in a 37° C./5% CO2 incubator, allowed to equilibrate to ambient temperature for 5-10 minutes, then 80 µl of Bio-Glo™ Reagent (Promega) was added. Assay plates were incubated at ambient temperature for a further 5-30 minutes and luminescence signals subsequently measured at 10, 20 and 30 minutes.

One-Way Human DC: T Cell Mixed Lymphocyte Reaction (MLR) Assay

CD14+ monocytes were isolated from PBMCs from three donors and cultured in vitro in the presence of GM-CSF and IL-4 to produce immature monocyte-derived dendritic cells (mo-DCs). The mo-DCs were further matured in culture by the addition of TNFα. Pan-T cells were isolated from allogeneic PBMC donors. One-way MLRs were set up by co-culturing the mature DCs with the freshly isolated pan T cells at a 10:1 T cell: DC ratio for ~ 5 days in the presence of titrated test articles. Activity was measured by quantifying IFN-γ production on day 5 of MLR via ELISA.

Results and Discussion

Library Generation and Screening

The variable domains of an antagonistic anti-PD1 IgG hMAb005 were cloned into a phage display vector in human IgG1-kappa Fab format. Oligonucleotide mutagenesis using NNK randomisation was applied in stretches of 5-6 residues per sub-library, leading to the generation of 5 VL sub-libraries (Table 1) and 6 VH (Table 2). These libraries were transformed into E. coli, rescued, and the phage populations from each library were subjected to 4 rounds of selection on human and cyno PD1 and human and rhesus monkey VEGFR2 proteins.

Figure 2:
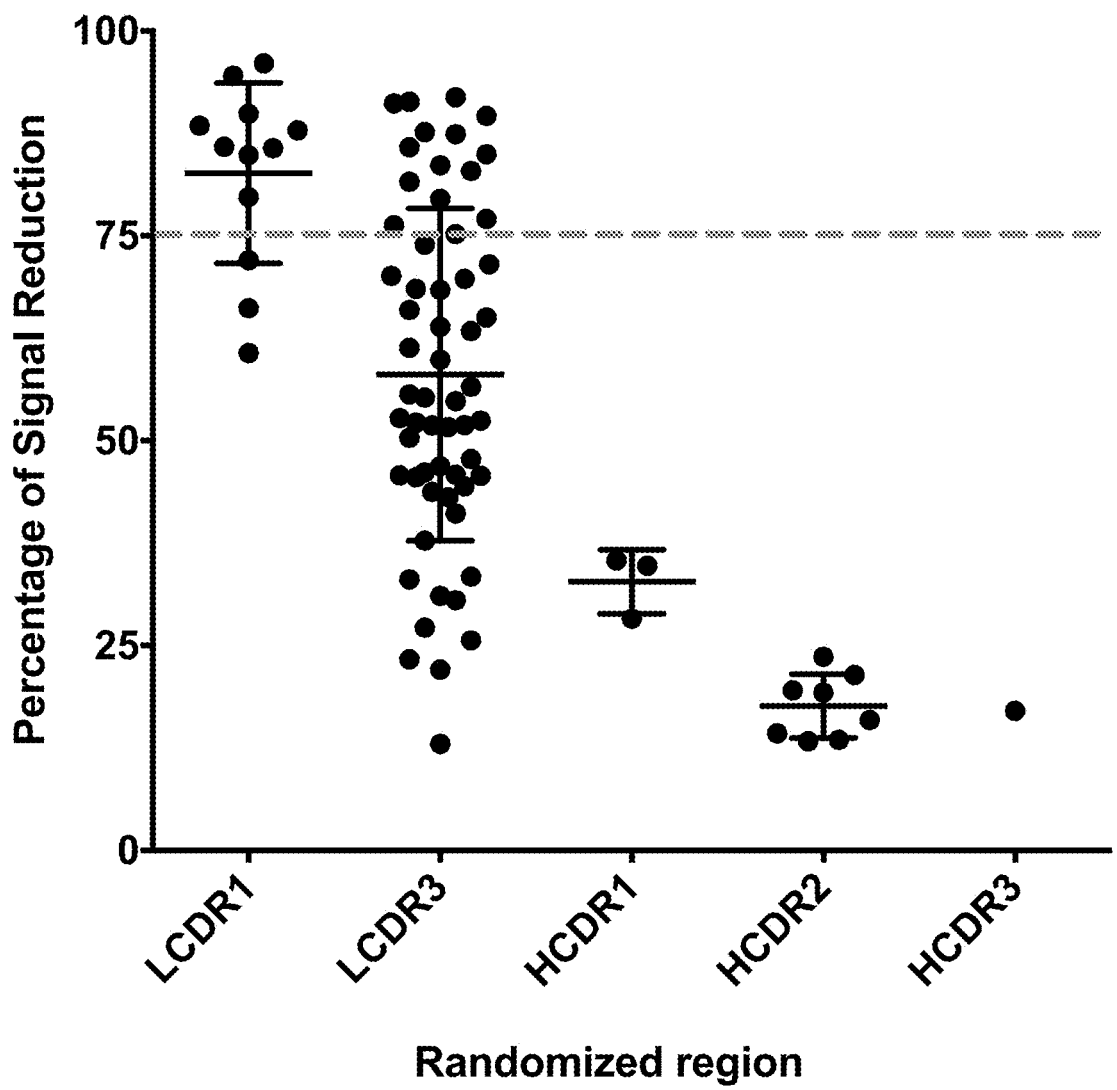
FIG. 2. Epitope competition analysis of Fab proteins in Alphascreen Anti-PD1 clones were expressed as Fab in *E. coli* and peripreps were applied in an epitope competition assay using Alphascreen technology. In this assay, library-derived Fabs were analysed for their relative affinities and retention of the parental hMAb005 epitope by competing for hMAb005 IgG1null binding to human PD1 protein, in solution.
Figure 3A:
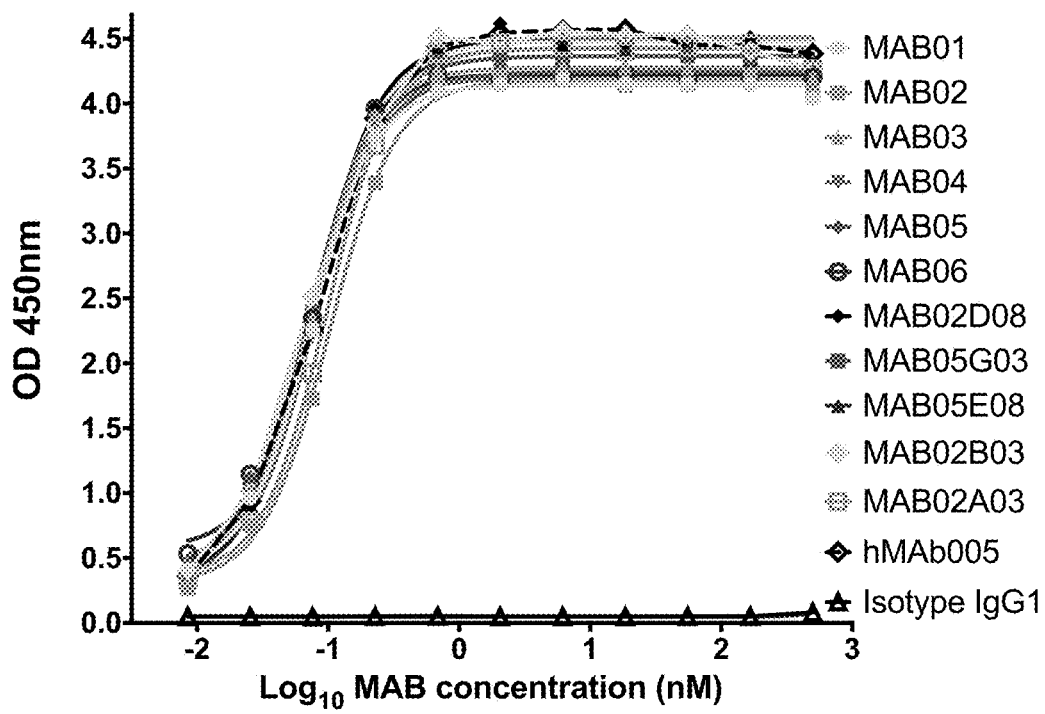
FIG. 3A-FIG. 3B. Direct titration ELISA for purified IgG1 null binding to human and cyno PD1-Fc, human and rhesus VEGFR2 proteins. hMab005, an Isotype control IgG1 and library-derived clones in human IgG1 null format were titrated (in nM) in a direct binding ELISA against human and cyno PD1 proteins (FIG. 3A), and human and rhesus VEGFR2 proteins (FIG. 3B).
Figure 3A:
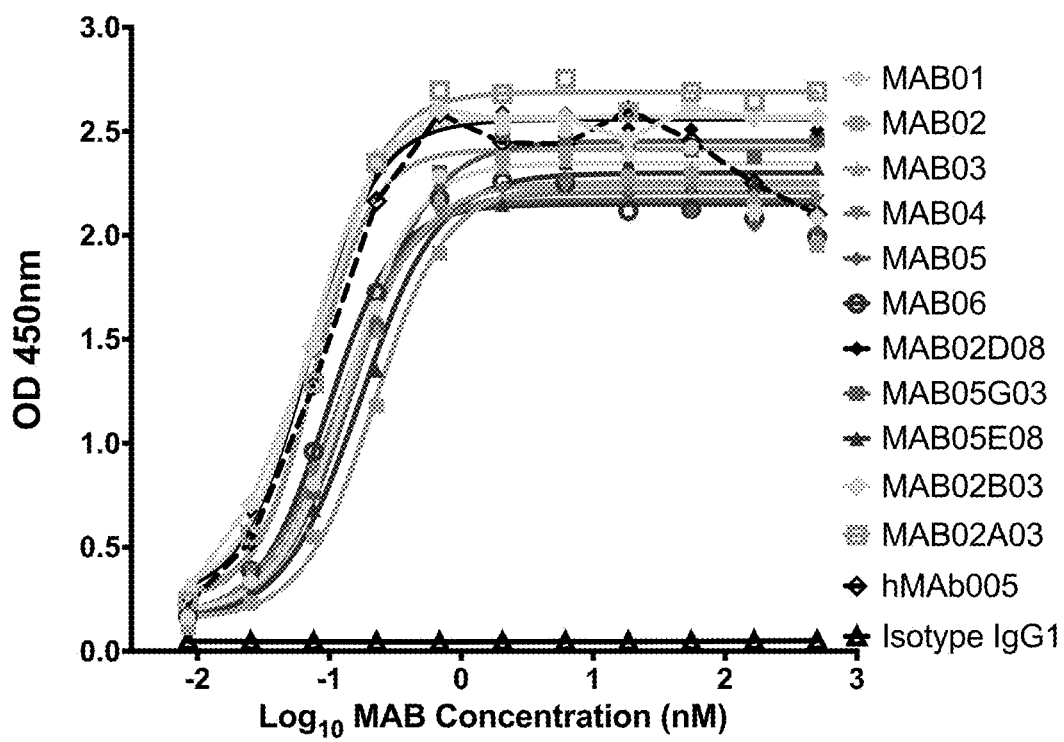
Figure 3B:
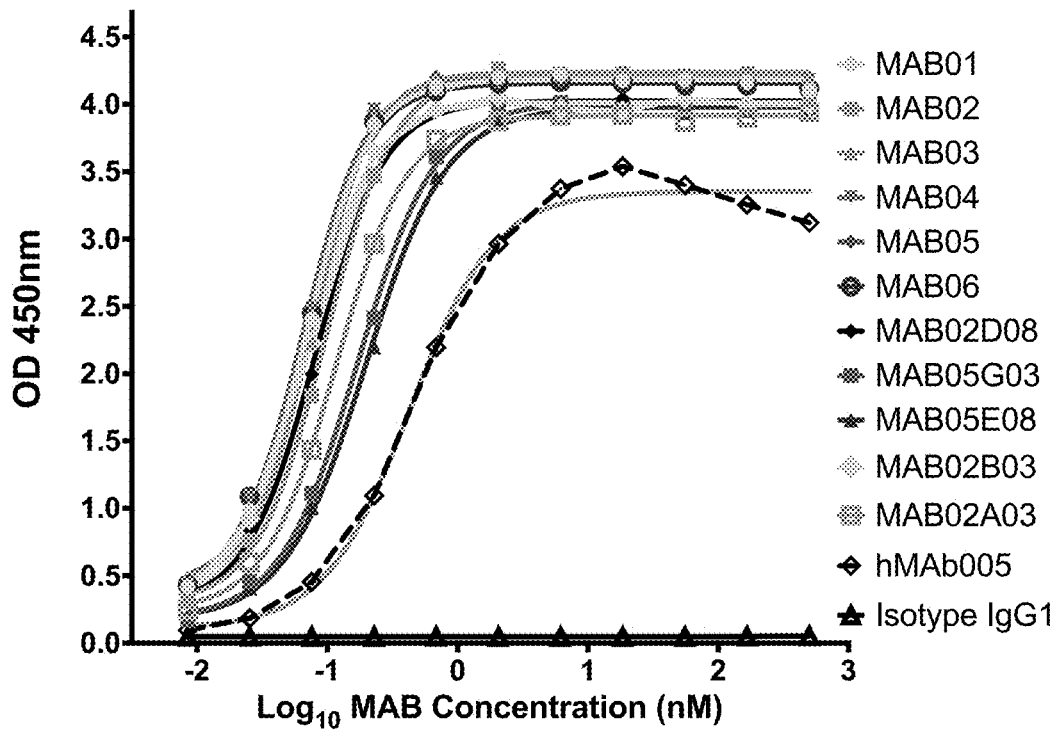
Figure 3B:
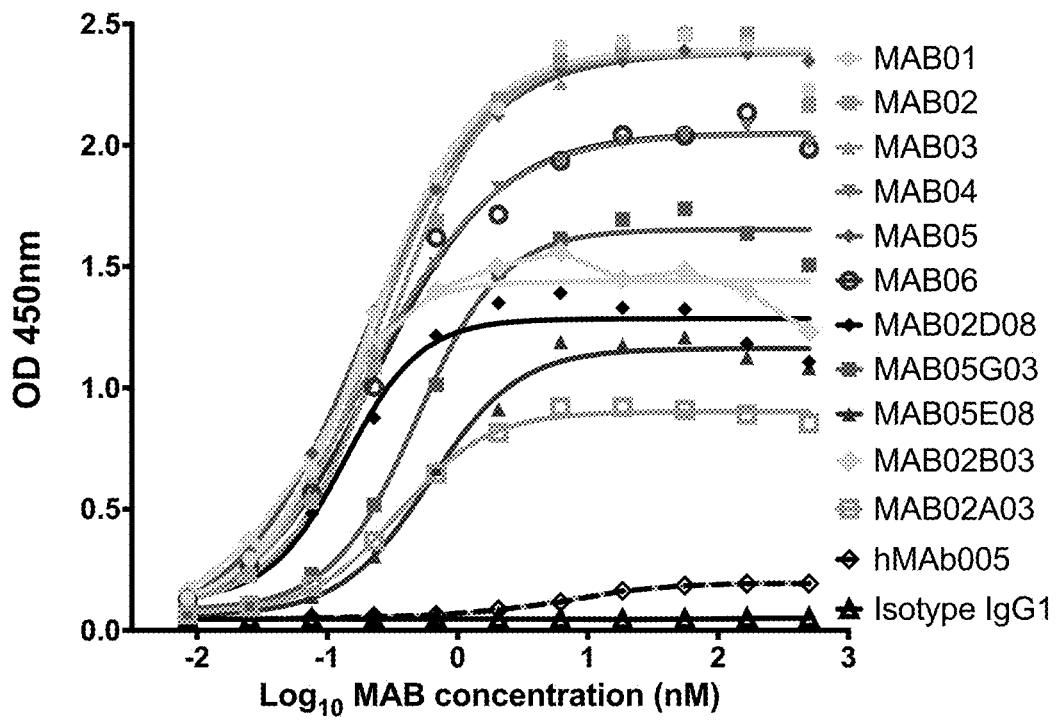
Figure 4:
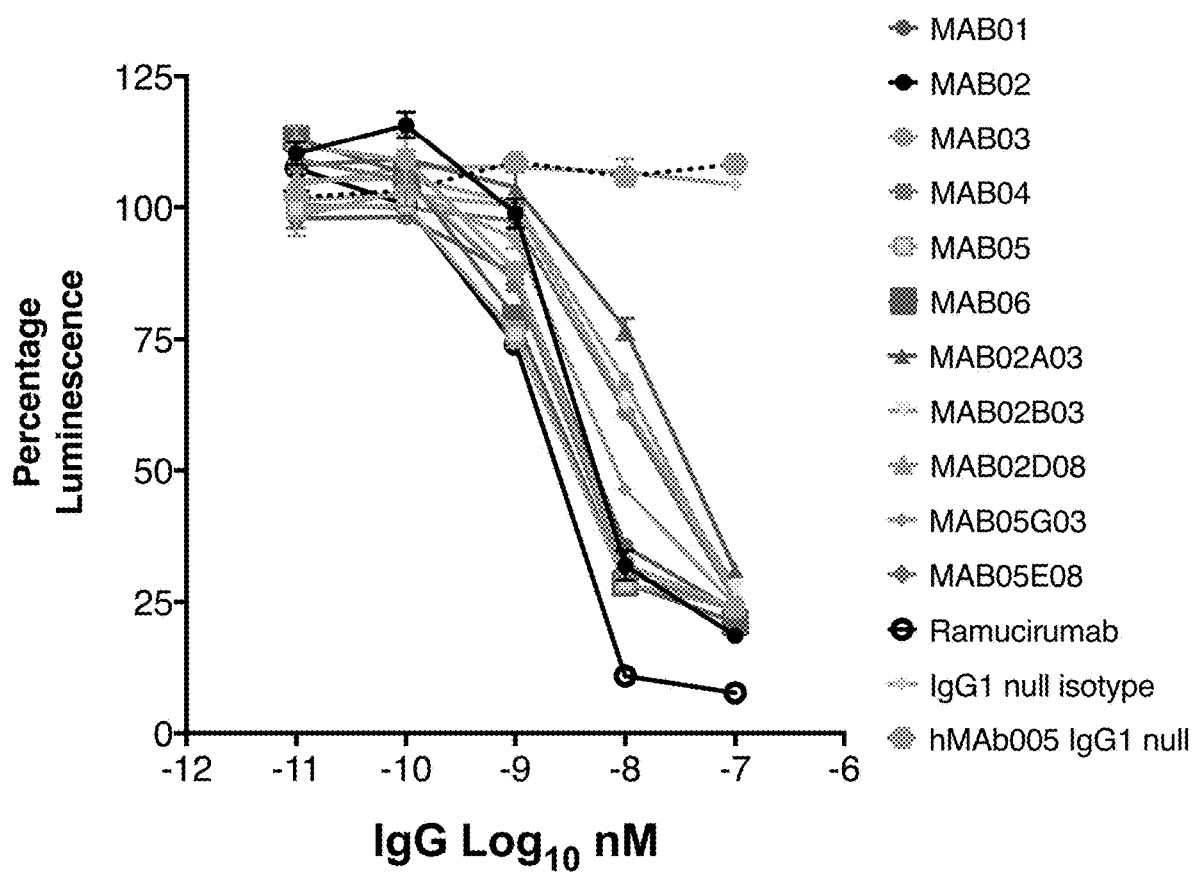
FIG. 4. Cell-based VEGFR2 antagonism assay. hMab005, an Isotype control IgG1 and library-derived clones in human IgG1 null format were titrated (in nM) in a human VEGFR2 signalling assay, to which human VEGF-165 protein had been added to induce VEGFR2 signalling. Neither hMab005 nor the Isotype IgG1 control protein showed any concentration-dependent VEGFR2 antagonism. All 11 lead clones and the positive control anti-VEGFR2 IgG1 Ramucirumab showed potent antagonism, in the nM range.
Figure 5A:
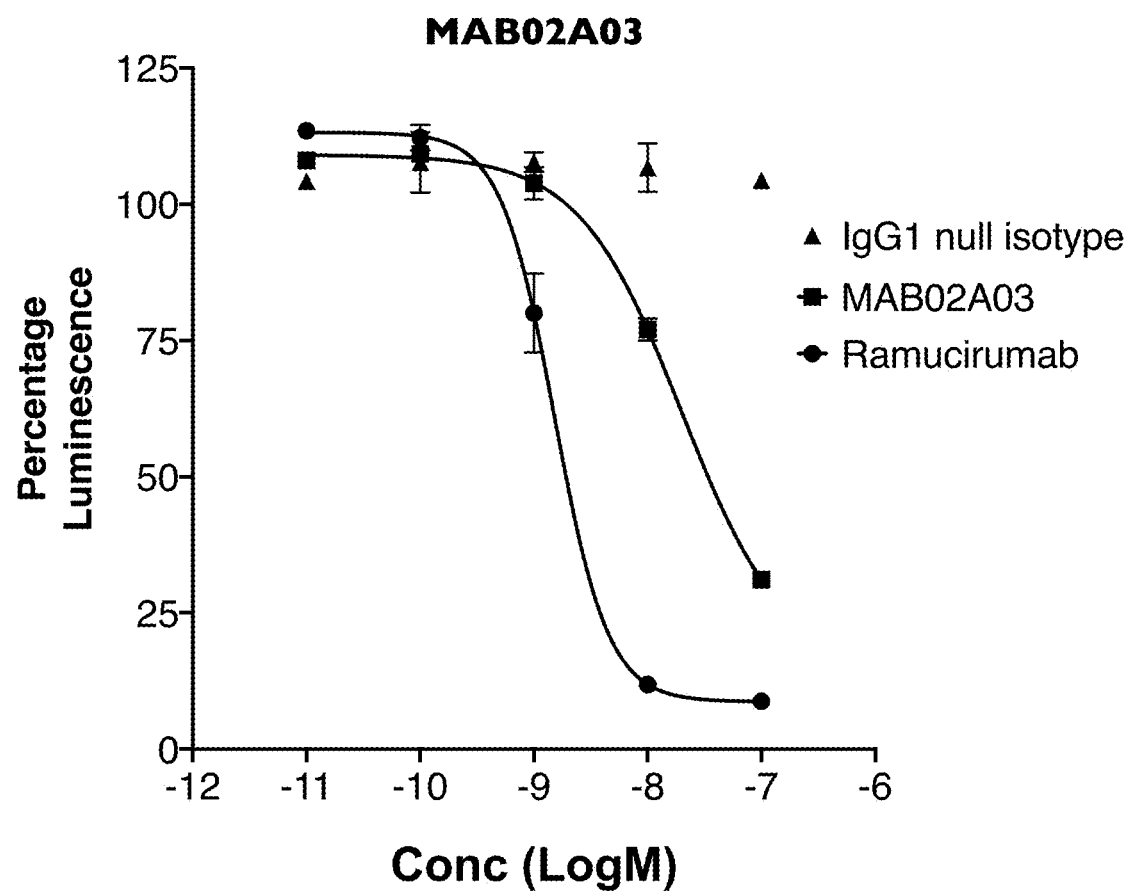
Figure 5B:
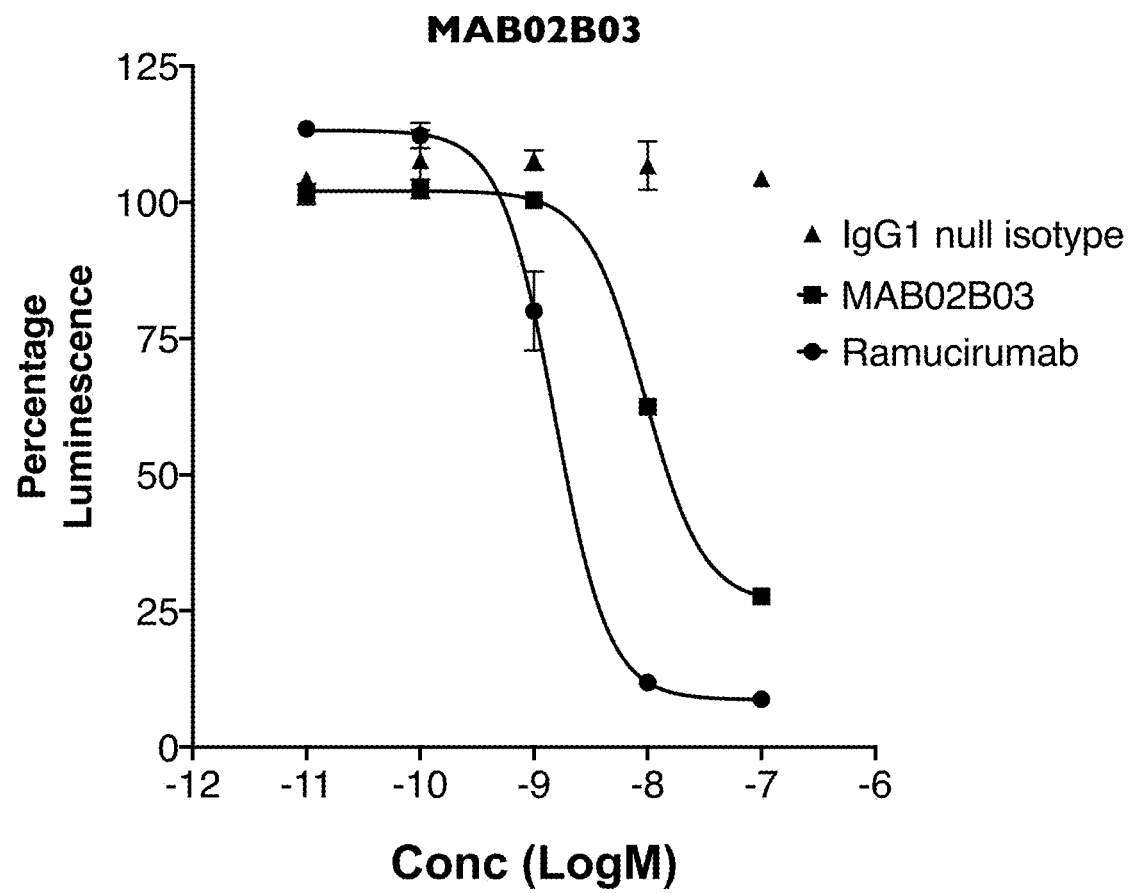
Figure 5D:
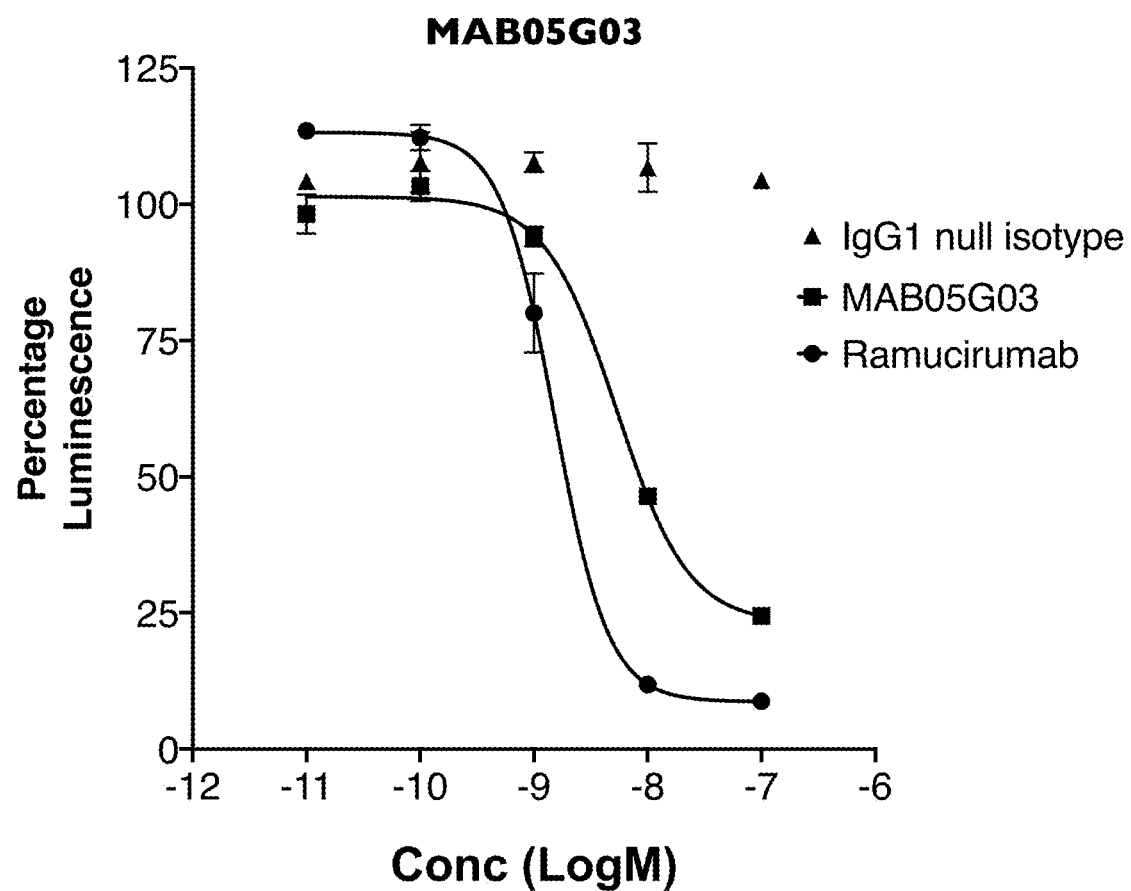
Figure 5E:
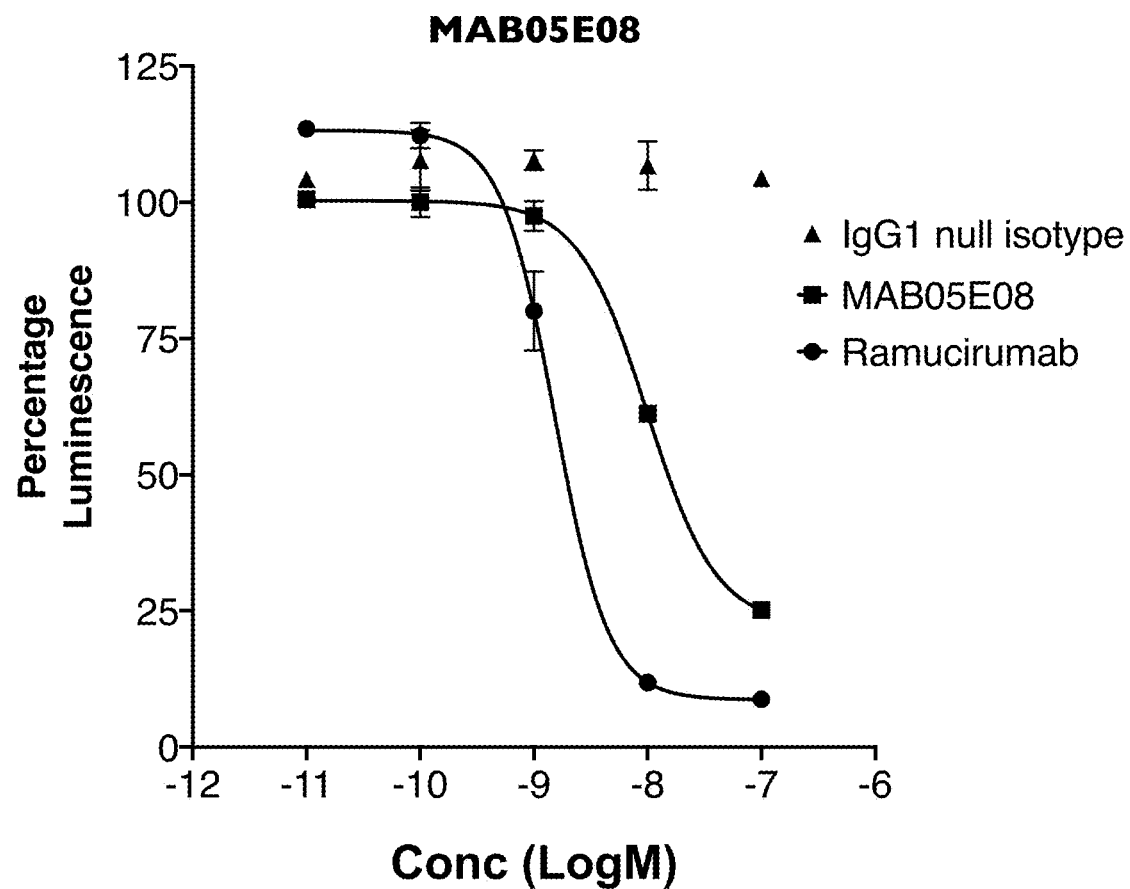
Figure 5F:
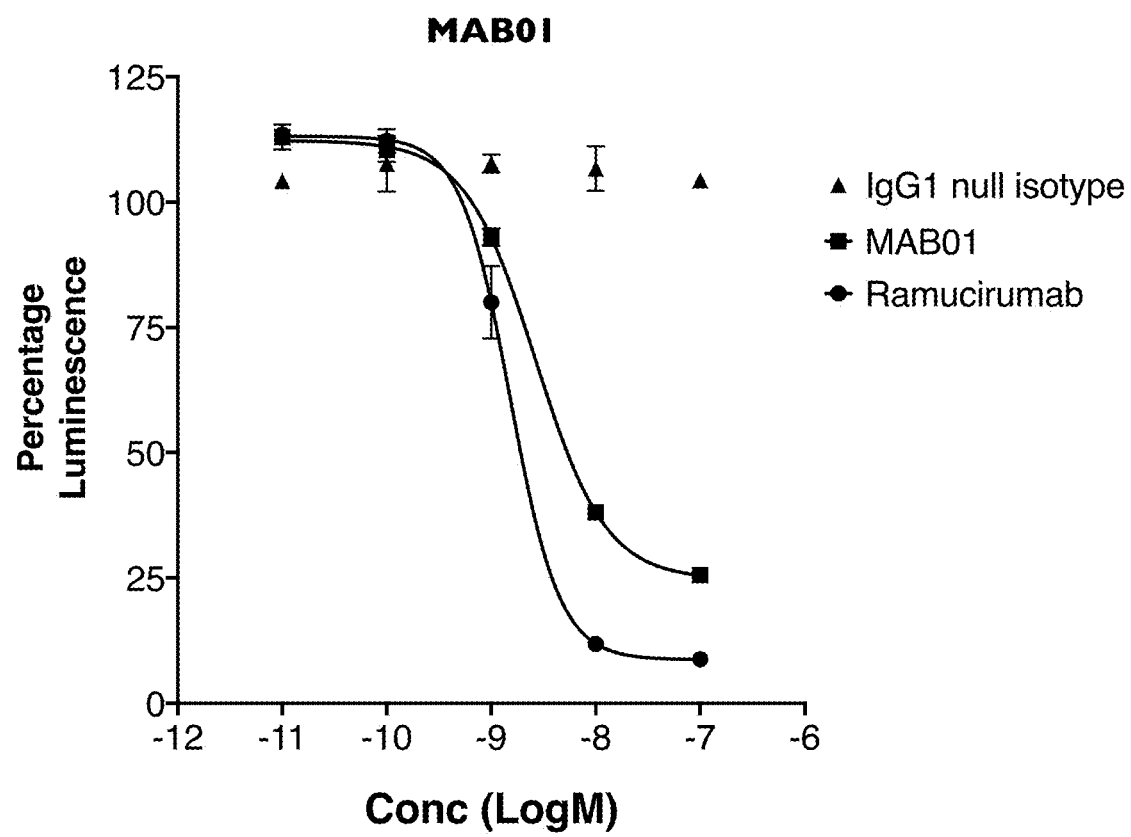
Figure 5G:
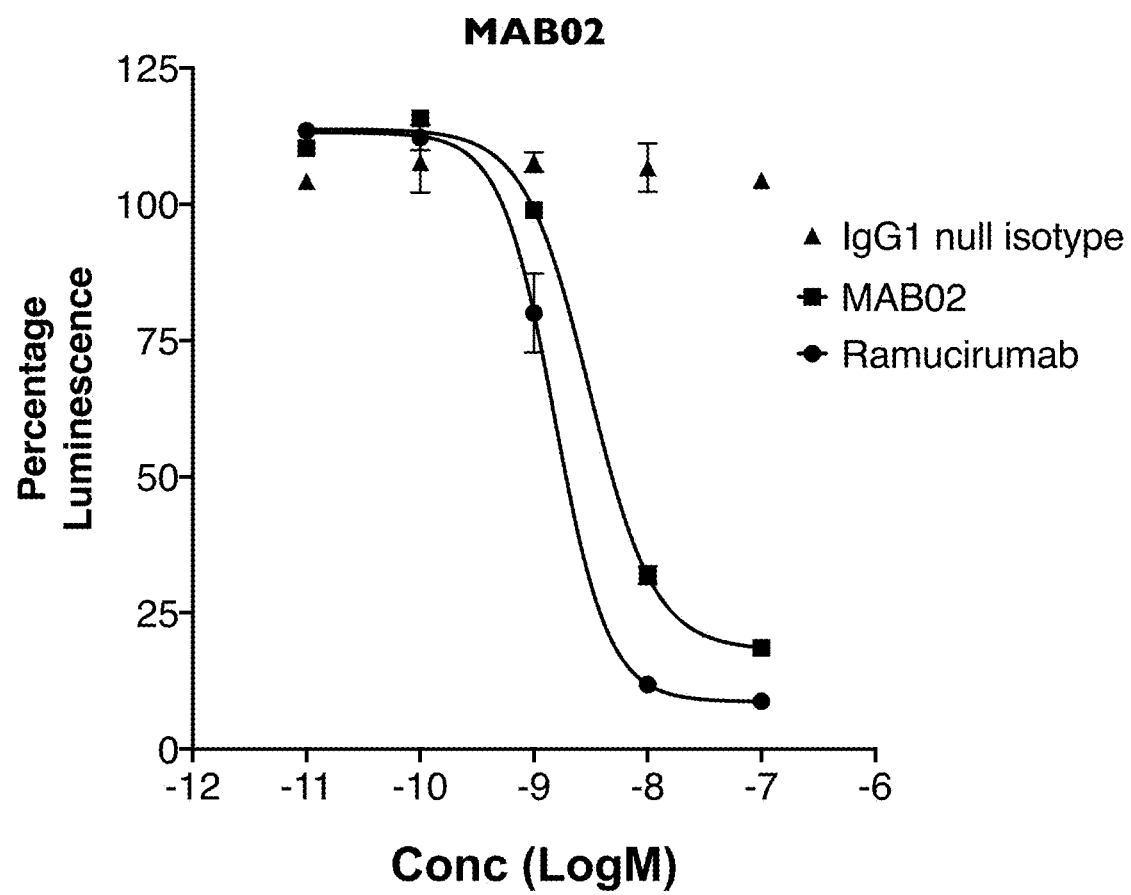
Figure 5H:
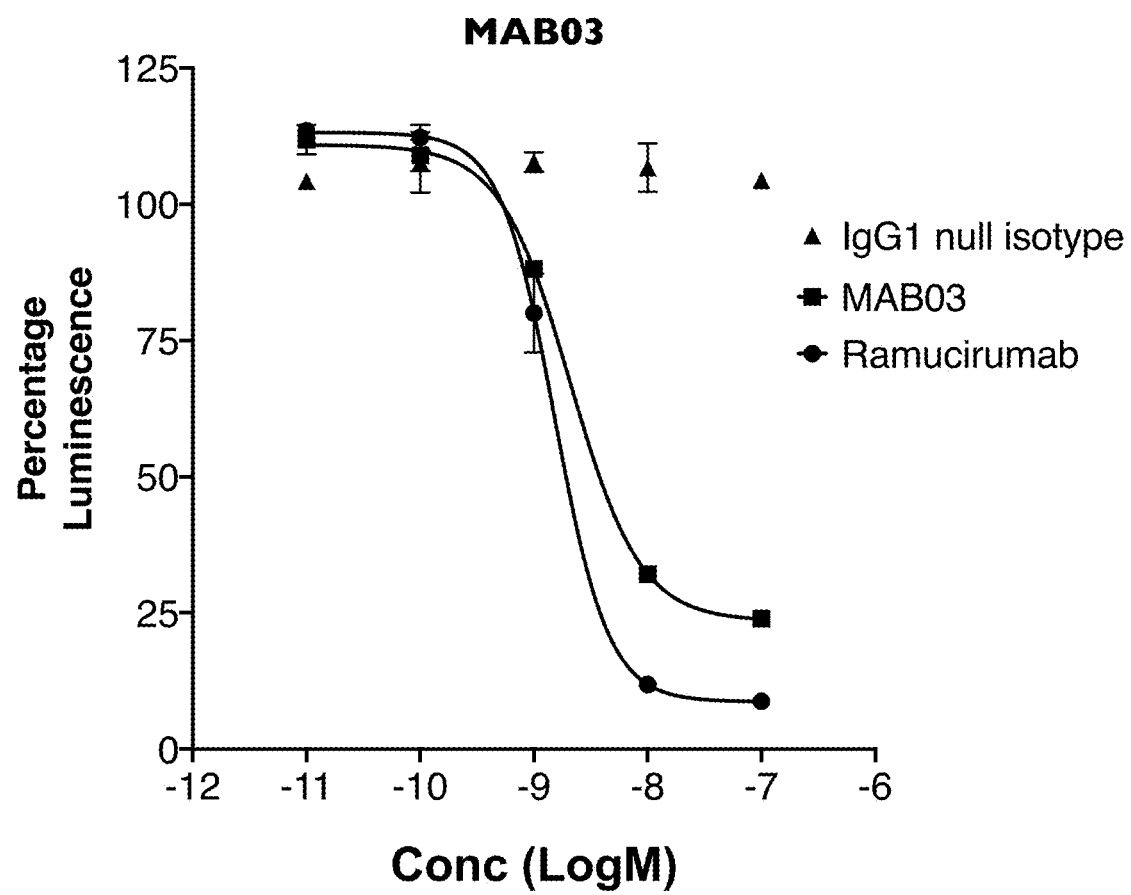
Figure 5I:
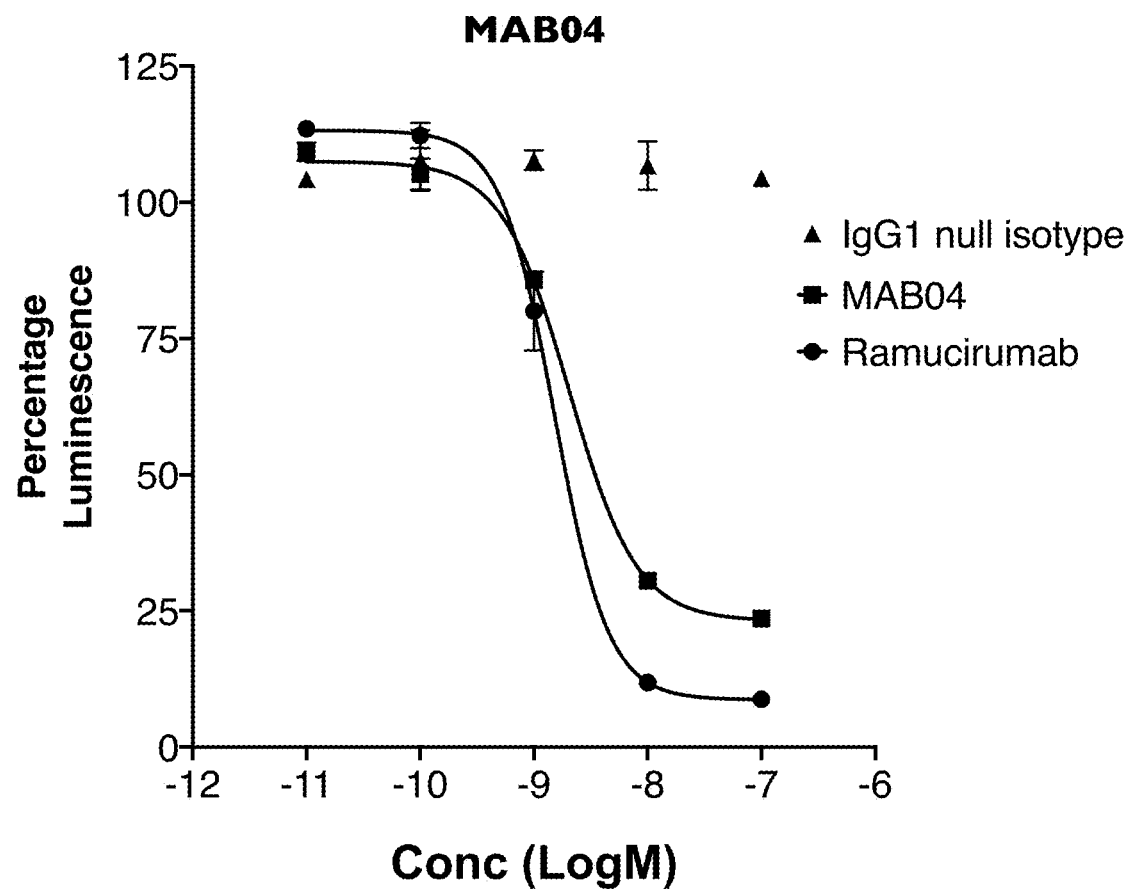
Figure 5J:
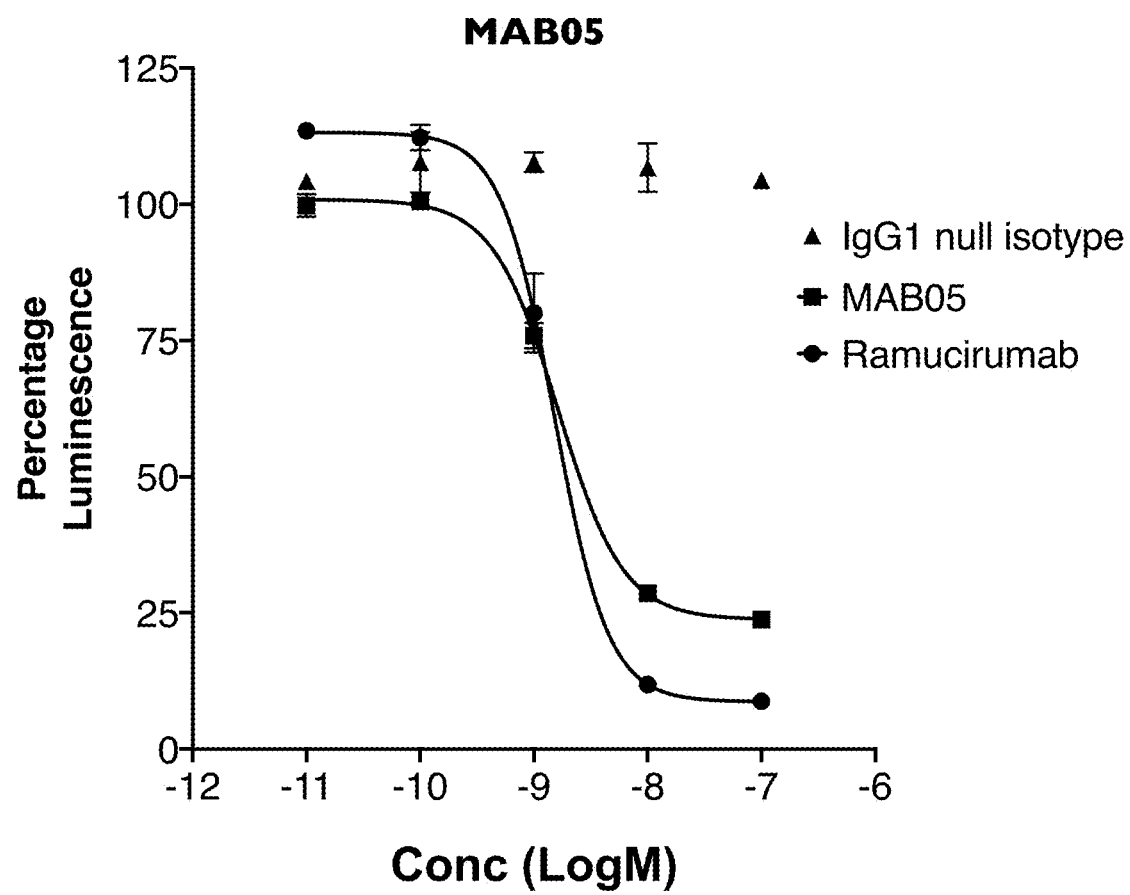
Figure 5K:
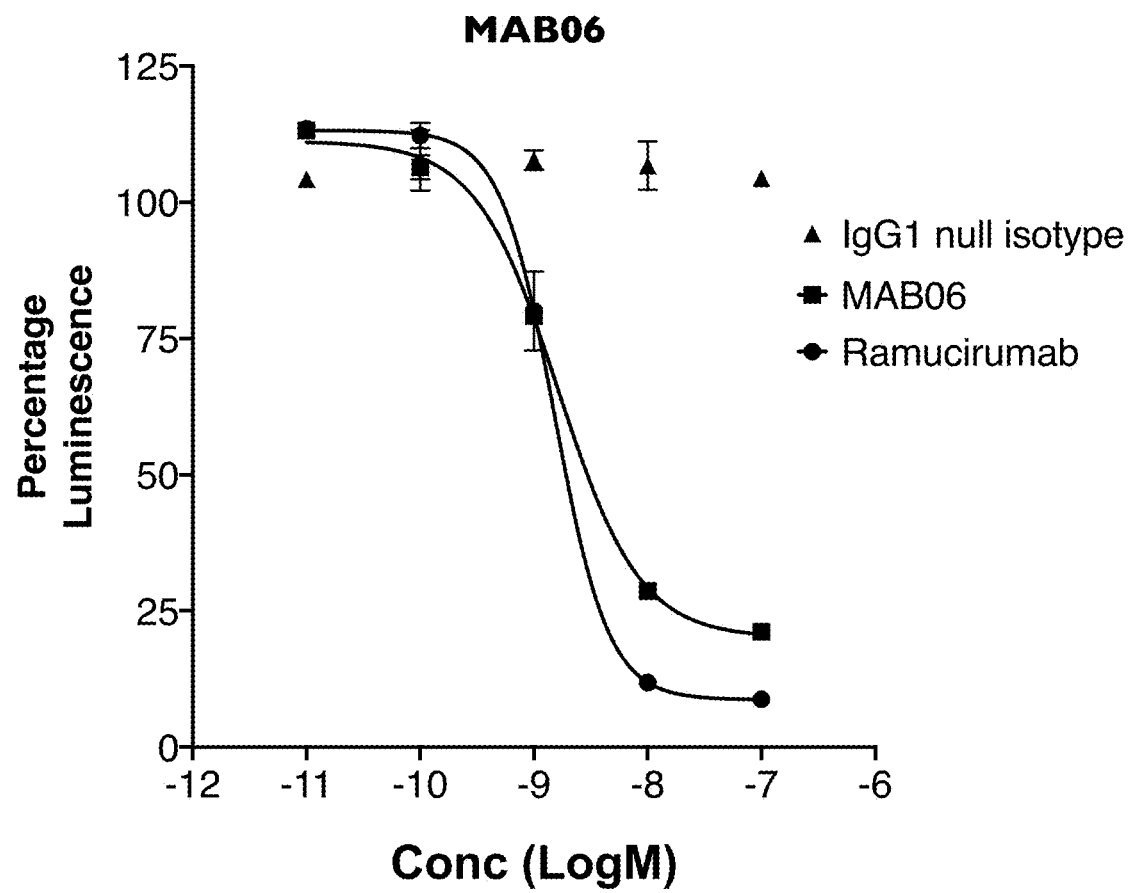

ELISA screening of Fabs in periprep format was then performed to examine binding of individual clones from each library selection to human PD1, cyno PD1, Human VEGFR2 and cyno VEGFR2 (FIG. 1). These analyses demonstrated that individual clones in all selection rounds exhibited binding to both PD1 orthologs that was similar in signal to the positive control hMAb005 Fab. Importantly, the binding analyses also demonstrated that in several libraries, populations of clones had been enriched that not only retained PD1 activity, but exhibited significantly improved binding to human and/or cyno VEGFR2. 168 clones from these selected populations were cherry-picked and characterised further in both Alphascreen PD1 epitope competition with the hMAb005 IgG and DNA sequencing of the VL and VH domains. The Alphascreen analyses showed that unique sequences in both the LCDR1 and LCDR3 libraries with improved binding to VEGFR2 (FIG. 1), maintained epitope competition for hMAb005 binding to PD1 (FIG. 2). In contrast, clones from the HCDR1, 2 and 3 libraries which exhibited improved binding to VEGFR2 did not effectively compete with hMAb005, suggesting that VEGFR2 affinity-improving mutations in the VH domain had led to epitope drift on PD1 (FIG. 2). Sequence analysis of all VEGFR2-improved clones which maintained PD1 binding demonstrated a significant number of mutations being positively-selected for, in both the LCDR1 (Table 3) and LCDR3 (Table 4).

On the basis of the analyses above, 5 representative clones with mutations in the LCDR1 or LCDR3 that exhibited high binding to both orthologs of PD1 and both orthologs of VEGFR2 (FIG. 1), and percentage signal reduction of hMAb005/PD1 interaction of >75% (FIG. 2), were chosen for expression and characterisation in IgG format (Table 5).

In addition, 6 experimental combinatorial IgG clones were made which combined potentially beneficial mutations in both the LCDR1 and LCDR3 (clones MAB01-MAB06, Table 5). These 11 lead IgG clones were generated in human IgG1 null format.

Lead IgG Specificity and Potency Characteristics

The 11 lead IgG1 null clones outlined in Table 4, plus hMAb005 and Isotype IgG1 null were examined in titration ELISA binding to human and cyno PD1 (FIG. 3A). This analysis showed that all 11 lead clones had similarly potent binding to human and cyno PD1 as the hMAb005 IgG1, while the Isotype control showed no binding to either protein. In contrast, when the IgGs were tested for binding to VEGFR2 protein, all 11 lead clones demonstrated significantly increased binding potency to both human and rhesus orthologs in comparison to hMAb005 (FIG. 3B).

To investigate whether or not this increased VEGFR2 reactivity in lead clones over hMab005 was capable of altering the pharmacology relationship with the receptor, a human VEGFR2 reporter assay was used to examine induction of luciferase expression under control of the natural VEGF response element NFAT (Promega, performed according to manufacturer's instructions). In this assay, soluble VEGF-165 protein was added to the VEGFR2 reporter cells and all IgG1 proteins were examined for their ability to antagonise the signal induced by VEGF-165 (FIG. 4). The IgG1 hMAb005 and Isotype IgG1 both demonstrated no antagonism of VEGFR2 signal. Surprisingly, however, all lead IgG1 null antibodies demonstrated potent antagonism of VEGF-VEGFR2 signal induction, with a number of clones exhibiting potencies in a similar range to the clinically-approved anti-VEGFR2 cancer drug 'Ramucirumab' (FIG. 4). These were very unexpected findings as the hMAb005 IgG1 has been shown to potently agonise VEGFR2. The data above suggested maintained PD1 epitope specificity, but a complete reversal of the VEGFR2 pharmacology for all lead antibodies. To examine this data further, individual analyses were generated for library-derived clones (FIG. 5A-5E) and clones that combined mutations in the LCDRs 1 and 3 (FIG. 5F-5K). These analyses suggested that the antibodies MAB01-MAB06 were the most potent inhibitors of VEGFR2 signalling, demonstrating that the improvements in VEGFR2 binding that were mediated by each CDR could be synergistically combined.

The combined analyses outlined herein demonstrated that, surprisingly, deep sampling of amino acid diversity in the CDRs of these antibodies allowed the simultaneous optimisation of PD1 and VEGFR2 target binding specificity, resulting in the reversal of the VEGFR2 agonistic phenotype of the progenitor antibody hMAb005 in multiple lead molecules. The resulting lead antibodies have the beneficial characteristic of dual-antagonism of the clinically-relevant PD1 and VEGFR2 signalling pathways.

Lead IgG Variant Generation and Analysis

Eight variants of clone MAB06 (MAB06.1-MAB06.8) were generated to experimentally interrogate multiple CDR residues for their ability to be mutated to human germline sequence, to reduce immunogenicity risk. These clones contained germlining mutations in the LCDR1 and 2 (Table 8), and in the HCDR2 (Table 9). All eight clones were expressed and purified in IgG1 null format. All clones were readily expressed and purified via Protein A affinity column, and the resulting proteins exhibited % monomer IgG of >94% (as measured by SEC).

MAB06.1-MAB06.8 IgGs were tested for ability to antagonise both PD1 and VEGFR2 signalling. All 8 clones retained the ability to antagonise PD1 signalling in a PD1/

Figure 6:
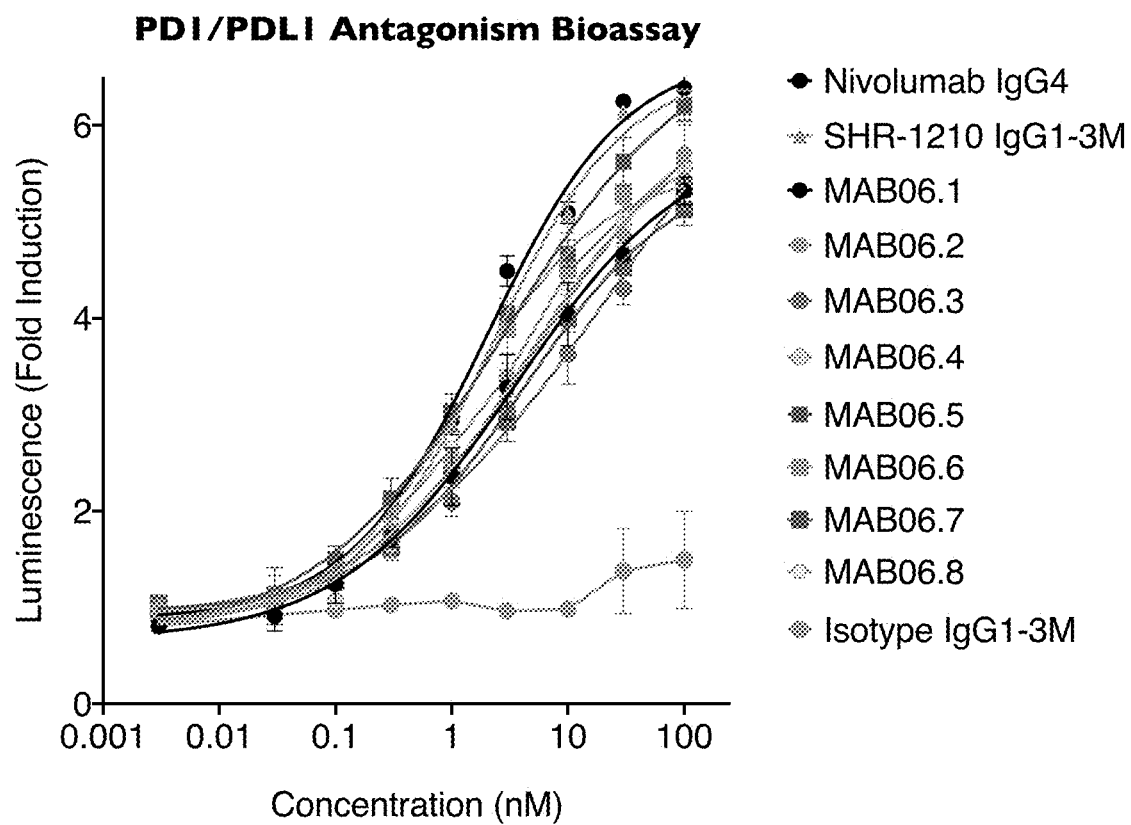
FIG. 6. Cell-based PD1 antagonism assay. hMab005 (SHR-1210 IgG1-3M), an Isotype control IgG1, Nivolumab IgG4 and clones MAB06.1-MAB06.8 (in human IgG1 null format) were titrated in a human PD1 signalling assay, in which human PD1+ and human PD-L1+ cells are mixed and antagonism of the PD1/PD-L1 interaction results in increased signal. The Isotype IgG1 control protein did not show any concentration-dependent PD1 antagonism. Clones MAB06.1-MAB06.8, hMab005 and the positive control anti-PD1 IgG4 Nivolumab showed potent antagonism, in the nM range.
Figure 7:
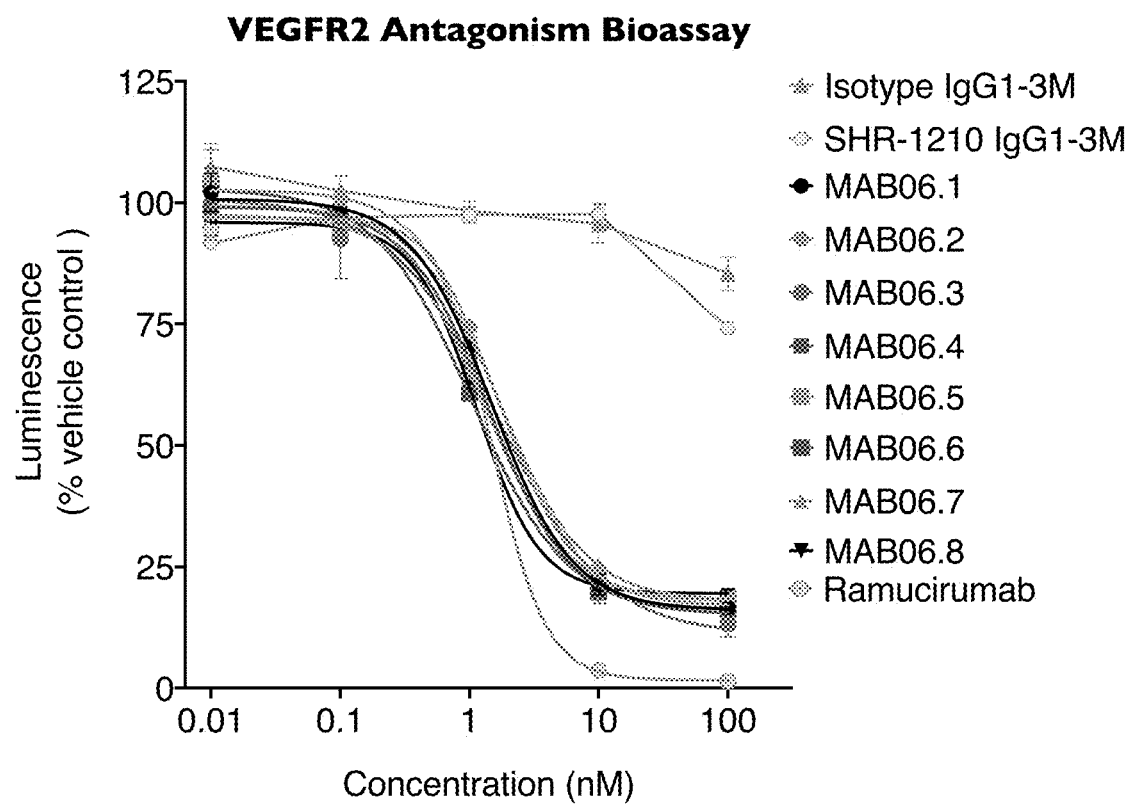
FIG. 7. Cell-based VEGFR2 antagonism assay. hMab005 (SHR-1210 IgG1-3M), an Isotype control IgG1, Nivolumab IgG4 and clones MAB06.1-MAB06.8 (in human IgG1 null format) were titrated in a human VEGFR2 signalling assay, to which human VEGF-165 protein had been added to induce VEGFR2 signalling. Neither hMab005 nor the Isotype IgG1 control protein showed any concentration-dependent VEGFR2 antagonism. Clones MAB06.1-MAB06.8, and the positive control anti-VEGFR2 IgG1 Ramucirumab showed potent antagonism, in the nM range.
Figure 8A:
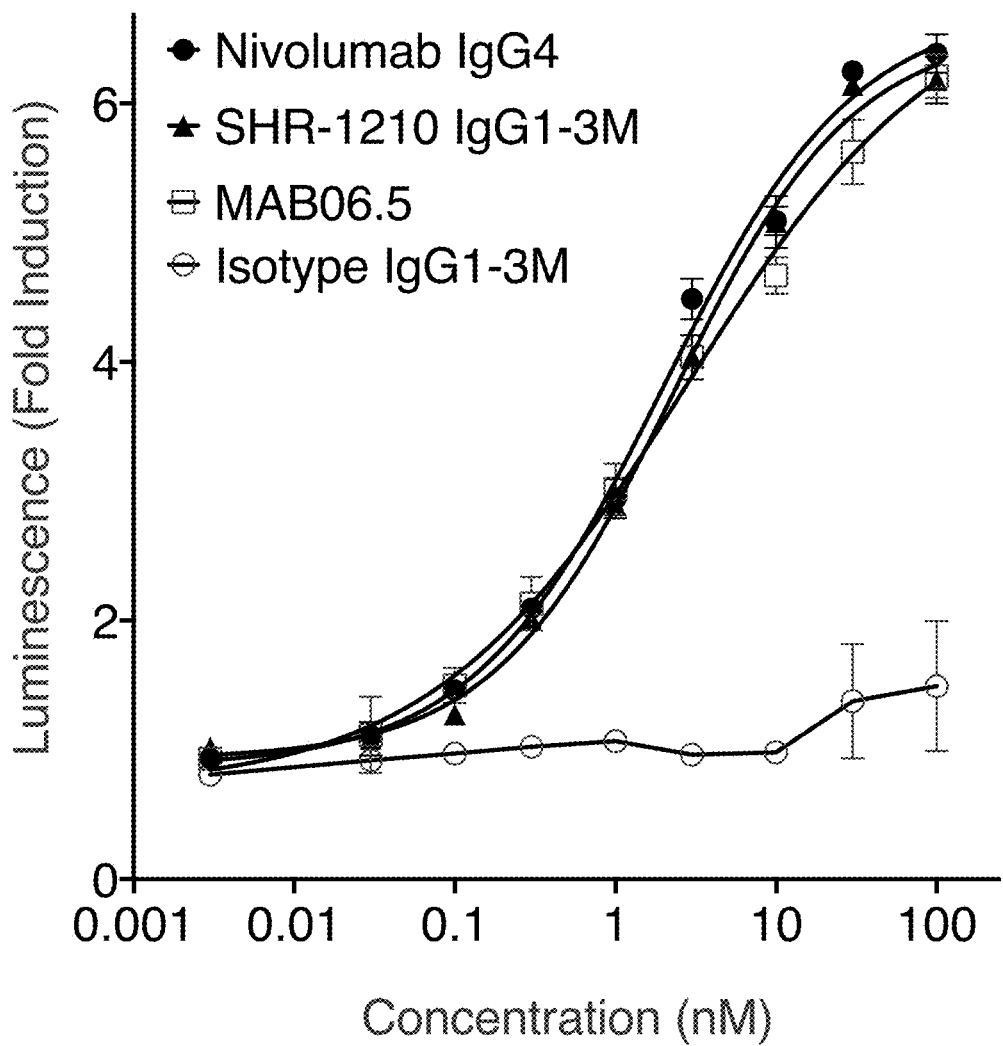
FIG. 8A-FIG. 8H. Cell-based PD1 and VEGFR2 antagonism assays-single clone analysis. The PD1 and VEGFR2 antagonism for leads clones shown in FIG. 7 were re-analysed on a clone by clone basis. Comparative analysis of PD1 and VEGFR2 antagonism for clones MAB06.5 (FIG. 8A, FIG. 8B), MAB06.6 (FIG. 8C, FIG. 8D), MAB06.7 (FIG. 8E, FIG. 8F), and MAB06.8 (FIG. 8G, FIG. 8H) demonstrated that the sequence of clone MAB06 could accept mutation of multiple residues in LCDR1, LCDR2 and HCDR2, while retaining the ability to antagonise the signalling of both receptors.
Figure 8B:
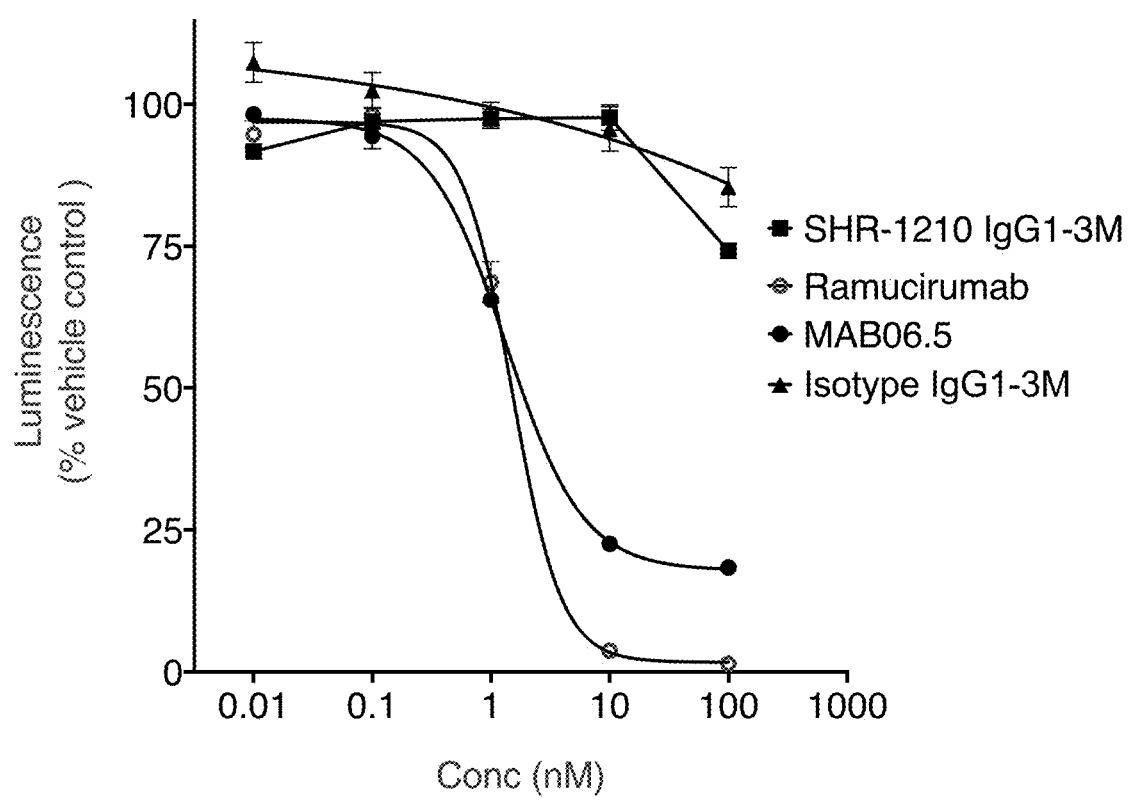
Figure 8C:
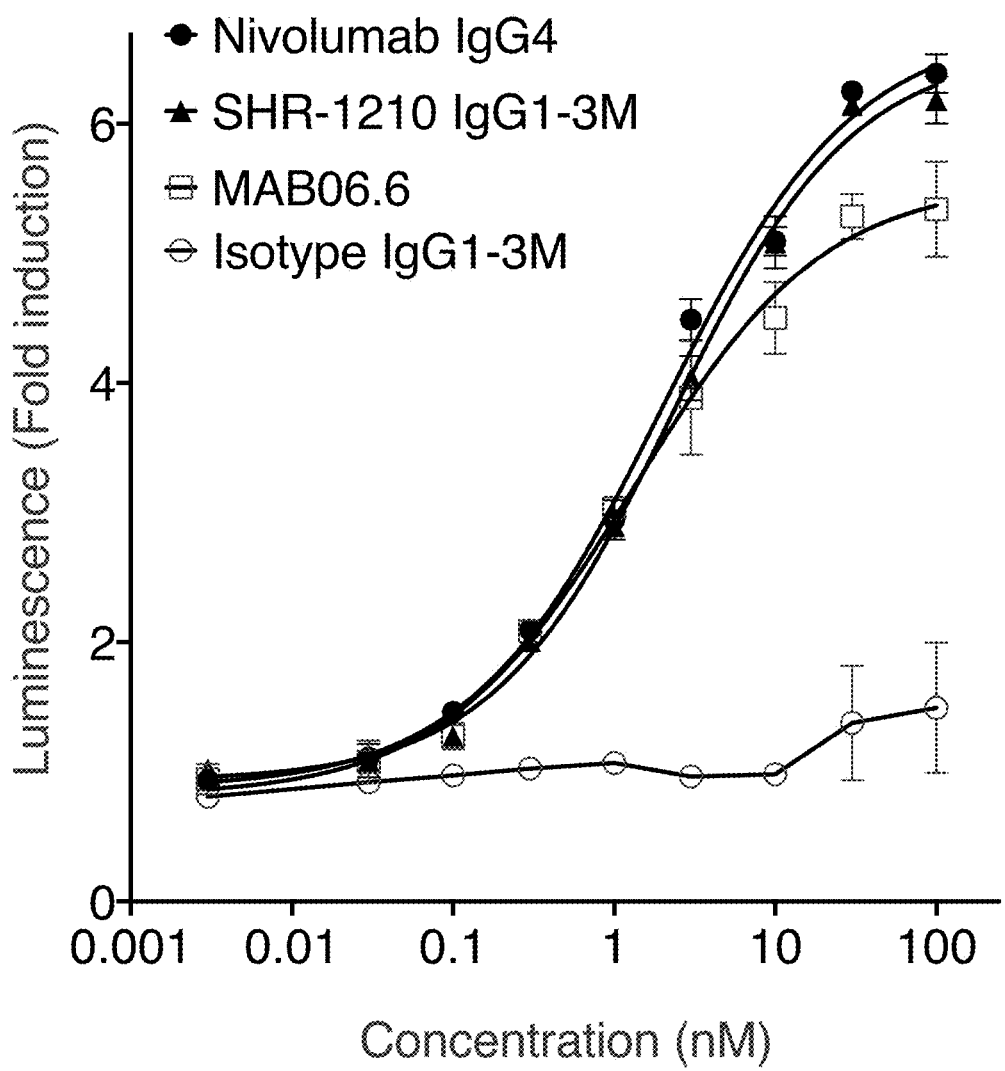
Figure 8D:
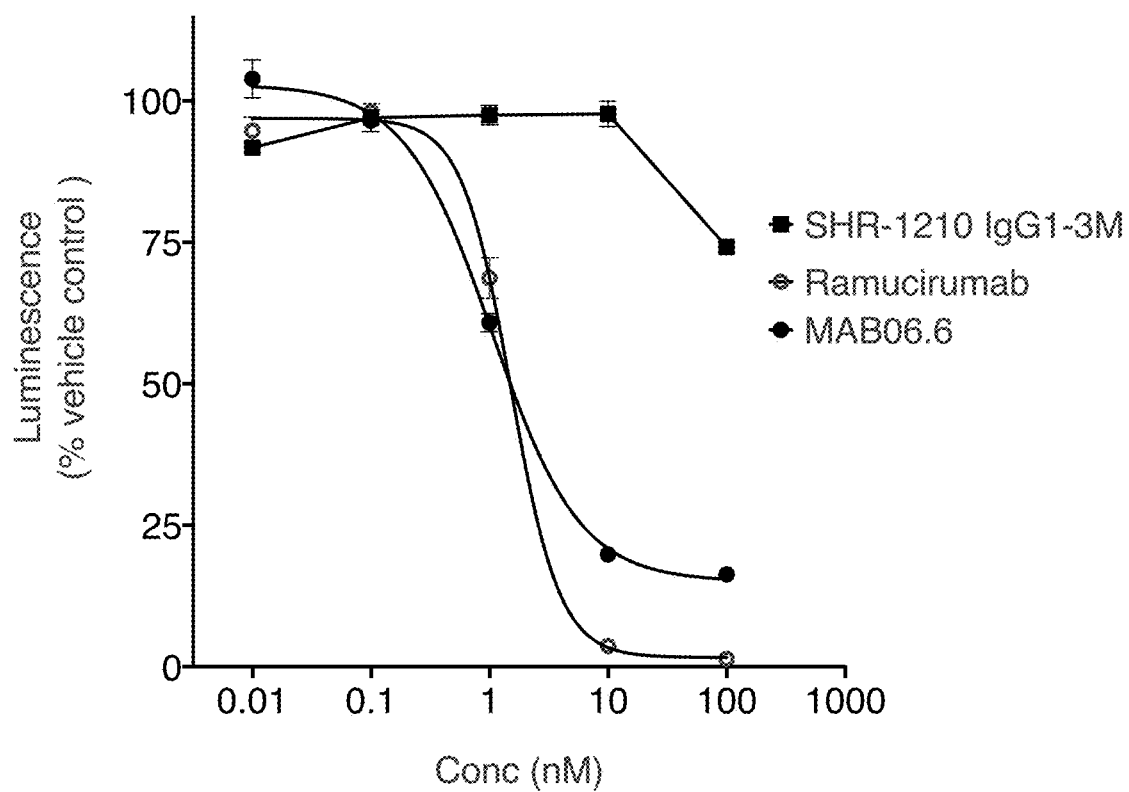
Figure 8E:
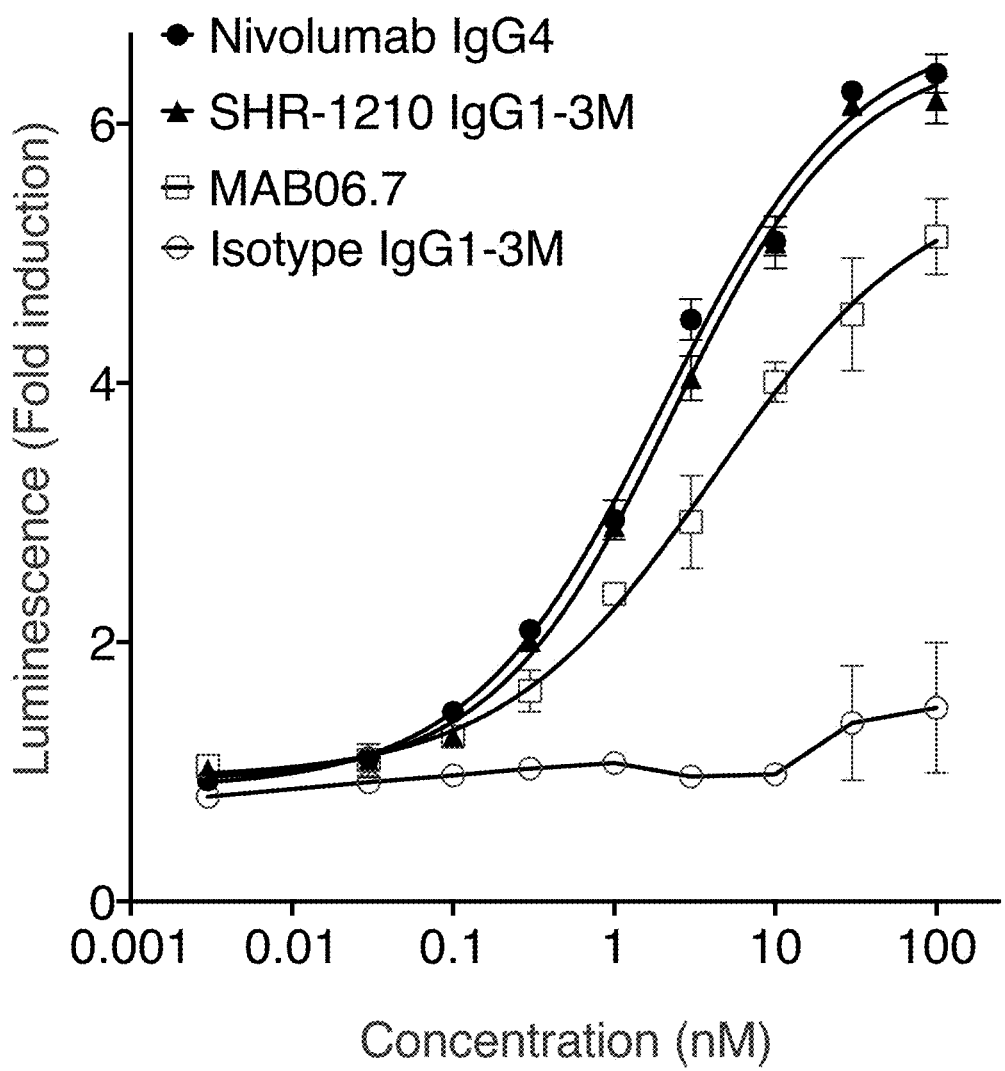
Figure 8F:
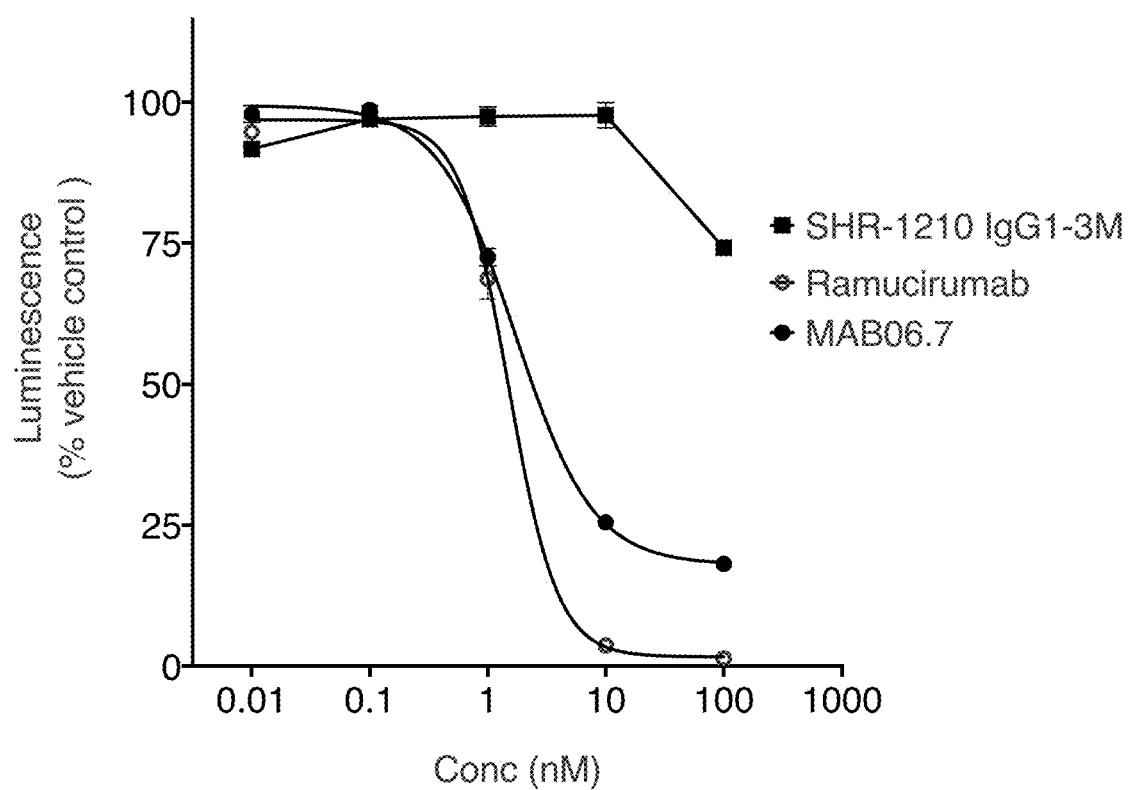
Figure 8G:
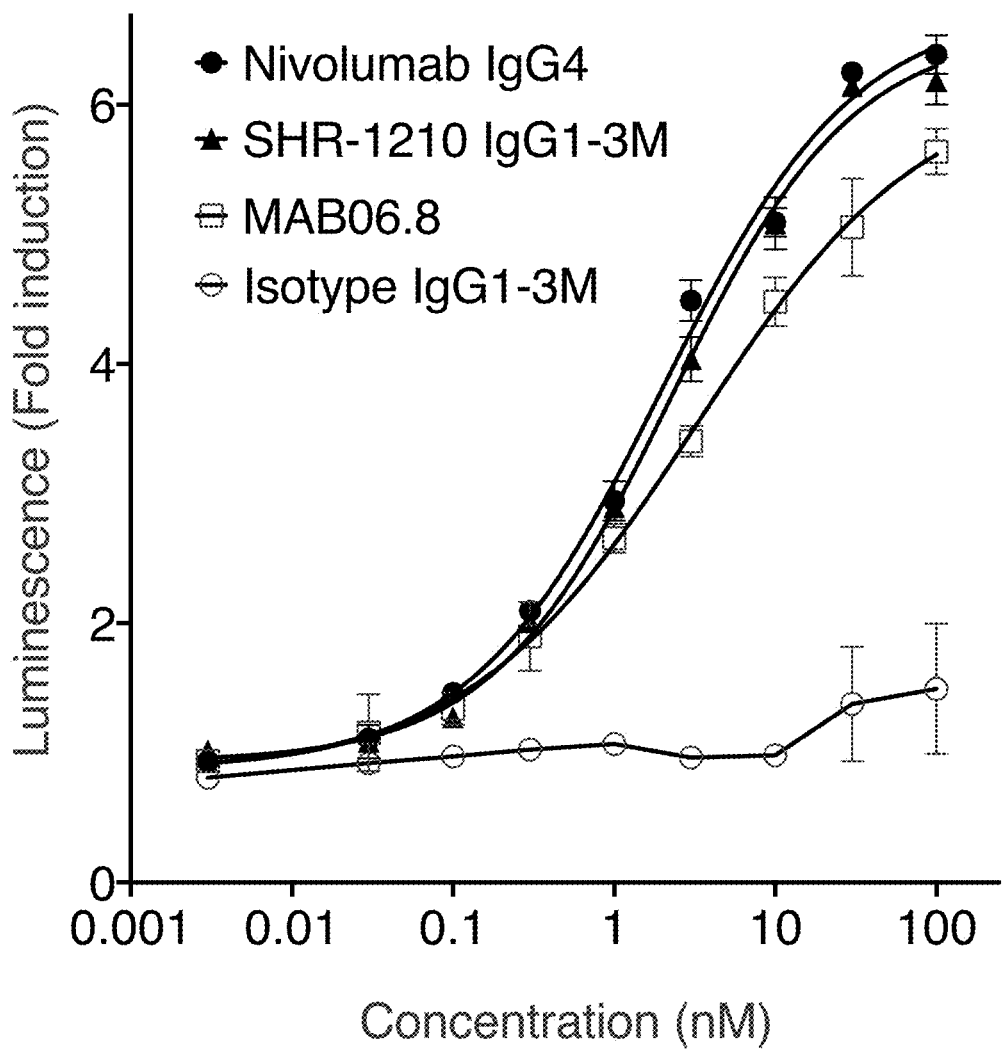
Figure 8H:
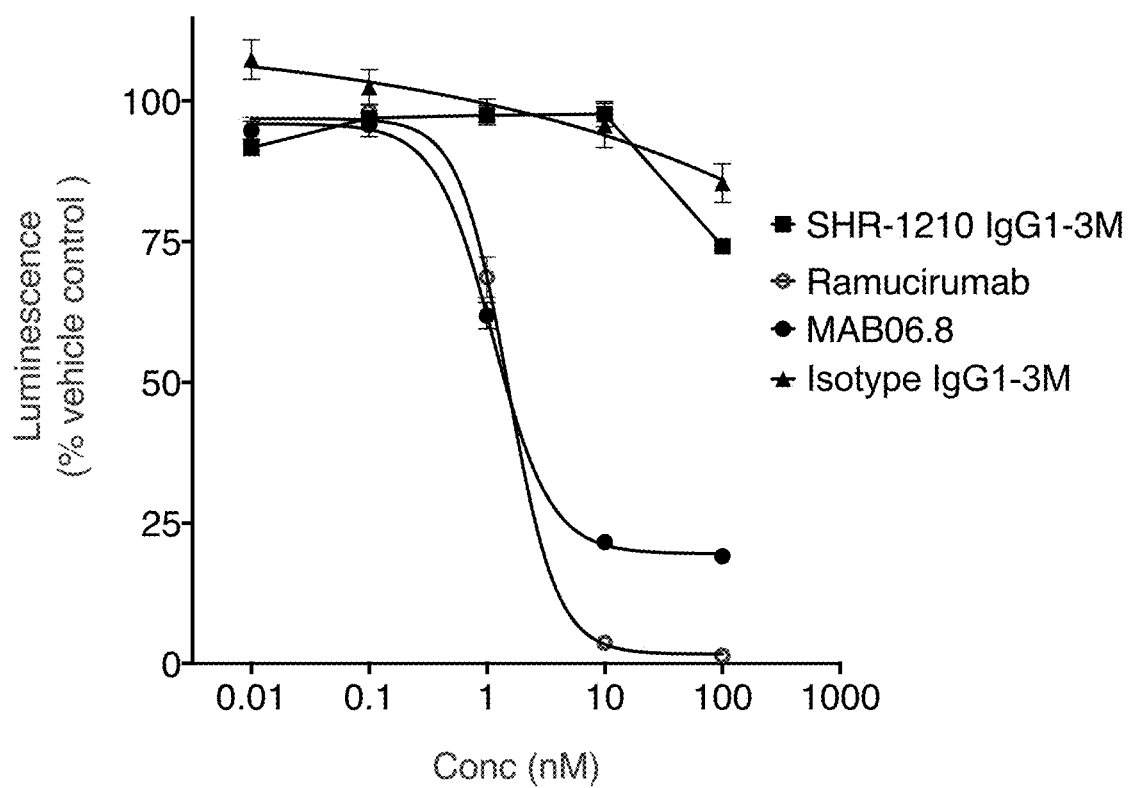

PD-L1 cell signalling bioassay, with potencies similar to both SHR-1210 IgG1-3M and Nivolumab (FIG. 6). Similarly, all 8 clones retained the concentration-dependent ability to antagonise VEGFR2 signalling in a VEGF/VEGFR2 cell signalling bioassay, with potencies similar to Ramucirumab (FIG. 7). Comparative analysis of PD1 and VEGFR2 antagonism for clones MAB06.5 (FIG. 8A, 8B), MAB06.6 (FIG. 8C, 8D), MAB06.7 (FIG. 8E, 8F), and MAB06.8 (FIG. 8G, 8H) demonstrated that the sequence of clone MAB06 could accept humanization of multiple residues in LCDR1, LCDR2 (Table 8) and HCDR2 (Table 9), while retaining the ability to antagonise the signalling of both receptors. Importantly, the control SHR-1210 IgG13M (hMab005) was shown to be incapable of inhibiting VEGFR2 signalling in the presence of VEGF, as demonstrated in FIGS. 4, 5, 7 and 8.

Figure 9:
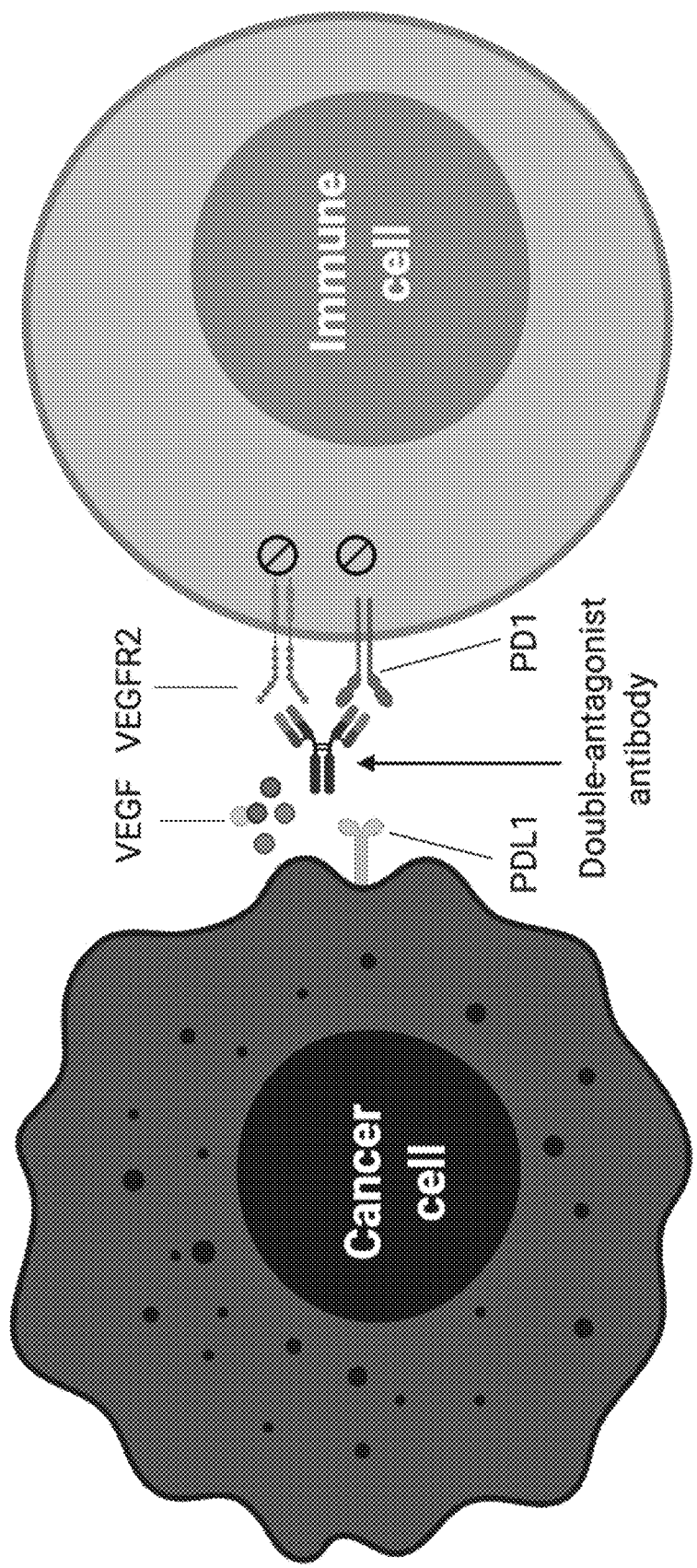
FIG. 9. Dual PD1-VEGFR2 antagonism. Tumour-infiltrating immune cells can express both PD1 and VEGFR2. Cancer cells (or stromal cells, other immune cells, etc.) in the tumour can express PD-L1 and/or VEGF. These signals cooperate to suppress immune function in the tumour microenvironment. Double-antagonist antibodies that can effectively block the signalling of both PD1 and VEGFR2 (on the same or differing cells) may therefore have improved anti-tumour potency over PD1 or VEGFR2 blocking antibodies alone.

The above findings demonstrate that the ability to antagonise both PD1 and VEGFR2 pathways in a single molecule may provide clinical benefit over the antibody SHR-1210 (hMab005), by blocking two key immunosuppressive signals that are known to the highly active in the tumour microenvironment. Indeed, both PD1 and VEGFR2 receptors have been demonstrated to be co-expressed on immune cells in human tumours, suggesting that dual-antagonising agents may potentially act in a bifunctional fashion on single cells, as shown in FIG. 9.

Figure 10:
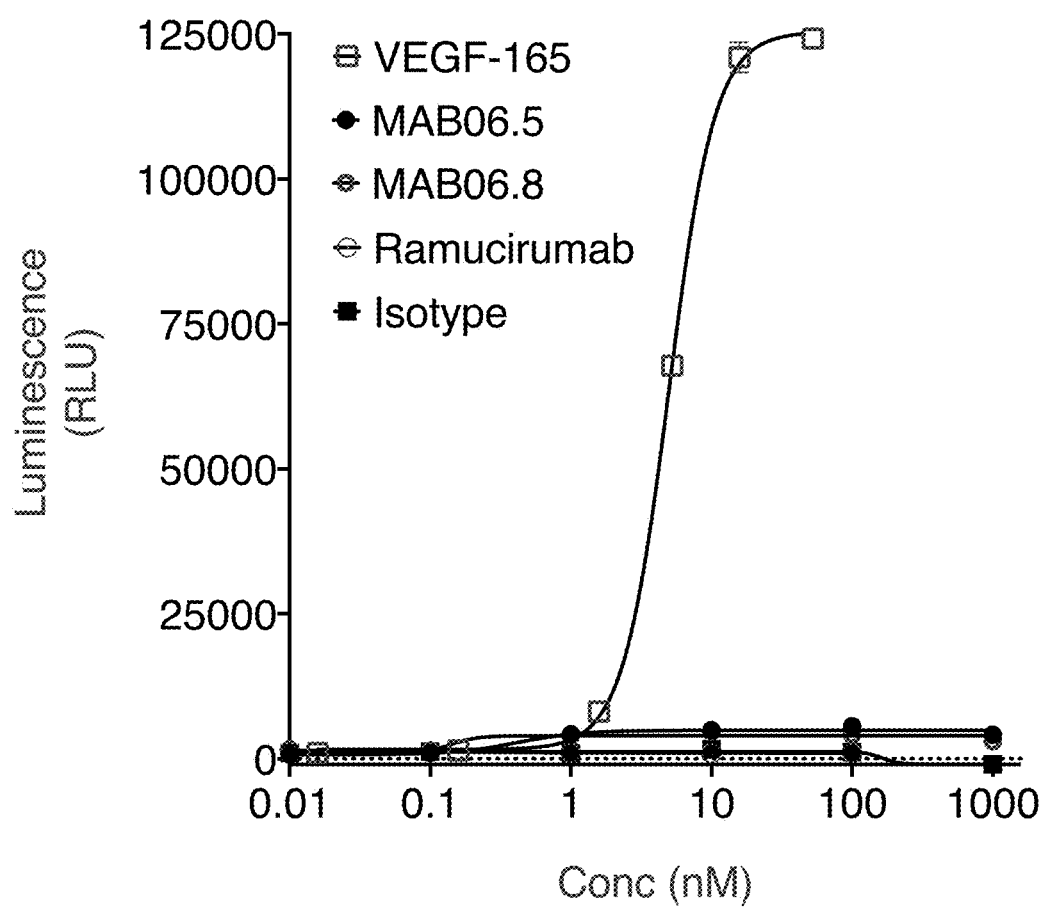
FIG. 10. Cell-based VEGFR2 agonism assay. Ramucirumab, isotype control human IgG1, MAB06.5, MAB06.8 and VEGF-165 protein were titrated in a human VEGFR2 signalling assay. Neither Ramucirumab, isotype nor the clones MAB06.5 and MAB06.8 showed any concentration-dependent VEGFR2 agonism. The positive control VEGF-165 elicited potent antagonism, in the nM range.
Figure 11A:
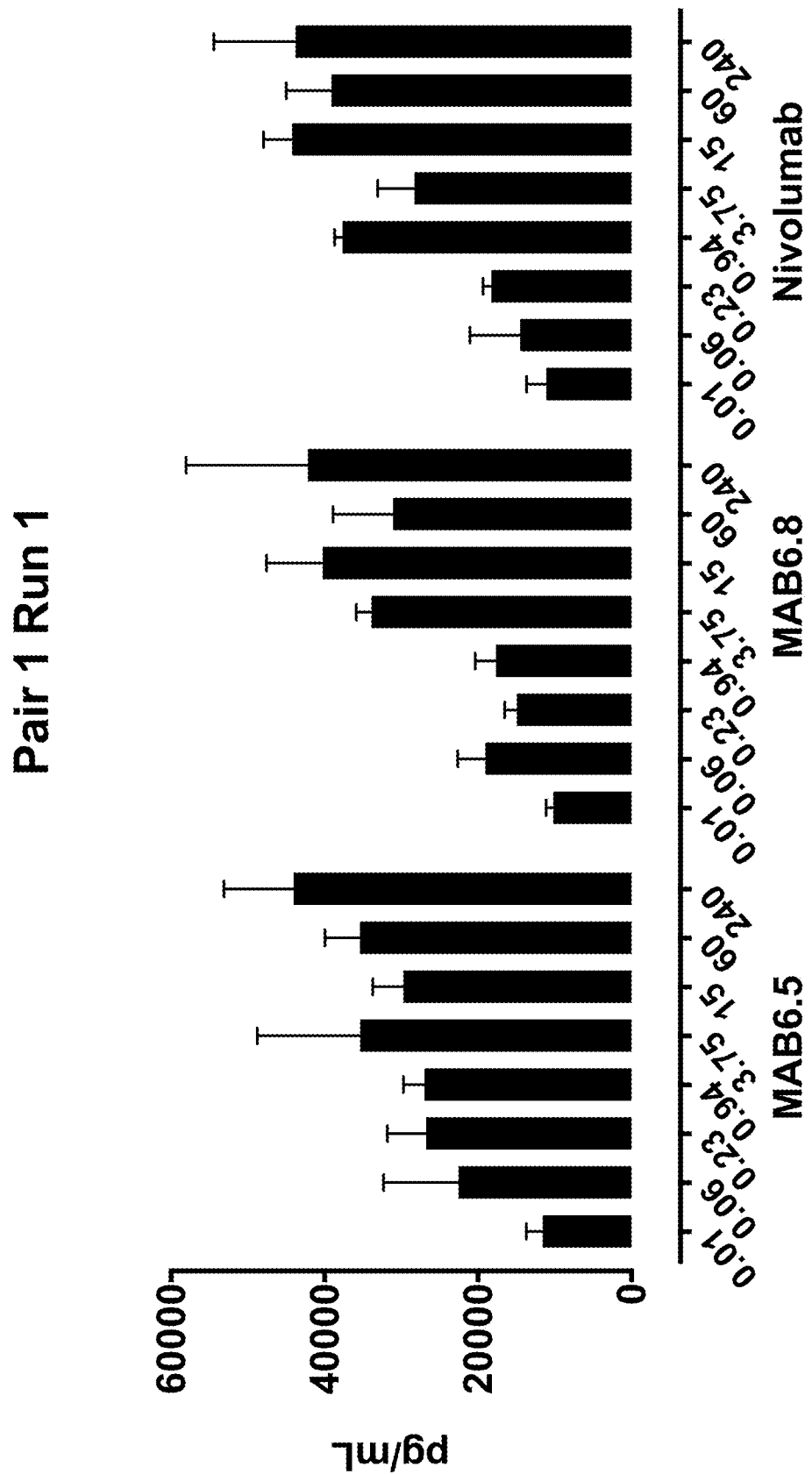
FIG. 11A-FIG. 11F. One-way human DC: T cell Mixed Lymphocyte Reaction (MLR) assay. MAB06.5, MAB06.8 and Nivolumab (anti-PD1) were titrated (nM) in a human MLR assay, with 3 separate human donor pairs, on two repeat runs. MAB6.5 and MAB6.8 showed concentration-dependent potencies in PD1 blockade-driven IFN-γ signalling that were equivalent to Nivolumab. This was found in both runs for Donor Pair 1 (FIG. 11A, FIG. 11B), Donor Pair 2 (FIG. 11C, FIG. 11D), and Donor Pair 3 (FIG. 11E, FIG. 11F).
Figure 11B:
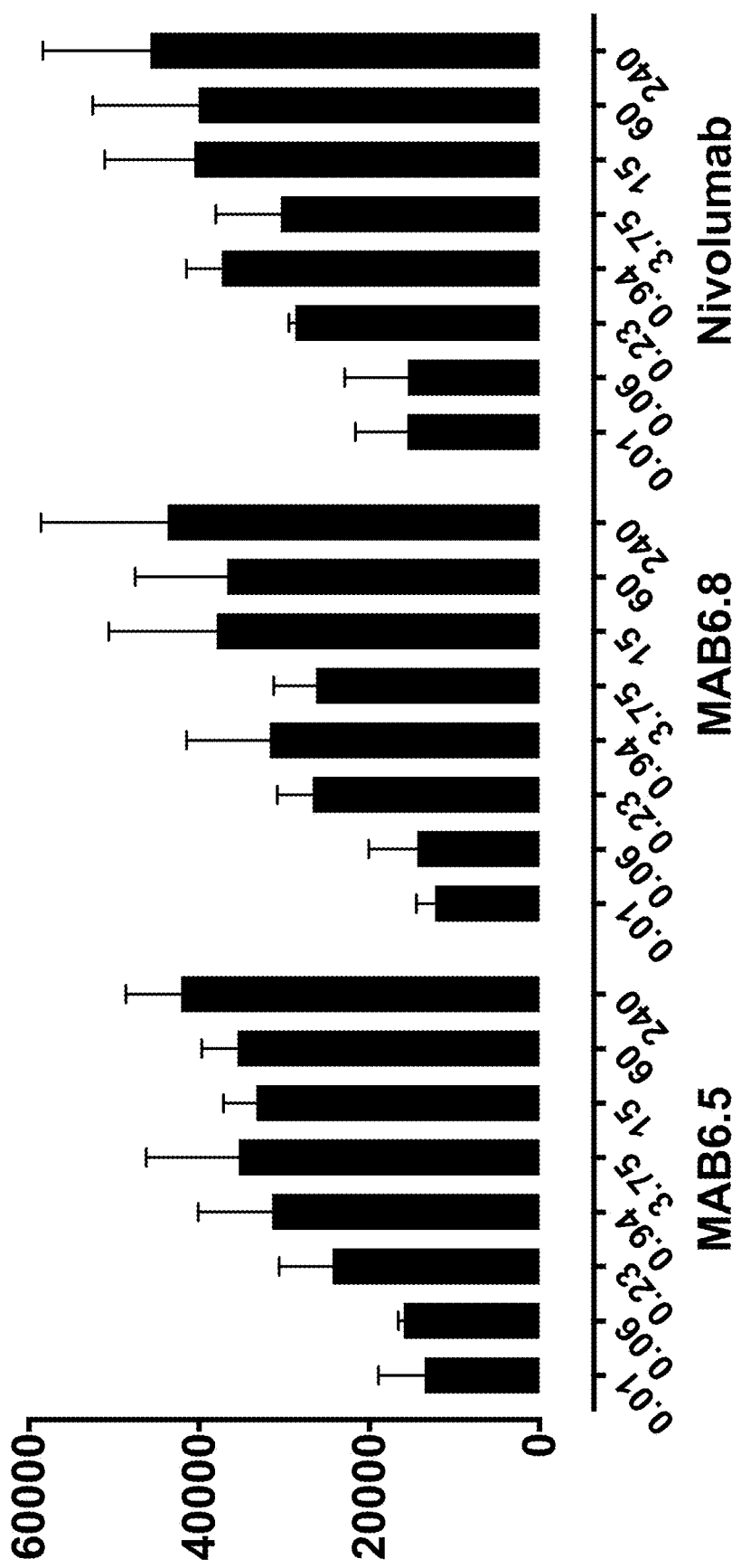
Figure 11C:
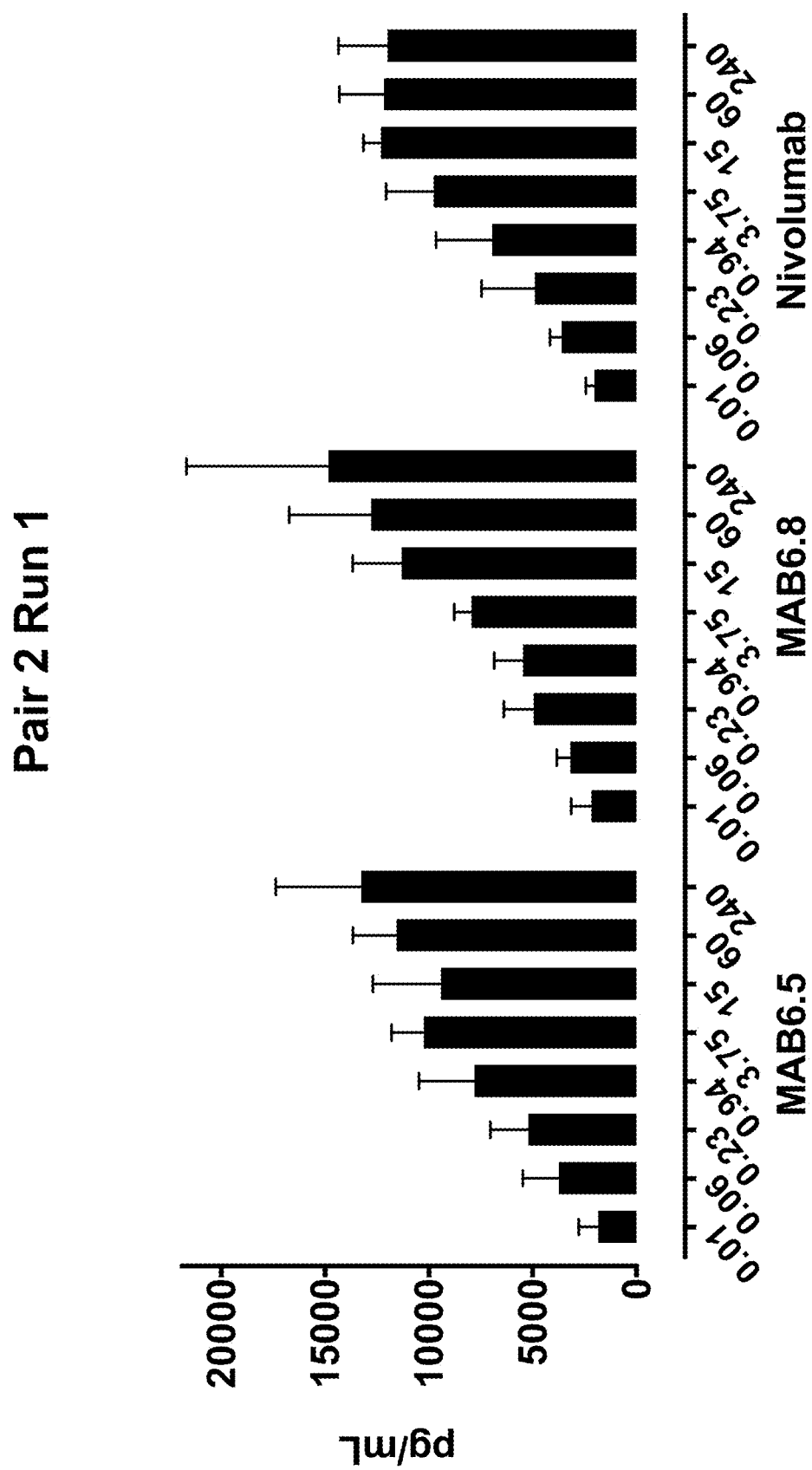
Figure 11D:
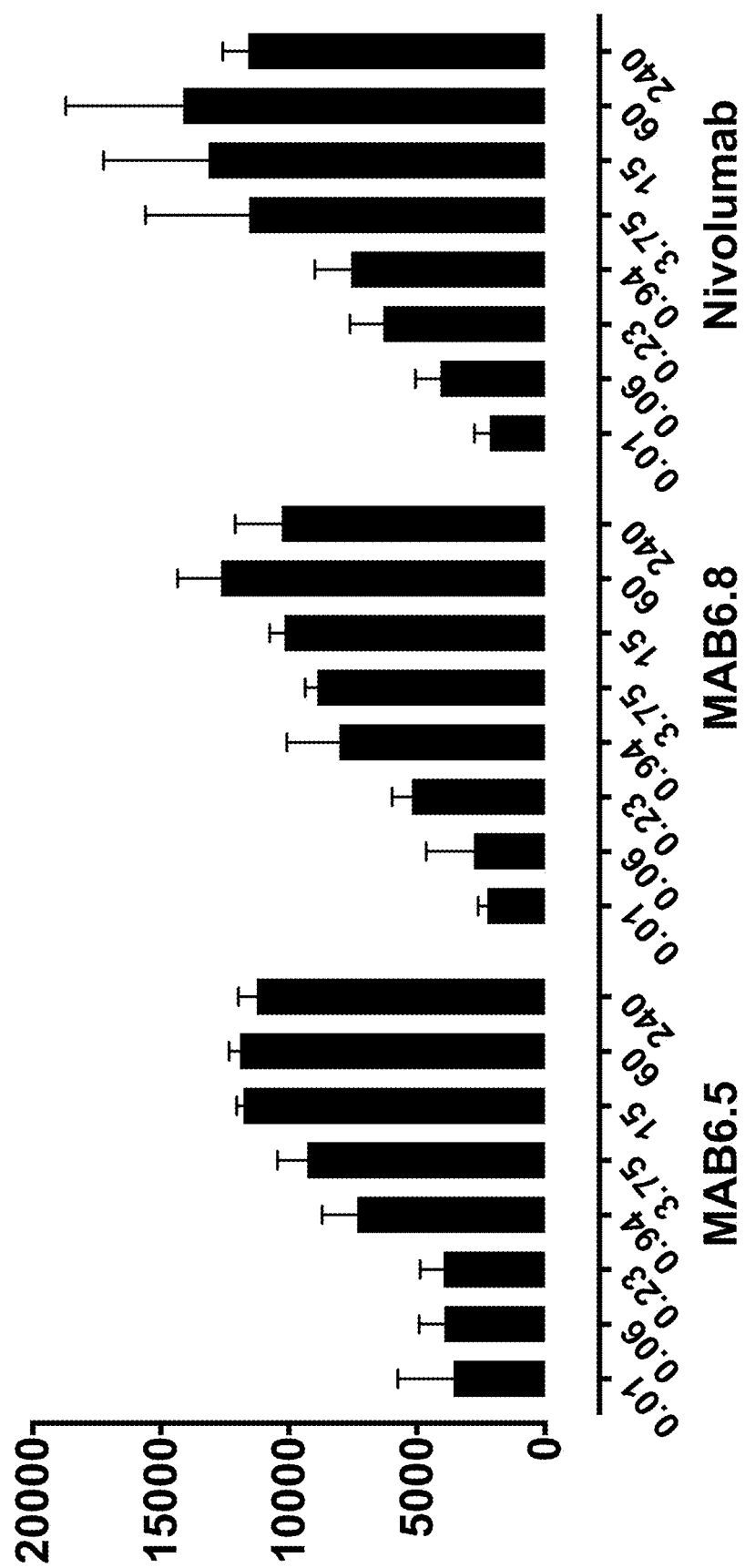
Figure 11E:
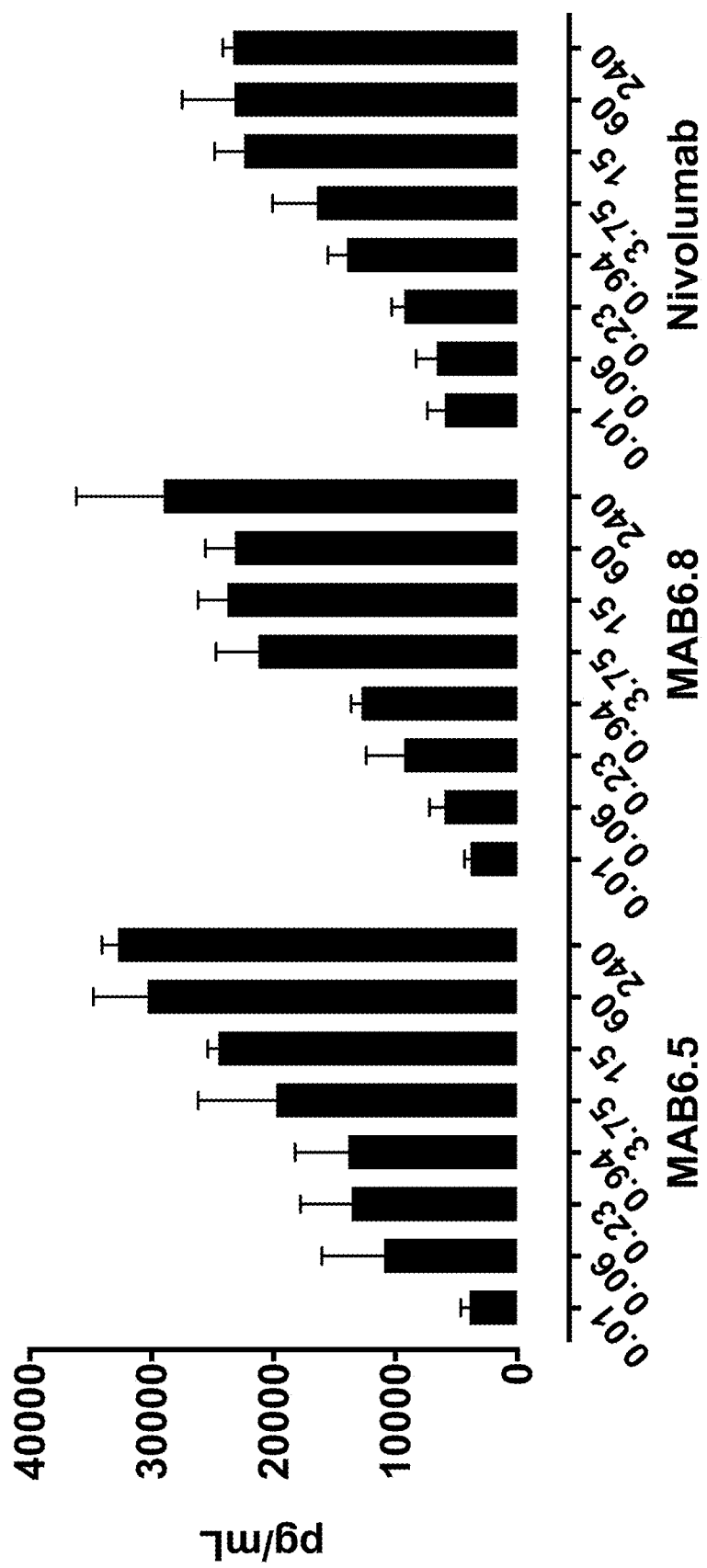
Figure 11F:
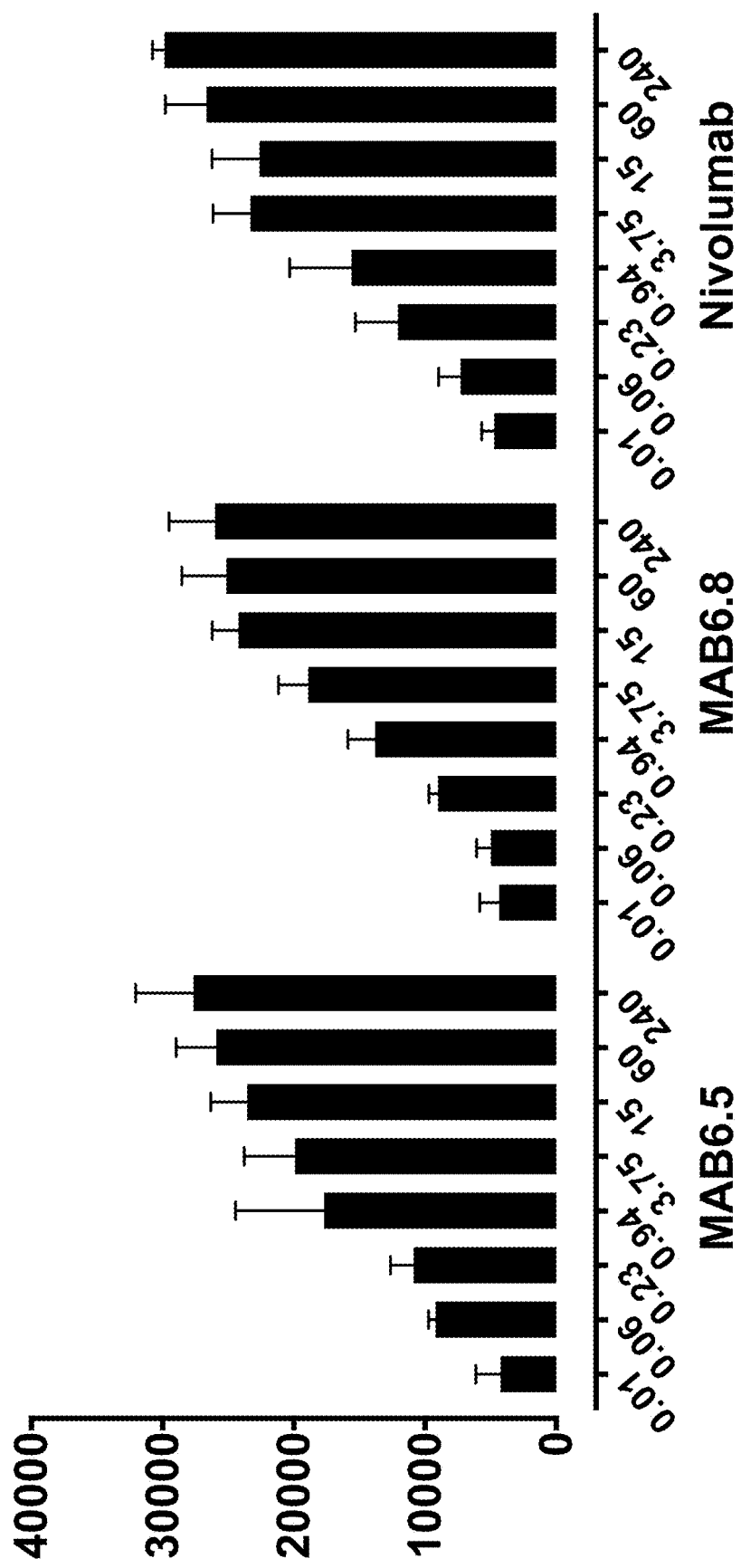

Antibodies that bind to signalling receptors with high affinity are at risk of becoming potent agonists of receptor activity when the receptor ligand is not present. To examine this, the VEGFR2 bioassay was repeated in the absence of VEGF. The high-affinity anti-VEGFR2 IgG1 control antibody Ramucirumab, isotype control human IgG1, MAB06.5, MAB06.8 and VEGF-165 protein were all titrated in this assay, with the antibody proteins starting from 1000 nM concentration (FIG. 10). Only VEGF-165 demonstrated concentration-dependent receptor activation, which confirmed that the MAB06.5 and MAB06.8 IgG1s are antagonists of VEGFR2 in the presence of VEGF (FIG. 8), and are not agonists of VEGFR2 in the absence of VEGF (FIG. 10).

To further confirm the PD1 antagonism potency of MAB06.5 and MAB06.8, both molecules were analysed in a human DC: T cell one-way MLR assay, with Nivolumab (anti-PD1) as positive control and IFN-γ being measured as the indicator of activity (FIG. 11). MLR assays were performed with 3 separate human donor pairs, on two repeat runs. These analyses demonstrated that both MAB6.5 and MAB6.8 showed concentration-dependent potencies in PD1 blockade-driven IFN-γ signalling that were equivalent to Nivolumab. This was found in both runs for Donor Pair 1 (FIG. 11A, FIG. 11B), Donor Pair 2 (FIG. 11C, FIG. 11D), and Donor Pair 3 (FIG. 11E, FIG. 11F), demonstrating high reproducibility in blocking the function of PD1 on T cells.

3$^{Rd}$ Generation Lead Igg Variant Generation and Analysis

WO2019170885A1 discloses a number of mutations which may be made in the VH domain of hMab005 that have the potential to enhance the affinity of the molecule for PD1. In order to examine the possible utility of these previously defined mutations in the context of the novel clones described herein, nine variants of clone MAB06.8 were generated to experimentally interrogate multiple VH CDR residues for their ability to be mutated to potentially further improve binding to PD1 and/or VEGFR2. These clones all contained the MAB06.8 VL sequence (SEQ ID NO: 47, Table 8), expressed with 9 unique VH sequences (Table 10). All eight clones were expressed and purified in IgG1 null format. All clones (other than MAB06.8.3 and MAB06.8.5, which both suffered from aggregation) were readily expressed and purified via Protein A affinity column, and the resulting proteins exhibited % monomer IgG of >95% (as measured by SEC).

Figure 12A:
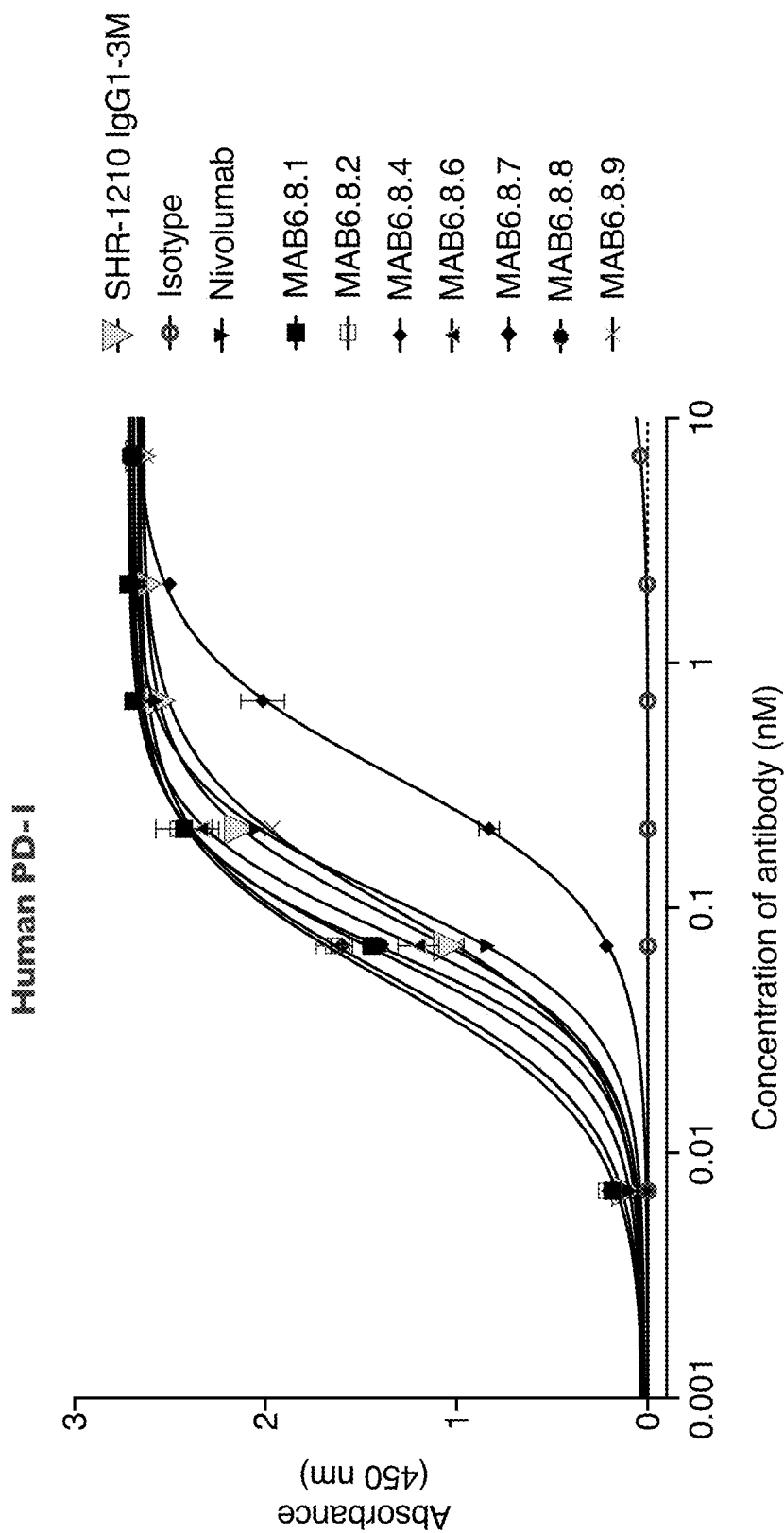
FIG. 12A-FIG. 12D. Direct titration ELISA for purified IgG1 null binding to human and cyno PD1-Fc, human and cynomolgus VEGFR2 proteins. SHR-1210 IgG1-3M, an Isotype control IgG1 and seven $3^{rd}$ generation clones in human IgG1 null format were titrated (in nM) in a direct binding ELISA against human and cyno PD1 proteins (FIG. 12A, FIG. 12B), and human and cynomolgus VEGFR2 proteins (FIG. 12C, FIG. 12D).
Figure 12B:
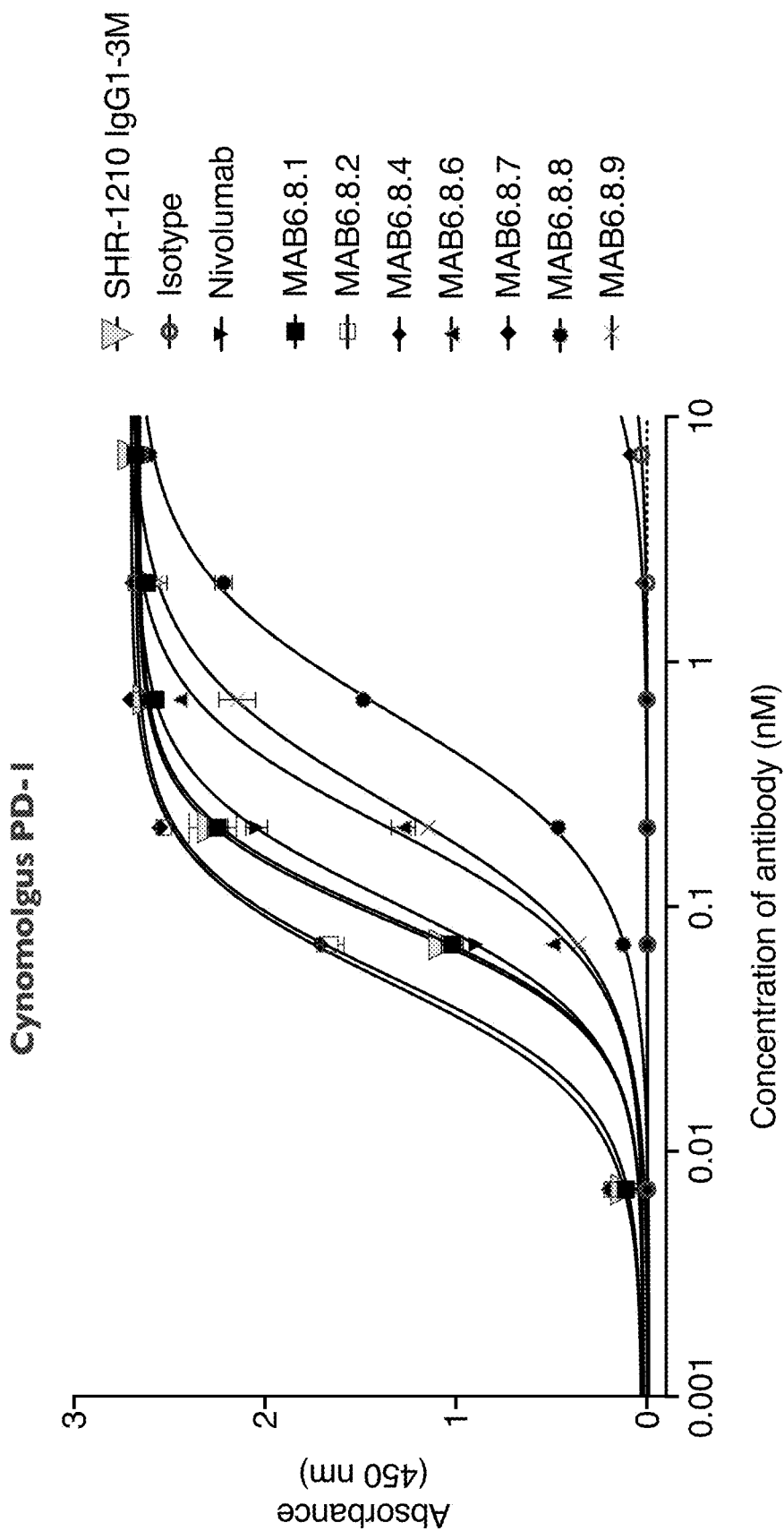
Figure 12C:
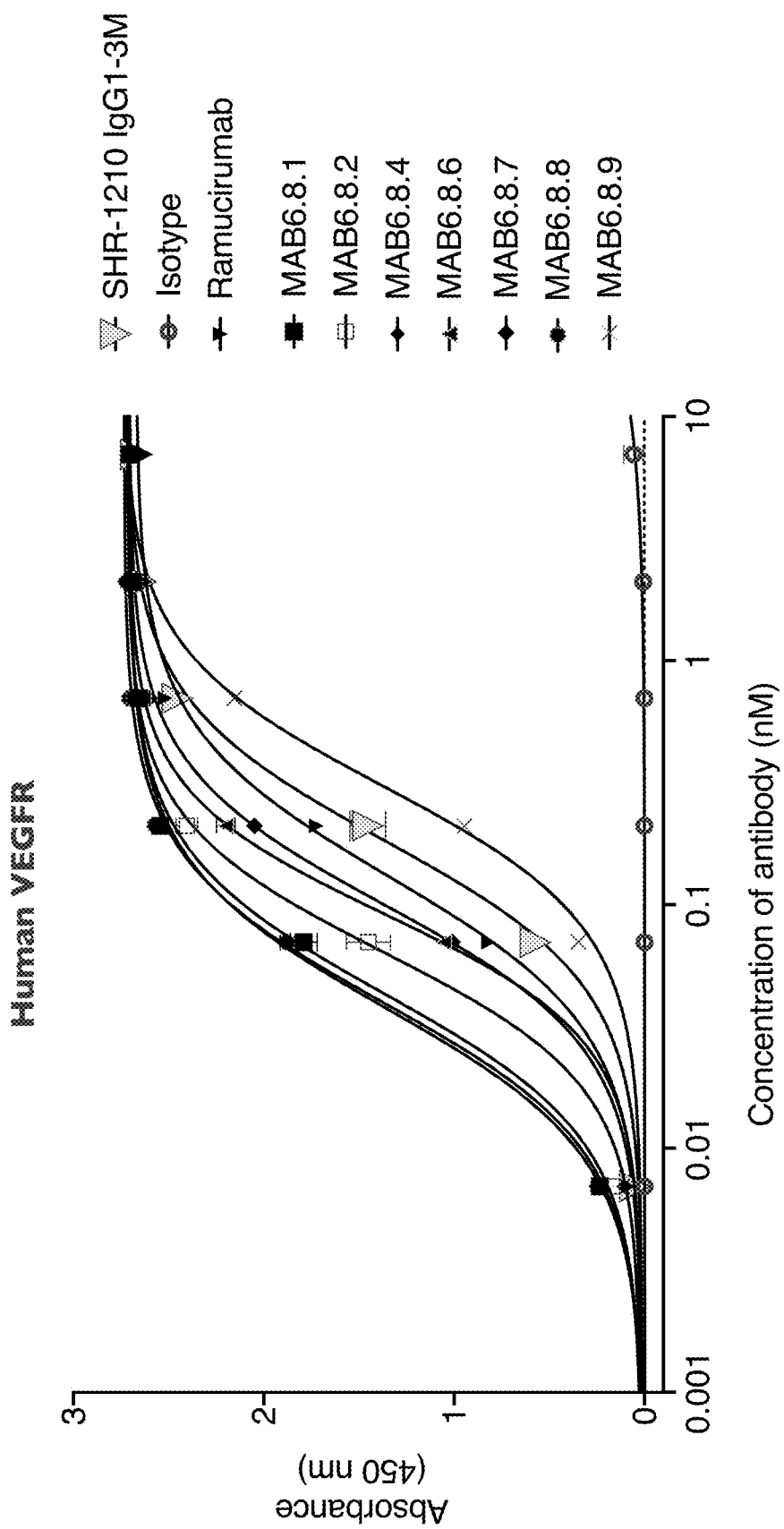
Figure 12D:
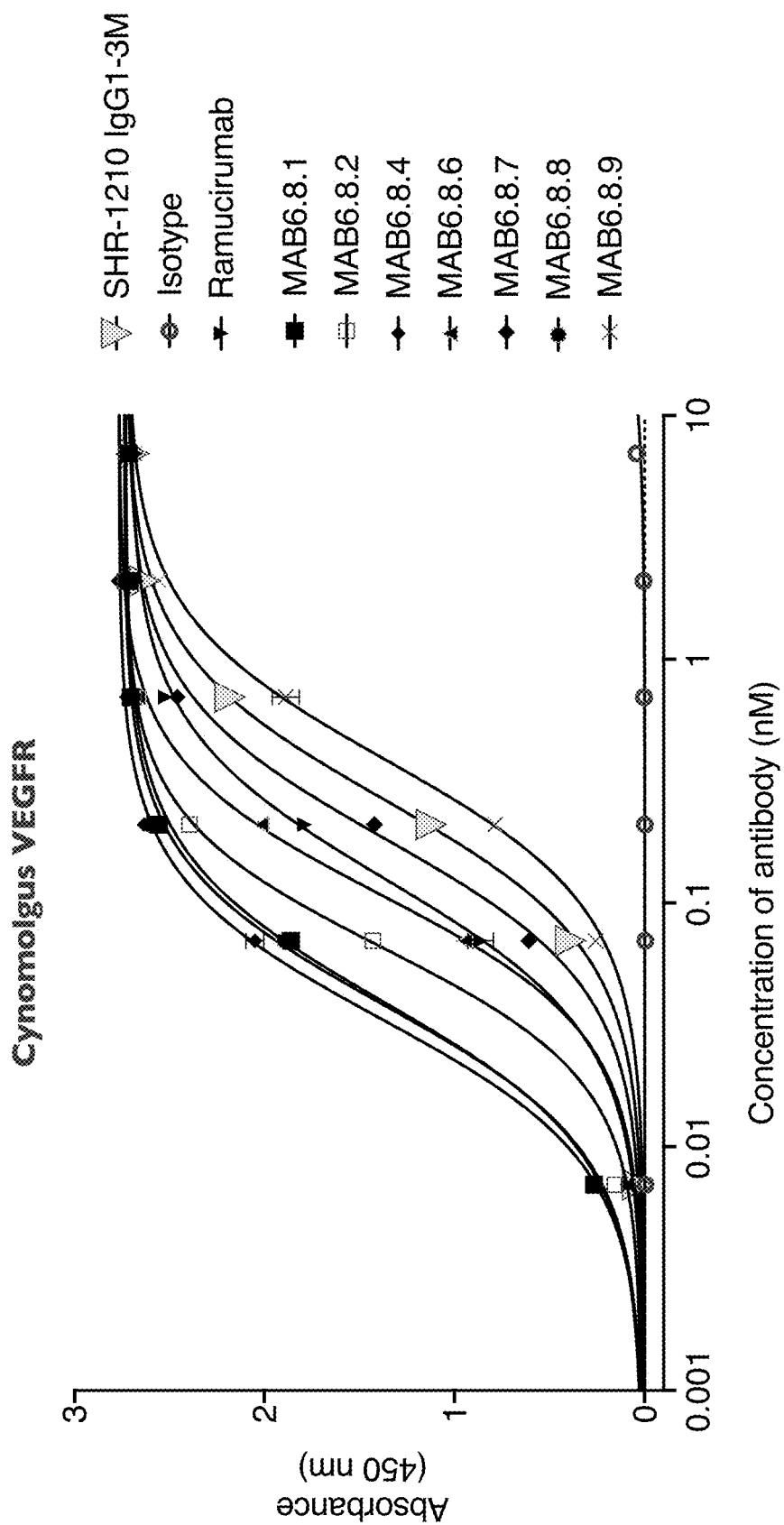

The 7 well-expressed IgG1 null clones (MAB06.8.3 and MAB06.8.5 omitted), plus hMAb005 and Isotype IgG1 null were examined in titration ELISA binding to human and cyno PD1 (FIG. 12A, FIG. 12B). This analysis showed that the majority of these 7 clones retained binding to human and cyno PD1, while the Isotype control showed no binding to either protein. One notable exception was MAB06.8.4, which had lost the ability to bind cyno PD1 (FIG. 12B). When the IgGs were tested for binding to VEGFR2 protein, all 7 clones demonstrated binding to both human and cyno orthologs (FIG. 12C, FIG. 12D).

Figure 13A:
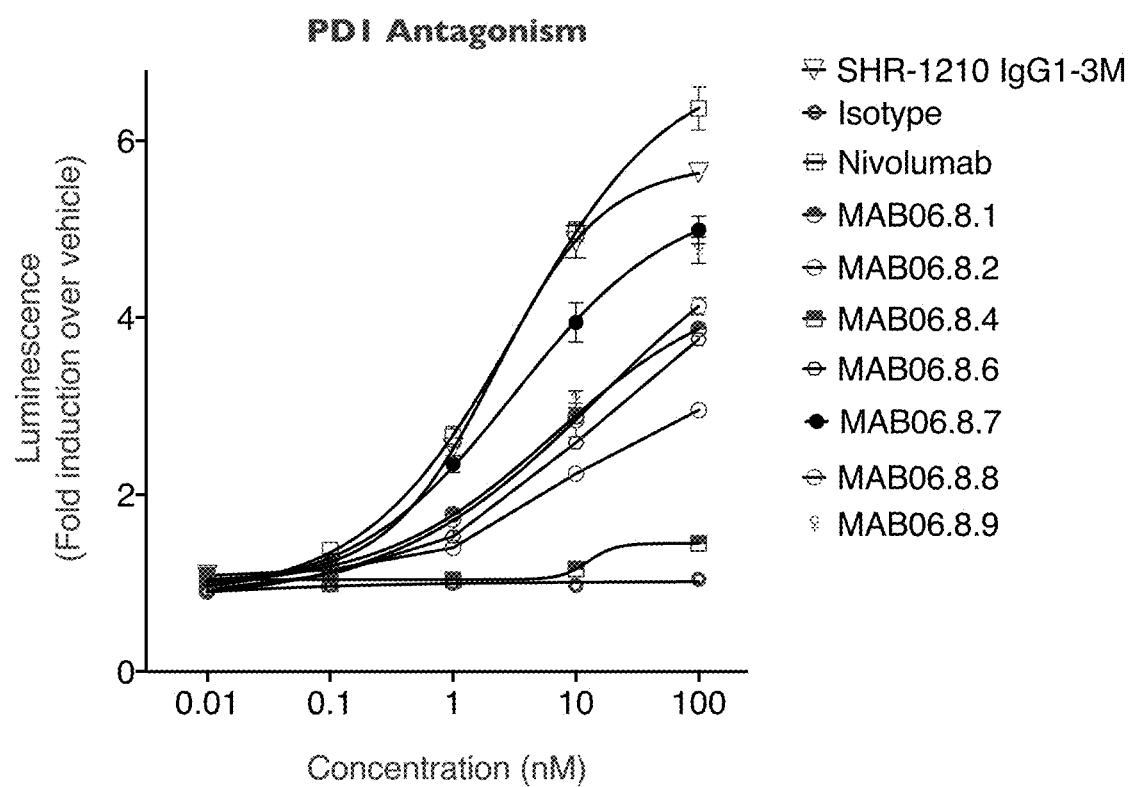
FIG. 13A-FIG. 13B. Cell-based PD1 and VEGFR2 antagonism assays. Comparative analysis of PD1 (FIG. 13A) and VEGFR2 (FIG. 13B) antagonism for clones SHR-1210 IgG1-3M, Nivolumab, an Isotype control IgG1 and seven $3^{rd}$ generation clones in human IgG1 null format.
Figure 13B:
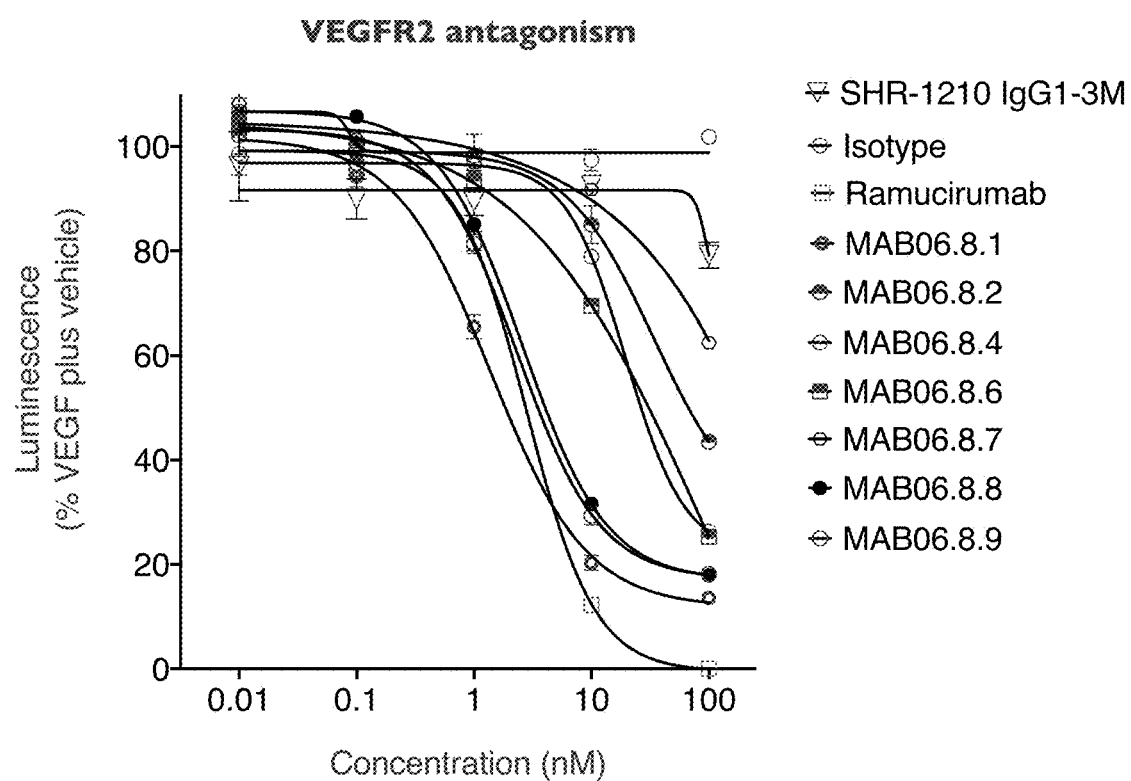

Despite this retention of apparent binding affinity for both PD1 and VEGFR2 in most clones, when the 7 variants were then examined in PD1 and VEGFR2 antagonism bioassays, the beneficial qualities of MAB06.8 were neither retained nor enhanced. All 7 clones exhibited reduced ability to antagonise PD1, VEGFR2, or both, in comparison to positive controls (FIG. 13A, FIG. 13B) and in comparison to MAB06 (FIG. 5), MAB06.5 (FIG. 8) and MAB06.8 (FIG. 8).

All documents, or portions of documents, cited herein, including but not limited to patents, patent applications, articles, books, and treatises, are hereby expressly incorporated by reference in their entirety for any purpose. In the event that one or more of the incorporated documents or portions of documents define a term that contradicts that term's definition in the application, the definition that appears in this application controls. However, mention of any reference, article, publication, patent, patent publication, and patent application cited herein is not, and should not be taken as an acknowledgment, or any form of suggestion, that they constitute valid prior art or form part of the common general knowledge in any country in the world.

Although the present invention has been described with reference to preferred or exemplary embodiments, those skilled in the art will recognize that various modifications and variations to the same can be accomplished without departing from the spirit and scope of the present invention and that such modifications are clearly contemplated herein. No limitation with respect to the specific embodiments disclosed herein and set forth in the appended claims is intended nor should any be inferred.

NUMBERED EMBODIMENTS

Notwithstanding the appended claims, the disclosure sets forth the following numbered embodiments:

1. An antibody that binds specifically to both PD1 and VEGFR2 or an antigen-binding portion of the antibody, wherein the antibody or antigen-binding portion comprises a heavy chain variable (VH) region and a light chain variable (VL) region, wherein
  (a) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QLYYFDY (SEQ ID NO: 3); and the VL region amino acid sequence comprises LCDR1 of RASQESGIWLS (SEQ ID NO: 39), LCDR2 of TATSLAD (SEQ ID NO: 5) and LCDR3 of QQVSVTPFT (SEQ ID NO: 11);
  (b) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QLYYFDY (SEQ ID NO: 3); and the VL region amino acid sequence comprises LCDR1 of RASQESGIWLS (SEQ ID NO: 39), LCDR2 of AASSLQS (SEQ ID NO: 43) and LCDR3 of QQVSVTPFT (SEQ ID NO: 11);

(c) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQESGIWLS (SEQ ID NO: 8), LCDR2 of TATSLAD (SEQ ID NO: 5) and LCDR3 of QQVSVTPFT (SEQ ID NO: 11);

(d) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQGIGPWLS (SEQ ID NO: 4), LCDR2 of TATSLAD (SEQ ID NO: 5) and LCDR3 of QQVYSIPWT (SEQ ID NO: 6);

(e) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQPLGIWLS (SEQ ID NO: 7), LCDR2 of TATSLAD (SEQ ID NO: 5) and LCDR3 of QQVYSIPWT (SEQ ID NO: 6);

(f) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQESGIWLS (SEQ ID NO: 8), LCDR2 of TATSLAD (SEQ ID NO: 5) and LCDR3 of QQVYSIPWT (SEQ ID NO: 6);

(g) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQTIGTWLT (SEQ ID NO: 9), LCDR2 of TATSLAD (SEQ ID NO: 5) and LCDR3 of QQVAELPFG (SEQ ID NO: 10);

(h) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQTIGTWLT (SEQ ID NO: 9), LCDR2 of TATSLAD (SEQ ID NO: 5) and LCDR3 of QQVSVTPFT (SEQ ID NO: 11);

(i) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQGIGPWLS (SEQ ID NO: 4), LCDR2 of TATSLAD (SEQ ID NO: 5) and LCDR3 of QQVAELPFG (SEQ ID NO: 10);

(j) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQPLGIWLS (SEQ ID NO: 7), LCDR2 of TATSLAD (SEQ ID NO: 5) and LCDR3 of QQVAELPFG (SEQ ID NO: 10);

(k) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQESGIWLG (SEQ ID NO: 12), LCDR2 of TATSLAD (SEQ ID NO: 5) and LCDR3 of QQVAELPFG (SEQ ID NO: 10);

(l) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQGIGPWLS (SEQ ID NO: 4), LCDR2 of TATSLAD (SEQ ID NO: 5) and LCDR3 of QQVSVTPFT (SEQ ID NO: 11);

(m) the VH region amino acid sequence comprises HCDR1 of GFTFSSYMMS (SEQ ID NO: 1), HCDR2 of TISGGGANTYYPDSVKG (SEQ ID NO: 2) and HCDR3 of QLYYFDY (SEQ ID NO: 3); and the VL region amino acid sequence comprises LCDR1 of LASQPLGIWLS (SEQ ID NO: 7), LCDR2 of TATSLAD (SEQ ID NO: 5) and LCDR3 of QQVSVTPFT (SEQ ID NO: 11);

(n) the VH region amino acid sequence comprises HCDR1 of GFTFSSYMMS (SEQ (SEQ ID NO: 3); and the VL region amino acid sequence comprises LCDR1 of RASQESGIWLS (SEQ ID NO: 39), LCDR2 of TATSLAD (SEQ ID NO: 5) and LCDR3 of QQVSVTPFT (SEQ ID NO: 11);

(o) the VH region amino acid sequence comprises HCDR1 of GFTFSSYMMS (SEQ ID NO: 1), HCDR2 of TISGGGANTYYVDSVKG (SEQ ID NO: 38) and HCDR3 of QLYYFDY (SEQ ID NO: 3); and the VL region amino acid sequence comprises LCDR1 of RASQESGIWLS (SEQ ID NO: 39), LCDR2 of TASSLAD (SEQ ID NO: 40) and LCDR3 of QQVSVTPFT (SEQ ID NO: 11);

(p) the VH region amino acid sequence comprises HCDR1 of GFTFSSYMMS (SEQ ID NO: 1), HCDR2 of TISGGGANTYYVDSVKG (SEQ ID NO: 38) and HCDR3 of QLYYFDY (SEQ ID NO: 3); and the VL region amino acid sequence comprises LCDR1 of RASQESGIWLS (SEQ ID NO: 39), LCDR2 of AASSLAD (SEQ ID NO: 41) and LCDR3 of QQVSVTPFT (SEQ ID NO: 11);

(q) the VH region amino acid sequence comprises HCDR1 of GFTFSSYMMS (SEQ ID NO: 1), HCDR2 of TISGGGANTYYVDSVKG (SEQ ID NO: 38) and HCDR3 of QLYYFDY (SEQ ID NO: 3); and the VL region amino acid sequence comprises LCDR1 of RASQESGIWLS (SEQ ID NO: 39), LCDR2 of AASSLQS (SEQ ID NO: 43) and LCDR3 of QQVSVTPFT (SEQ ID NO: 11);

(r) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QLYYFDY (SEQ ID NO: 3); and the VL region amino acid sequence comprises LCDR1 of RASQESGIWLS (SEQ ID NO: 39), LCDR2 of TASSLAD (SEQ ID NO: 40) and LCDR3 of QQVSVTPFT (SEQ ID NO: 11);

(s) the VH region amino acid sequence comprises HCDR1 of GFTFSSYMMS (SEQ ID NO: 1), HCDR2 of TISGGGSNKYYVDSVKG (SEQ ID NO: 42) and HCDR3 of QLYYFDY (SEQ ID NO: 3); and the VL region amino acid sequence comprises LCDR1 of RASQESGIWLS (SEQ ID NO: 39), LCDR2 of AASSLAD (SEQ ID NO: 41) and LCDR3 of QQVSVTPFT (SEQ ID NO: 11); or (t) the VH region amino acid sequence comprises HCDR1 of GFTFSSYMMS (SEQ ID NO: 1), HCDR2 of TIS-GGGSNKYYVDSVKG (SEQ ID NO: 42) and HCDR3 of QVYYFDY (SEQ ID NO: 64); and the VL region amino acid sequence comprises LCDR1 of RASQESGIWLS (SEQ ID NO: 39), LCDR2 of AASS-LOS (SEQ ID NO: 43) and LCDR3 of QQVSVTPFT (SEQ ID NO: 11).

2. The antibody or antigen-binding portion of embodiment 1, wherein
(a) the VH region amino acid sequence comprises SEQ ID NO: 49 and the VL region amino acid sequence comprises SEQ ID NO: 44;
(b) the VH region amino acid sequence comprises SEQ ID NO: 49 and the VL region amino acid sequence comprises SEQ ID NO: 47;
(c) the VH region amino acid sequence comprises SEQ ID NO: 13 and the VL region amino acid sequence comprises SEQ ID NO: 24;
(d) the VH region amino acid sequence comprises SEQ ID NO: 13 and the VL region amino acid sequence comprises SEQ ID NO: 14;
(e) the VH region amino acid sequence comprises SEQ ID NO: 13 and the VL region amino acid sequence comprises SEQ ID NO: 15;
(f) the VH region amino acid sequence comprises SEQ ID NO: 13 and the VL region amino acid sequence comprises SEQ ID NO: 16;
(g) the VH region amino acid sequence comprises SEQ ID NO: 13 and the VL region amino acid sequence comprises SEQ ID NO: 17;
(h) the VH region amino acid sequence comprises SEQ ID NO: 13 and the VL region amino acid sequence comprises SEQ ID NO: 18;
(i) the VH region amino acid sequence comprises SEQ ID NO: 13 and the VL region amino acid sequence comprises SEQ ID NO: 19;
(j) the VH region amino acid sequence comprises SEQ ID NO: 13 and the VL region amino acid sequence comprises SEQ ID NO: 20;
(k) the VH region amino acid sequence comprises SEQ ID NO: 13 and the VL region amino acid sequence comprises SEQ ID NO: 21;
(l) the VH region amino acid sequence comprises SEQ ID NO: 13 and the VL region amino acid sequence comprises SEQ ID NO: 22;
(m) the VH region amino acid sequence comprises SEQ ID NO: 13 and the VL region amino acid sequence comprises SEQ ID NO: 23;
(n) the VH region amino acid sequence comprises SEQ ID NO: 48 and the VL region amino acid sequence comprises SEQ ID NO: 44;
(o) the VH region amino acid sequence comprises SEQ ID NO: 48 and the VL region amino acid sequence comprises SEQ ID NO: 45;
(p) the VH region amino acid sequence comprises SEQ ID NO: 48 and the VL region amino acid sequence comprises SEQ ID NO: 46;
(q) the VH region amino acid sequence comprises SEQ ID NO: 48 and the VL region amino acid sequence comprises SEQ ID NO: 47;
(r) the VH region amino acid sequence comprises SEQ ID NO: 49 and the VL region amino acid sequence comprises SEQ ID NO: 45;
(s) the VH region amino acid sequence comprises SEQ ID NO: 49 and the VL region amino acid sequence comprises SEQ ID NO: 46; or
(t) the VH region amino acid sequence comprises SEQ ID NO: 73 and the VL region amino acid sequence comprises SEQ ID NO: 47.

3. The antibody or antigen-binding portion of embodiment 1 or 2, wherein the antibody or antigen-binding portion is capable of antagonizing both the PD1-PDL1 and the VEGFR2-VEGF signaling pathways.

4. An antibody that binds specifically to both PD1 and VEGFR2 or an antigen-binding portion of the antibody, wherein the antibody or antigen-binding portion cross-competes for binding to both PD1 and VEGFR2 with the antibody or antigen-binding portion of any one of embodiments 1-3; and
(a) comprises fully germline human framework amino acid sequences;
(b) binds specifically to human PD1, cynomolgus PD1, human VEGFR2 and rhesus VEGFR2; and
(c) antagonizes binding of human PD1 to human PD-L1 and antagonizes the signalling of human VEGFR2 in response to human VEGF.

5. The antibody or antigen-binding portion of any one of embodiments 1-4, wherein the antibody is human, humanized or chimeric.

6. The antibody or antigen-binding portion of any one of embodiments 1-5, wherein the VH region, the VL region, or both the VH and the VL region comprise one or more human framework region amino acid sequences.

7. The antibody or antigen-binding portion of any one of embodiments 1-6, wherein the VH region, the VL region, or both the VH and the VL region comprise a human variable region framework scaffold amino acid sequence into which the CDRs have been inserted.

8. The antibody or antigen-binding portion of embodiment 1 or 3, wherein the VH region comprises an IGHV3-7 human germline scaffold amino acid sequence into which the HCDR1, HCDR2 and HCDR3 amino acid sequences have been inserted.

9. The antibody or antigen-binding portion of any one of embodiments 1, 3 and 8, wherein the VL region comprises an IGKV1-39 human germline scaffold amino acid sequence into which the LCDR1, LCDR2 and LCDR3 amino acid sequences have been inserted.

10. The antibody or antigen-binding portion of any one of embodiments 1-9, wherein the antibody comprises an immunoglobulin constant region.

11. The antibody or antigen-binding portion of embodiment 10, wherein the immunoglobulin constant region is IgG, IgE, IgM, IgD, IgA or IgY.

12. The antibody or antigen-binding portion of embodiment 11, wherein the immunoglobulin constant region is IgG1, IgG2, IgG3, IgG4, IgA1 or IgA2.

13. The antibody or antigen-binding portion of embodiment 10, wherein the immunoglobulin constant region is immunologically inert.

14. The antibody or antigen-binding portion of embodiment 10, wherein the immunoglobulin constant region is a wild-type human IgG4 constant region, a human IgG4 constant region comprising the amino acid substitution S228P, a wild-type human IgG1 constant region, a human IgG1 constant region comprising the amino acid substitutions L234A, L235A and G237A or a wild-type human IgG2 constant region.

15. The antibody or antigen-binding portion of embodiment 13, wherein the immunoglobulin constant region comprises any one of SEQ ID NOs: 25-31.

16. The antigen-binding portion of any one of embodiments 1-15, wherein the antibody or antigen-binding portion is an Fab, an Fab', an F(ab')$_2$, an Fd, an Fv, an scFv, a maxibody, a minibody, an intrabody, a diabody, a triabody, a tetrabody, or a bis-scFv.

17. The antibody or antigen-binding portion of any one of embodiments 1-16, wherein the antibody is monoclonal.

18. The antibody or antigen-binding portion of any one of embodiments 1-17, wherein the antibody is a tetrameric antibody, a tetravalent antibody or a multispecific antibody.

19. The antibody or antigen-binding portion of any one of embodiments 1-18, wherein the antibody or antigen-binding portion binds specifically to (a) human PD1 or (b) human PD1 and cynomolgus PD1 or (c) human PD1 and rhesus PD1 or (d) human PD1, cynomolgus PD1 and rhesus PD1.

20. The antibody or antigen-binding portion of any one of embodiments 1-19, wherein the antibody or antigen-binding portion binds specifically to (a) human VEGFR2 or (b) human VEGFR2 and cynomolgus VEGFR2 or (c) human VEGFR2 and rhesus VEGFR2 or (d) human VEGFR2, cynomolgus VEGFR2 and rhesus VEGFR2.

21. An immunoconjugate comprising the antibody or antigen-binding portion of any one of embodiments 1-20 linked to a therapeutic agent.

22. The immunoconjugate of embodiment 21, wherein the therapeutic agent is a cytotoxin, a radioisotope, a chemotherapeutic agent, an immunomodulatory agent, an anti-angiogenic agent, an antiproliferative agent, a pro-apoptotic agent, a cytostatic enzyme, a cytolytic enzymes, a therapeutic nucleic acid, an anti-angiogenic agent, an anti-proliferative agent, or a pro-apoptotic agent.

23. A pharmaceutical composition comprising the antibody or antigen-binding portion of any one of embodiments 1-20 or the immunoconjugate of embodiment 21 or 22, and a pharmaceutically acceptable carrier, diluent or excipient.

24. A nucleic acid molecule encoding
  (a) the VH region amino acid sequence;
  (b) the VL region amino acid sequence; or
  (c) both the VH and the VL region amino acid sequences of the antibody or antigen-binding portion of any one of embodiments 1-20.

25. An expression vector comprising the nucleic acid molecule of embodiment 24.

26. A recombinant host cell comprising the nucleic acid molecule of embodiment 24 or the expression vector of embodiment 25.

27. A method of producing an anti-PD1 antibody or an antigen-binding portion thereof, the method comprising:
  culturing a recombinant host cell comprising the expression vector of embodiment 25 under conditions whereby the nucleic acid molecule is expressed, thereby producing the antibody or antigen-binding portion; and
  isolating the antibody or antigen-binding portion from the host cell or culture.

28. A method for enhancing an immune response in a subject, comprising administering to the subject a therapeutically effective amount of the antibody or antigen-binding portion of any one of embodiments 1-20, the immunoconjugate of embodiment 21 or 22 or the pharmaceutical composition of embodiment 23.

29. A method of treating or preventing cancer, an infectious disease, or an immune disease in a subject, comprising administering to the subject a therapeutically effective amount of the antibody or antigen-binding portion of any one of embodiments 1-20, the immunoconjugate of embodiment 21 or 22 or the pharmaceutical composition of embodiment 23.

30. The method of embodiment 29, wherein the cancer is pancreatic cancer, melanoma, breast cancer, lung cancer, bronchial cancer, colorectal cancer, prostate cancer, stomach cancer, ovarian cancer, urinary bladder cancer, brain or central nervous system cancer, peripheral nervous system cancer, esophageal cancer, cervical cancer, uterine or endometrial cancer, cancer of the oral cavity or pharynx, liver cancer, kidney cancer, testicular cancer, biliary tract cancer, small bowel or appendix cancer, salivary gland cancer, thyroid gland cancer, adrenal gland cancer, osteosarcoma, chondrosarcoma, or cancer of hematological tissues.

31. The method of embodiment 29, wherein the infectious disease is viral, bacterial, fungal, or parasitic.

32. The method of embodiment 29, wherein the infectious disease is human immunodeficiency virus (HIV) infection.

33. The antibody or antigen-binding portion of any one of embodiments 1-20, the immunoconjugate of embodiment 21 or 22 or the pharmaceutical composition of embodiment 23 for use in the treatment of cancer, an infectious disease, or an immune disease.

34. The antibody or antigen-binding portion, the immunoconjugate or the pharmaceutical composition for use according to embodiment 33, wherein the cancer is pancreatic cancer, melanoma, breast cancer, lung cancer, bronchial cancer, colorectal cancer, prostate cancer, stomach cancer, ovarian cancer, urinary bladder cancer, brain or central nervous system cancer, peripheral nervous system cancer, esophageal cancer, cervical cancer, uterine or endometrial cancer, cancer of the oral cavity or pharynx, liver cancer, kidney cancer, testicular cancer, biliary tract cancer, small bowel or appendix cancer, salivary gland cancer, thyroid gland cancer, adrenal gland cancer, osteosarcoma, chondrosarcoma, or cancer of hematological tissues.

35. The antibody or antigen-binding portion, the immunoconjugate or the pharmaceutical composition for use according to embodiment 33, wherein the infectious disease is viral, bacterial, fungal, or parasitic.

36. The antibody or antigen-binding portion, the immunoconjugate or the pharmaceutical composition for use according to embodiment 33, wherein the infectious disease is human immunodeficiency virus (HIV) infection.

37. The antibody or antigen-binding portion of any one of embodiments 1-20, the immunoconjugate of embodiment 21 or 22 or the pharmaceutical composition of embodiment 23, for use as a medicament.

TABLE 1

Amino acid sequence of hMAb005 VL mutagenesis sub-libraries.

| LFR1 | LCDR1 | LFR2 | LCDR2 | LFR3 | LCDR3 | LFR4 |
|---|---|---|---|---|---|---|
| DIQMTQSPSSLSASV GDRVTITC (SEQ ID NO: 50) | LA<u>S</u>QTIGTWLT (SEQ ID NO: 9) | WYQQKPGKAPKLLIY (SEQ ID NO: 51) | TATSLAD (SEQ ID NO: 5) | GVPSRFSGSGSGTDFT LTISSLQPEDFATYYC (SEQ ID NO: 52) | QQVYSIPWT (SEQ ID NO: 6) | FGGGTKVEIK (SEQ ID NO: 53) |
| DIQMTQSPSSLSASV GDRVTITC (SEQ ID NO: 50) | LASQTIGTWLT (SEQ ID NO: 9) | WYQQKPGKAPKLLI<u>Y</u> (SEQ ID NO: 51) | TATSLAD (SEQ ID NO: 5) | GVPSRFSGSGSGTDFT LTISSLQPEDFATYYC (SEQ ID NO: 52) | QQVYSIPWT (SEQ ID NO: 6) | FGGGTKVEIK (SEQ ID NO: 53) |
| DIQMTQSPSSLSASV GDRVTITC (SEQ ID NO: 50) | LASQTIGTWLT (SEQ ID NO: 9) | WYQQKPGKAPKLLIY (SEQ ID NO: 51) | TATSLAD (SEQ ID NO: 5) | GVPSRFSGSGSGTDFT LTISSLQPEDFATYYC (SEQ ID NO: 52) | QQVYSIPWT (SEQ ID NO: 6) | FGGGTKVEIK (SEQ ID NO: 53) |
| DIQMTQSPSSLSASV GDRVTITC (SEQ ID NO: 50) | LASQTIGTWLT (SEQ ID NO: 9) | WYQQKPGKAPKLLIY (SEQ ID NO: 51) | TATSLAD (SEQ ID NO: 5) | GVPSRFSGSGSGTDFT LTISSLQPEDFATYYC (SEQ ID NO: 52) | <u>Q</u>QVYSIPWT (SEQ ID NO: 6) | FGGGTKVEIK (SEQ ID NO: 53) |
| DIQMTQSPSSLSASV GDRVTITC (SEQ ID NO: 50) | LASQTIGTWLT (SEQ ID NO: 9) | WYQQKPGKAPKLLIY (SEQ ID NO: 51) | TATSLAD (SEQ ID NO: 5) | GVPSRFSGSGSGTDFT LTISSLQPEDFATYYC (SEQ ID NO: 52) | QQVYSIP<u>W</u>T (SEQ ID NO: 6) | FGGGTKVEIK (SEQ ID NO: 53) |

As noted above, the "Unified" CDR definitions used in this manuscript are an expanded definition in comparison to the classical Kabat definition. Each sequence above shows the light chain framework regions (LFRs) and the CDRs in bold, with positions where mutagenesis was applied underlined.

TABLE 2

Amino acid sequence of hMAb005 VH mutagenesis sub-libraries.

| HFR1 | HCDR1 | HFR2 | HCDR2 | HFR3 | HCDR3 | HFR4 |
|---|---|---|---|---|---|---|
| EVQLVESGGGLV QPGGSLRLSCAAS (SEQ ID NO: 54) | GFTFSSYMMS (SEQ ID NO: 1) | WVRQAPGKGLEW (SEQ ID NO: 55) | VATISGGGANTYYPD SVKG (SEQ ID NO: 56) | RFTISRDNAKNSLYLQ MNSLRAEDTAVYYCAR (SEQ ID NO: 57) | QLYYFDY (SEQ ID NO: 3) | WGQGTTVTVSS (SEQ ID NO: 58) |
| EVQLVESGGGLV QPGGSLRLSCAAS (SEQ ID NO: 54) | GF<u>TFSSY</u>MMS (SEQ ID NO: 1) | WVRQAPGKGLEW (SEQ ID NO: 55) | VATISGGGANTYYPD SVKG (SEQ ID NO: 56) | RFTISRDNAKNSLYLQ MNSLRAEDTAVYYCAR (SEQ ID NO: 57) | QLYYFDY (SEQ ID NO: 3) | WGQGTTVTVSS (SEQ ID NO: 58) |
| EVQLVESGGGLV QPGGSLRLSCAAS (SEQ ID NO: 54) | GFTFSSYMMS (SEQ ID NO: 1) | WVRQAPGKGLEW (SEQ ID NO: 55) | VATIS<u>GGG</u>ANTYYPD SVKG (SEQ ID NO: 56) | RFTISRDNAKNSLYLQ MNSLRAEDTAVYYCAR (SEQ ID NO: 57) | QLYYFDY (SEQ ID NO: 3) | WGQGTTVTVSS (SEQ ID NO: 58) |
| EVQLVESGGGLV QPGGSLRLSCAAS (SEQ ID NO: 54) | GFTFSSYMMS (SEQ ID NO: 1) | WVRQAPGKGLEW (SEQ ID NO: 55) | VATISGGG<u>ANTYYP</u>D SVKG (SEQ ID NO: 56) | RFTISRDNAKNSLYLQ MNSLRAEDTAVYYCAR (SEQ ID NO: 57) | QLYYFDY (SEQ ID NO: 3) | WGQGTTVTVSS (SEQ ID NO: 58) |
| EVQLVESGGGLV QPGGSLRLSCAAS (SEQ ID NO: 54) | GFTFSSYMMS (SEQ ID NO: 1) | WVRQAPGKGLEW (SEQ ID NO: 55) | VATISGGGANTYYPD SVKG (SEQ ID NO: 56) | RFTISRDNAKNSLYLQ MNSLRAEDTAVYYCAR (SEQ ID NO: 57) | <u>Q</u>LYYFDY (SEQ ID NO: 3) | WGQGTTVTVSS (SEQ ID NO: 58) |
| EVQLVESGGGLV QPGGSLRLSCAAS (SEQ ID NO: 54) | GFTFSSYMMS (SEQ ID NO: 1) | WVRQAPGKGLEW (SEQ ID NO: 55) | VATISGGGANTYYPD SVKG (SEQ ID NO: 56) | RFTISRDNAKNSLYLQ MNSLRAEDTAVYYCAR (SEQ ID NO: 57) | Q<u>LYYFD</u>Y (SEQ ID NO: 3) | WGQGTTVTVSS (SEQ ID NO: 58) |

As noted above, the "Unified" CDR definitions used in this manuscript are an expanded definition in comparison to the classical Kabat definition. Each sequence above shows the light chain framework regions (HFRs) and the CDRs in bold, with positions where mutagenesis was applied underlined.

TABLE 3

Position-specific mutations found in LCDR1 of clones exhibiting improved binding to VEGFR2.

| L | A | S | Q | T | I | G | T | W | L | T |
|---|---|---|---|---|---|---|---|---|---|---|
|   |   |   |   | E |   | A | R |   |   | G |
|   |   |   |   | G |   | L | S |   |   | I |
|   |   |   |   | K |   | S |   |   |   | L |
|   |   |   |   | P |   | V |   |   |   | P |
|   |   |   |   | S |   |   |   |   |   |   |

The original LCDR1 sequence LASQTIGTWLT (SEQ ID NO: 9) is shown as the top row. LASQX$_1$X$_2$X$_3$X$_4$WLX$_5$ is a variant sequence wherein X$_1$ is T, E, G, K, P or S, X$_2$ is I, A, L, S or V, X$_3$ is G, R or S, X$_4$ is T, G, I, L or P and X$_5$ is T or S (SEQ ID NO: 59).

TABLE 4

Position-specific mutations found in LCDR3 of clones exhibiting improved binding to VEGFR2.

| Q | Q | V | Y | S | I | P | W | T |
|---|---|---|---|---|---|---|---|---|
|   |   |   | A | A | L |   | F | A |
|   |   |   | F | E | T |   |   | G |
|   |   |   | N | M | V |   |   | N |
|   |   |   | S | N |   |   |   | R |
|   |   |   |   | Q |   |   |   | S |
|   |   |   |   | V |   |   |   |   |

The original LCDR3 sequence QQVYSIPWT (SEQ ID NO: 6) is shown as the top row. QQVX$_1$X$_2$X$_3$PX$_4$X$_5$ is a variant sequence wherein X$_1$ is Y, A, F, N or S, X$_2$ is S, A, E, M, N, Q or V, X$_3$ is I, L, T or V, X$_4$ is W or F and X$_5$ is T, A, G, N, R or S (SEQ ID NO: 60).

TABLE 5

Light chain variable region sequences of IgGs exhibiting improved binding to VEGFR2.

| Clone | VL amino acid sequence | SEQ ID NO |
|---|---|---|
| MAB02A03 | DIQMTQSSSSLSASVGDRVTITCLASQGIGPWLSWYQQKPGKAPKLLIYTATSLADGVPSRFSGSGSGTDFTLTISSLQPEDFATYYCQQVYSIPWTFGGGTKVEIK | 14 |
| MAB02B03 | DIQMTQSPSSLSASVGDRVTITCLASQPLGIWLSWYQQKPGKAPKLLIYTATSLADGVPSRFSGSGSGTDFTLTISSLQPEDFATYYCQQVYSIPWTFGGGTKVEIK | 15 |
| MAB02D08 | DIQMTQSPSSLSASVGDRVTITCLASQESGIWLSWYQQKPGKAPKLLIYTATSLADGVPSRFSGSGSGTDFTLTISSLQPEDFATYYCQQVYSIPWTFGGGTKVEIK | 16 |
| MAB05G03 | DIQMTQSPSSLSASVGDRVTITCLASQTIGTWLTWYQQKPGKAPKLLIYTATSLADGVPSRFSGSGSGTDFTLTISSLQPEDFATYYCQQVAELPFGFGGGTKVEIK | 17 |
| MAB05E08 | DIQMTQSPSSLSASVGDRVTITCLASQTIGTWLTWYQQKPGKAPKLLIYTATSLADGVPSRFSGSGSGTDFTLTISSLQPEDFATYYCQQVSVTPFTFGGGTKVEIK | 18 |
| MAB01 | DIQMTQSPSSLSASVGDRVTITCLASQGIGPWLSWYQQKPGKAPKLLIYTATSLADGVPSRFSGSGSGTDFTLTISSLQPEDFATYYCQQVAELPFGFGGGTKVEIK | 19 |
| MAB02 | DIQMTQSPSSLSASVGDRVTITCLASQPLGIWLSWYQQKPGKAPKLLIYTATSLADGVPSRFSGSGSGTDFTLTISSLQPEDFATYYCQQVAELPFGFGGGTKVEIK | 20 |
| MAB03 | DIQMTQSPSSLSASVGDRVTITCLASQESGIWLSWYQQKPGKAPKLLIYTATSLADGVPSRFSGSGSGTDFTLTISSLQPEDFATYYCQQVAELPFGFGGGTKVEIK | 21 |
| MAB04 | DIQMTQSPSSLSASVGDRVTITCLASQGIGPWLSWYQQKPGKAPKLLIYTATSLADGVPSRFSGSGSGTDFTLTISSLQPEDFATYYCQQVSVTPFTFGGGTKVEIK | 22 |
| MAB05 | DIQMTQSPSSLSASVGDRVTITCLASQPLGIWLSWYQQKPGKAPKLLIYTATSLADGVPSRFSGSGSGTDFTLTISSLQPEDFATYYCQQVSVTPFTFGGGTKVEIK | 23 |
| MAB06 | DIQMTQSPSSLSASVGDRVTITCLASQESGIWLSWYQQKPGKAPKLLIYTATSLADGVPSRFSGSGSGTDFTLTISSLQPEDFATYYCQQVSVTPFTFGGGTKVEIK | 24 |

TABLE 6

Examples of antibody Fc region amino acid sequences.

Human IgG4 wild type
(SEQ ID NO: 25)
ASTKGPSVFPLAPCSRSTSESTAALGCLVKDYFPEPVTVSWNSGALTSGVHTFPAVLQSS
GLYSLSSVVTVPSSSLGTKTYTCNVDHKPSNTKVDKRVESKYGPPCPSCPAPEFLGGPSV
FLFPPKPKDTLMISRTPEVTCVVVDVSQEDPEVQFNWYVDGVEVHNAKTKPREEQFNST
YRVVSVLTVLHQDWLNGKEYKCKVSNKGLPSSIEKTISKAKGQPREPQVYTLPPSQEEMT
KNQVSLTCLVKGFYPSDIAVEWESNGQPENNYKTTPPVLDSDGSFFLYSRLTVDKSRWQ
EGNVFSCSVMHEALHNHYTQKSLSLSLGK Human IgG4 (S228P)
(SEQ ID NO: 26)
ASTKGPSVFPLAPCSRSTSESTAALGCLVKDYFPEPVTVSWNSGALTSGVHTFPAVLQSS
GLYSLSSVVTVPSSSLGTKTYTCNVDHKPSNTKVDKRVESKYGPPCPPCPAPEFLGGPSV
FLFPPKPKDTLMISRTPEVTCVVVDVSQEDPEVQFNWYVDGVEVHNAKTKPREEQFNST
YRVVSVLTVLHQDWLNGKEYKCKVSNKGLPSSIEKTISKAKGQPREPQVYTLPPSQEEMT
KNQVSLTCLVKGFYPSDIAVEWESNGQPENNYKTTPPVLDSDGSFFLYSRLTVDKSRWQ
EGNVFSCSVMHEALHNHYTQKSLSLSLGK Human IgG1 wild type
(SEQ ID NO: 27)
ASTKGPSVFPLAPSSKSTSGGTAALGCLVKDYFPEPVTVSWNSGALTSGVHTFPAVLQSS
GLYSLSSVVTVPSSSLGTQTYICNVNHKPSNTKVDKKVEPKSCDKTHTCPPCPAPELLGG
PSVFLFPPKPKDTLMISRTPEVTCVVVDVSHEDPEVKFNWYVDGVEVHNAKTKPREEQYN
STYRVVSVLTVLHQDWLNGKEYKCKVSNKALPAPIEKTISKAKGQPREPQVYTLPPS<u>RDEL
T</u>KNQVSLTCLVKGFYPSDIAVEWESNGQPENNYKTTPPVLDSDGSFFLYSKLTVDKS<u>RW
Q</u>QGNVFSCSVMHEALHNHYTQKSLSLSPGK Human IgG1-3M
(SEQ ID NO: 28)
ASTKGPSVFPLAPSSKSTSGGTAALGCLVKDYFPEPVTVSWNSGALTSGVHTFPAVLQSS
GLYSLSSVVTVPSSSLGTQTYICNVNHKPSNTKVDKKVEPKSCDKTHTCPPCPAPEAAGA
PSVFLFPPKPKDTLMISRTPEVTCVVVDVSHEDPEVKFNWYVDGVEVHNAKTKPREEQYN
STYRVVSVLTVLHQDWLNGKEYKCKVSNKALPAPIEKTISKAKGQPREPQVYTLPPS<u>RDEL
T</u>KNQVSLTCLVKGFYPSDIAVEWESNGQPENNYKTTPPVLDSDGSFFLYSKLTVDKS<u>RW
Q</u>QGNVFSCSVMHEALHNHYTQKSLSLSPGK Human IgG2 wild type
(SEQ ID NO: 29)
ASTKGPSVFPLAPCSRSTSESTAALGCLVKDYFPEPVTVSWNSGALTSGVHTFPAVLQSS
GLYSLSSVVTVPSSNFGTQTYTCNVDHKPSNTKVDKTVERKCCVECPPCPAPPVAGPSV
FLFPPKPKDTLMISRTPEVTCVVVDVSHEDPEVQFNWYVDGVEVHNAKTKPREEQFNSTF
RWVSVLTVVHQDWLNGKEYKCKVSNKGLPAPIEKTISKTKGQPREPQVYTLPPSREEMTK
NQVSLTCLVKGFYPSDISVEWESNGQPENNYKTTPPMLDSDGSFFLYSKLTVDKSRWQQ
GNVFSCSVMHEALHNHYTQKSLSLSPGK Human IgG1 wild type "REEM" allotype
(SEQ ID NO: 30)
ASTKGPSVFPLAPSSKSTSGGTAALGCLVKDYFPEPVTVSWNSGALTSGVHTFPAVLQSS
GLYSLSSVVTVPSSSLGTQTYICNVNHKPSNTKVDKKVEPKSCDKTHTCPPCPAPELLGG
PSVFLFPPKPKDTLMISRTPEVTCVVVDVSHEDPEVKFNWYVDGVEVHNAKTKPREEQYN
STYRVVSVLTVLHQDWLNGKEYKCKVSNKALPAPIEKTISKAKGQPREPQVYTLPPS<u>REE
M</u>TKNQVSLTCLVKGFYPSDIAVEWESNGQPENNYKTTPPVLDSDGSFFLYSKLTVDKS<u>R
W</u>QQGNVFSCSVMHEALHNHYTQKSLSLSPGK Human IgG1-3M "REEM" allotype
(SEQ ID NO: 31)
ASTKGPSVFPLAPSSKSTSGGTAALGCLVKDYFPEPVTVSWNSGALTSGVHTFPAVLQSS
GLYSLSSVVTVPSSSLGTQTYICNVNHKPSNTKVDKKVEPKSCDKTHTCPPCPAPEAAGA
PSVFLFPPKPKDTLMISRTPEVTCVVVDVSHEDPEVKFNWYVDGVEVHNAKTKPREEQYN
STYRVVSVLTVLHQDWLNGKEYKCKVSNKALPAPIEKTISKAKGQPREPQVYTLPPS<u>REE
M</u>KNQVSLTCLVKGFYPSDIAVEWESNGQPENNYKTTPPVLDSDGSFFLYSKLTVDKS<u>RW
Q</u>QGNVFSCSVMHEALHNHYTQKSLSLSPGK

TABLE 7

Examples of membrane protein amino acid sequences.

Human PD1 sequence
(SEQ ID NO: 32)
MQIPQAPWPVVWAVLQLGWRPGWFLDSPDRPWNPPTFSPALLVVTEGDNATFTCSFSN
TSESFVLNWYRMSPSNQTDKLAAFPEDRSQPGQDCRFRVTQLPNGRDFHMSVVRARRN
DSGTYLCGAISLAPKAQIKESLRAELRVTERRAEVPTAHPSPSPRPAGQFQTLVVGVVGG
LLGSLVLLVWVLAVICSRAARGTIGARRTGQPLKEDPSAVPVFSVDYGELDFQWREKTPE
PPVPCVPEQTEYATIVFPSGMGTSSPARRGSADGPRSAQPLRPEDGHCSWPL TABLE 7-continued Examples of membrane protein amino acid sequences.

Cynomolgus monkey PD1 sequence
(SEQ ID NO: 33)
MQIPQAPWPVVWAVLQLGWRPGWFLESPDRPWNAPTFSPALLLVTEGDNATFTCSFSN
ASESFVLNWYRMSPSNQTDKLAAFPEDRSQPGQDCRFRVTRLPNGRDFHMSVVRARRN
DSGTYLCGAISLAPKAQIKESLRAELRVTERRAEVPTAHPSPSPRPAGQFQALVVGVVGG
LLGSLVLLVWVLAVICSRAAQGTIEARRTGQPLKEDPSAVPVFSVDYGELDFQWREKTPE
PPAPCVPEQTEYATIVFPSGLGTSSPARRGSADGPRSPRPLRPEDGHCSWPL Human KDR (VEGFR2) sequence
(SEQ ID NO: 34)
MQSKVLLAVALWLCVETRAASVGLPSVSLDLPRLSIQKDILTIKANTTLQITCRGQRDLDWL
WPNNQSGSEQRVEVTECSDGLFCKTLTIPKVIGNDTGAYKCFYRETDLASVIYVYVQDYR
SPFIASVSDQHGVVYITENKNKTVVIPCLGSISNLNVSLCARYPEKRFVPDGNRISWDSKK
GFTIPSYMISYAGMVFCEAKINDESYQSIMYIVVVVGYRIYDVVLSPSHGIELSVGEKLVLNC
TARTELNVGIDFNWEYPSSKHQHKKLVNRDLKTQSGSEMKKFLSTLTIDGVTRSDQGLYT
CAASSGLMTKKNSTFVRVHEKPFVAFGSGMESLVEATVGERVRIPAKYLGYPPPEIKWYK
NGIPLESNHTIKAGHVLTIMEVSERDTGNYTVILTNPISKEKQSHVVSLVVYVPPQIGEKSLI
SPVDSYQYGTTQTLTCTVYAIPPPHHIHWYWQLEEECANEPSQAVSVTNPYPCEEWRSV
EDFQGGNKIEVNKNQFALIEGKNKTVSTLVIQAANVSALYKCEAVNKVGRGERVISFHVTR
GPEITLQPDMQPTEQESVSLWCTADRSTFENLTWYKLGPQPLPIHVGELPTPVCKNLDTL
WKLNATMFSNSTNDILIMELKNASLQDQGDYVCLAQDRKTKKRHCVVRQLTVLERVAPTIT
GNLENQTTSIGESIEVSCTASGNPPPQIMWFKDNETLVEDSGIVLKDGNRNLTIRRVRKED
EGLYTCQACSVLGCAKVEAFFIIEGAQEKTNLEIIILVGTAVIAMFFWLLLVIILRTVKRANGG
ELKTGYLSIVMDPDELPLDEHCERLPYDASKWEFPRDRLKLGKPLGRGAFGQVIEADAFGI
DKTATCRTVAVKMLKEGATHSEHRALMSELKILIHIGHHLNVVNLLGACTKPGGPLMVIVEF
CKFGNLSTYLRSKRNEFVPYKTKGARFRQGKDYVGAIPVDLKRRLDSITSSQSSASSGFV
EEKSLSDVEEEEAPEDLYKDFLTLEHLICYSFQVAKGMEFLASRKCIHRDLAARNILLSEKN
WKICDFGLARDIYKDPDYVRKGDARLPLKWMAPETIFDRVYTIQSDVWSFGVLLWEIFSL
GASPYPGVKIDEEFCRRLKEGTRMRAPDYTTPEMYQTMLDCWHGEPSQRPTFSELVEHL
GNLLQANAQQDGKDYIVLPISETLSMEEDSGLSLPTSPVSCMEEEEVCDPKFHYDNTAGIS
QYLQNSKRKSRPVSVKTFEDIPLEEPEVKVIPDDNQTDSGMVLASEELKTLEDRTKLSPSF
GGMVPSKSRESVASEGSNQTSGYQSGYHSDDTDTTVYSSEEAELLKLIEIGVQTGSTAQI
LQPDSGTTLSSPPV Rhesus KDR (VEGFR2) sequence
(SEQ ID NO: 35)
MASKVLLAVALWLCVETRAASVGLPSVSLDLPRLSIQKDILTIKANTTLQITCRGQRDLDWL
WPNNQSGSEQRVEVTECSDGLFCKTLTIPKVIGNDTGAYKCFYRETDLASVIYVYVQDYR
SPFIASVSDQHGVVYITENKNKTVVIPCLGSISNLNVSLCARYPEKRFVPDGNRISWDSKK
GFTIPSYMISYAGMVFCEAKINDESYQSIMYIWWVVGYRIYDWLSPSHGVELSVGEKLVLN
CTARTELNVGIDFNWEYPSSKHQHKKLVNRDLKTQSGSEMKFLSTLTIDGVTRSDQGLY
TCAASSGLMTKKNSTFVRVHEKPFVAFGSGMESLVEATVGERVRIPVKYLGYPPPEIKWY
KNGIPLESNHTVKVGHVLTIMEVSERDTGNYTVILTNPISKEKQSHVVSLVVYVPPQIGEKS
LISPVDSYQYGTTQTLTCTVYAIPPPHHIHWYWQLEEECPNEPSQAVSVTNPYPCEEWRS
VEDFQGGNKIEVNKNQFALIEGKNKTVSTLVIQAANVSALYKCEAVNKVGRGERVISFHVT
RGPEITLQPDLQPTEQESVSLWCTADKSTFENLTWYKLGPQPLPVHVGELPTPVCKNLDT
LWKLNATIFSNSTNDILIMELKNASLQDQGDYVCVAQDRKTKKRHCVVRQLTVLERVAPMI
TGNLENQTTSIGETIEVSCTASGNPPPQIMWFKDNETLVEDSGIVLKDGNRNLTIRRVRKE
DEGLYTCQACSVLGCAKVEAFFIIEGAQEKTNLEIIILVGTAVIAMFFWLLLVIILRTVKRANG
GELKTGYLSIVMDPDELPLDEHCERLPYDASKWEFPRDRLKLGKPLGRGAFGQVIEADAF
GIDKTATCRTVAVKMLKEGATHSEHRALMSELKILIHIGHHLNVVNLLGACTKPGGPLMVIV
EFCKFGNLSTYLRSKRNEFVPYKTKGARFRQGKDYVGAIPVDLKRRLDSITSSQSSASSG
FVEEKSLSDVEEEEAPEDLYKDFLTLEHLICYSFQVAKGMEFLASRKCIHRDLAARNILLSE
KNWVKICDFGLARDIYKDPDYVRKGDARLPLKWMAPETIFDRVYTIQSDVWSFGVLLWEIF
SLGASPYPGVKIDEEFCRRLKEGTRMRAPDYTTPEMYQTMLDCWHGEPSQRPTFSELVE
HLGNLLQANAQQDGKDYIVLPISETLSMEEDSGLSLPTSPVSCMEEEEVCDPKFHYDNTA
GISQYLQNSKRKSRPVSVKTFEDIPLEEPEVKVIPDDNQTDSGMVLASEELKTLEDRTKLA
PSFSGMVSSKSRESVASEGSNQTSGYQSGYHSDDTDTTVYSSEEAELLKLIEIGVQTGST
AQILQPDSGTTLSSPPV

TABLE 8

Light chain variable region amino acid sequences of IgGs exhibiting improved binding to V

TABLE 8-continued

Light chain variable region amino acid sequences of IgGs exhibiting improved binding to VEGFR2.

|

TABLE 10-continued

Heavy chain variable region amino acid sequences combined with VL amino acid sequence of SEQ ID NO: 47 to make 3rd generation IgGs.

| Clone | VH amino acid sequence | SEQ ID NO |
|---|---|---|
| MAB06.8.8 | EVQLVESGGGLVQPGGSLRLSCAASGFTFSSYMMSWVRQAPGKGLEWVATISGGGSNKYYVDSVKGRFTISRDNAKNSLYLQMNSLRAEDTAVYYCARQLYYADYWGQGTTVTVSS | 74 |
| MAB06.8.9 | EVQLVESGGGLVQPGGSLRLSCAASGFTFSSYMMSWVRQAPGKGLEWVATISGGGSNKYYVDSVKGRFTISRDNAKNSLYLQMNSLRAEDTAVYYCARQLYYYDYWGQGTTVTVSS | 75 |

What is claimed is:

1. An antibody molecule that specifically binds to PD1 and VEGFR2, wherein the antibody molecule comprises:
   (a) a heavy chain variable (VH) region comprising
      a HCDR1 having an amino acid sequence of SEQ ID NO: 1,
      a HCDR2 having an amino sequence of SEQ ID NO: 42, and
      a HCDR3 having an amino acid sequence of SEQ ID NO: 3, and
   (b) a light chain variable (VL) region comprising
      a LCDR1 having an amino acid sequence of SEQ ID NO: 39,
      a LCDR2 having an amino sequence of SEQ ID NO: 40, and
      a LCDR3 having an amino acid sequence of SEQ ID NO: 11.

2. The antibody molecule of claim 1, wherein the VH region has an amino acid sequence that is at least about 90%, at least about 91%, at least about 92%, at least about 93%, at least about 94%, at least about 95%, at least about 96%, at least about 97%, at least about 98% or at least about 99% identical to SEQ ID NO: 49.

3. The antibody molecule of claim 1, wherein the VH region has an amino acid sequence of SEQ ID NO: 49.

4. The antibody molecule of claim 1, wherein the VL region has an amino acid sequence that is at least about 90%, at least about 91%, at least about 92%, at least about 93%, at least about 94%, at least about 95%, at least about 96%, at least about 97%, at least about 98% or at least about 99% identical to SEQ ID NO: 45.

5. The antibody molecule of claim 1, wherein the VL region has an amino acid sequence of SEQ ID NO: 45.

6. The antibody molecule of claim 1, wherein the VH region has an amino acid sequence of SEQ ID NO:49, and the VL region has an amino acid sequence of SEQ ID NO: 45.

7. The antibody molecule of claim 6, wherein the antibody molecule further comprises an IgG, IgE, IgM, IgD, IgA or IgY immunoglobulin constant region.

8. The antibody molecule of claim 7, wherein the IgG immunoglobulin constant region is IgG1, IgG2, IgG3, or IgG4; or wherein the IgA constant region is IgA1 or IgA2.

9. The antibody molecule of claim 6, wherein the IgG immunoglobulin constant region is IgG1.

10. The antibody molecule of claim 1, wherein the antibody molecule comprises an IgG immunoglobulin constant region having an amino acid sequence of SEQ ID NO: 25, SEQ ID NO: 26, SEQ ID NO: 27, SEQ ID NO: 28, SEQ ID NO: 29, SEQ ID NO: 30, or SEQ ID NO: 31.

11. The antibody molecule of claim 10, wherein the antibody molecule further comprises a human kappa light chain constant region.

12. The antibody molecule of claim 1, wherein the antibody molecule is a humanized or chimeric antibody molecule.

13. The antibody molecule of claim 1, wherein the antibody molecule is a Fab, Fab', an F(ab')$_2$, Fv, scFv, maxibody, minibody, diabody, triabody, tetrabody, or bis-scFv.

14. The antibody molecule of claim 1, wherein the antibody molecule is further linked to a therapeutic agent.

15. The antibody molecule of claim 14, wherein the therapeutic agent is a cytotoxin, a radioisotope, a chemotherapeutic agent, an immunomodulatory agent, a cytostatic enzyme, a cytolytic enzyme, a therapeutic nucleic acid, an anti-angiogenic agent, an anti-proliferative agent, or a pro-apoptotic agent.

16. A pharmaceutical composition comprising the antibody molecule of claim 1, and a pharmaceutically acceptable carrier, diluent or excipient.

17. The antibody molecule of claim 1, wherein the antibody molecule further comprises a human kappa light chain constant region.

18. An antibody molecule that specifically binds to PD1 and VEGFR2, wherein the antibody molecule comprises:
   (a) a heavy chain comprising a VH region having an amino acid sequence of SEQ ID NO: 49, and an IgG1 immunoglobulin constant region having an amino acid sequence of SEQ ID NO: 28, and
   (b) a light chain comprising a VL region having an amino acid sequence of SEQ ID NO: 45.

19. The antibody molecule of claim 18, wherein the light chain of the antibody molecule further comprises a human kappa light chain constant region.

20. An antibody molecule that specifically binds to PD1 and VEGFR2, wherein the antibody molecule comprises:
   (a) a VH region comprising
      a HCDR1 having an amino acid sequence of SEQ ID NO: 1,
      a HCDR2 having an amino acid sequence of SEQ ID NO: 42, and
      a HCDR3 having an amino acid sequence of SEQ ID NO: 3, and (b) a VL region comprising
    a LCDR1 having an amino acid sequence of SEQ ID NO: 39,
    a LCDR2 having an amino sequence of SEQ ID NO: 5, SEQ ID NO: 41, or SEQ ID NO: 43, and
    a LCDR3 having an amino acid sequence of SEQ ID NO: 11.

21. The antibody molecule of claim 20, wherein the VH region has an amino acid sequence of SEQ ID NO: 49.

22. The antibody molecule of claim 20, wherein the VL region has an amino acid sequence of SEQ ID NO: 44, SEQ ID NO: 46, or SEQ ID NO: 47.

23. The antibody molecule of claim 20, wherein the VH region has an amino acid sequence of SEQ ID NO: 49, and the VL region has an amino acid sequence of SEQ ID NO: 44, SEQ ID NO: 46, or SEQ ID NO: 47.

24. The antibody molecule of claim 20, wherein the antibody molecule comprises an IgG immunoglobulin constant region having an amino acid sequence of SEQ ID NO: 25, SEQ ID NO: 26, SEQ ID NO: 27, SEQ ID NO: 28, SEQ ID NO: 29, SEQ ID NO: 30, or SEQ ID NO: 31.

25. The antibody molecule of claim 20, wherein antibody molecule further comprises a human kappa light chain constant region.

26. The antibody molecule of claim 20, wherein the antibody molecule is a humanized or chimeric antibody molecule.

27. The antibody molecule of claim 20, wherein the antibody molecule is a Fab, Fab', an F(ab')$_2$, Fv, scFv, maxibody, minibody, diabody, triabody, tetrabody, or bis-scFv.

28. The antibody molecule of claim 20, wherein the antibody molecule is further linked, fused, or conjugated to a therapeutic agent.

29. The antibody molecule of claim 28, wherein the therapeutic agent is a cytotoxin, a radioisotope, a chemotherapeutic agent, an immunomodulatory agent, a cytostatic enzyme, a cytolytic enzyme, a therapeutic nucleic acid, an anti-angiogenic agent, an anti-proliferative agent, or a pro-apoptotic agent.

30. A pharmaceutical composition comprising the antibody molecule of claim 20, and a pharmaceutically acceptable carrier, diluent or excipient.

* * * * *